(12) United States Patent
Laganas et al.

(10) Patent No.: US 7,813,632 B2
(45) Date of Patent: Oct. 12, 2010

(54) OPTICAL ADAPTER SYSTEM AND METHOD

(75) Inventors: Michael Laganas, Colorado Springs, CO (US); Charles Ronald Musgrove, Woodland Park, CO (US)

(73) Assignee: Nocturnal Devices, LLC, Colorado Springs, CO (US)

( * ) Notice: Subject to any disclaimer, the term of this patent is extended or adjusted under 35 U.S.C. 154(b) by 136 days.

(21) Appl. No.: 12/209,179

(22) Filed: Sep. 11, 2008

(65) Prior Publication Data

US 2009/0109533 A1   Apr. 30, 2009

Related U.S. Application Data

(63) Continuation-in-part of application No. 11/698,534, filed on Jan. 26, 2007, now Pat. No. 7,648,291, which is a continuation-in-part of application No. 11/297,035, filed on Dec. 7, 2005, now Pat. No. 7,510,340.

(51) Int. Cl.
   G03B 17/12   (2006.01)
   G03B 41/00   (2006.01)
   G02F 1/01   (2006.01)
(52) U.S. Cl. .................. 396/71; 396/106; 396/431; 396/432; 396/530; 396/544; 348/217.1; 348/360; 348/375; 250/330
(58) Field of Classification Search .................. 396/71, 396/106, 431, 432, 530, 544; 348/217.1, 348/360, 361, 375; 250/330
See application file for complete search history.

(56) References Cited

U.S. PATENT DOCUMENTS

| 4,961,278 | A | 10/1990 | Johnson et al. |
|---|---|---|---|
| 5,053,794 | A | 10/1991 | Benz |
| 5,444,507 | A | 8/1995 | Palmer |
| 5,828,166 | A | 10/1998 | Roselli et al. |
| 5,909,309 | A | 6/1999 | Di Taranto et al. |
| 5,937,562 | A | 8/1999 | Brough |
| 5,973,315 | A * | 10/1999 | Saldana et al. ........ 250/214 VT |
| 6,246,049 | B1 | 6/2001 | Wirthlin |
| 6,286,963 | B1 | 9/2001 | Nelson |
| 6,333,512 | B1 | 12/2001 | Wirthlin |
| 6,449,419 | B1 | 9/2002 | Brough et al. |
| 6,872,933 | B2 | 3/2005 | Wirthlin |
| 2005/0062873 | A1 | 3/2005 | Brough |

OTHER PUBLICATIONS

Electrophysics Corp., Night Vision, Jul. 21, 2005, http://www.electrophysics.com/night-vision/ p. 1-8.
Electrophysics Corp., AstroScope 9350 BRAC, Jul. 21, 2005, http://www.electrophysics.com/Browse/Brw_ProductLineCategory.asp?CategoryID=152&Area=NV p. 1-4.

* cited by examiner

Primary Examiner—W. B. Perkey
(74) Attorney, Agent, or Firm—Kenyon & Kenyon LLP

(57) ABSTRACT

System and method for modifying an optical assembly with another image modifying device by using an adapter assembly to connect or couple three image modifying devices together. The adapter assembly includes two adapters that have collars to hold a night vision monocular between them, and to each connect with a camera and lens, respectively, modifying a camera-lens assembly for use in night time photo surveillance. Attachment members on each adapter may include mechanical and/or electrical connectors to couple or connect the adapters to each other, and/or to electrically connect the camera with the lens.

27 Claims, 47 Drawing Sheets

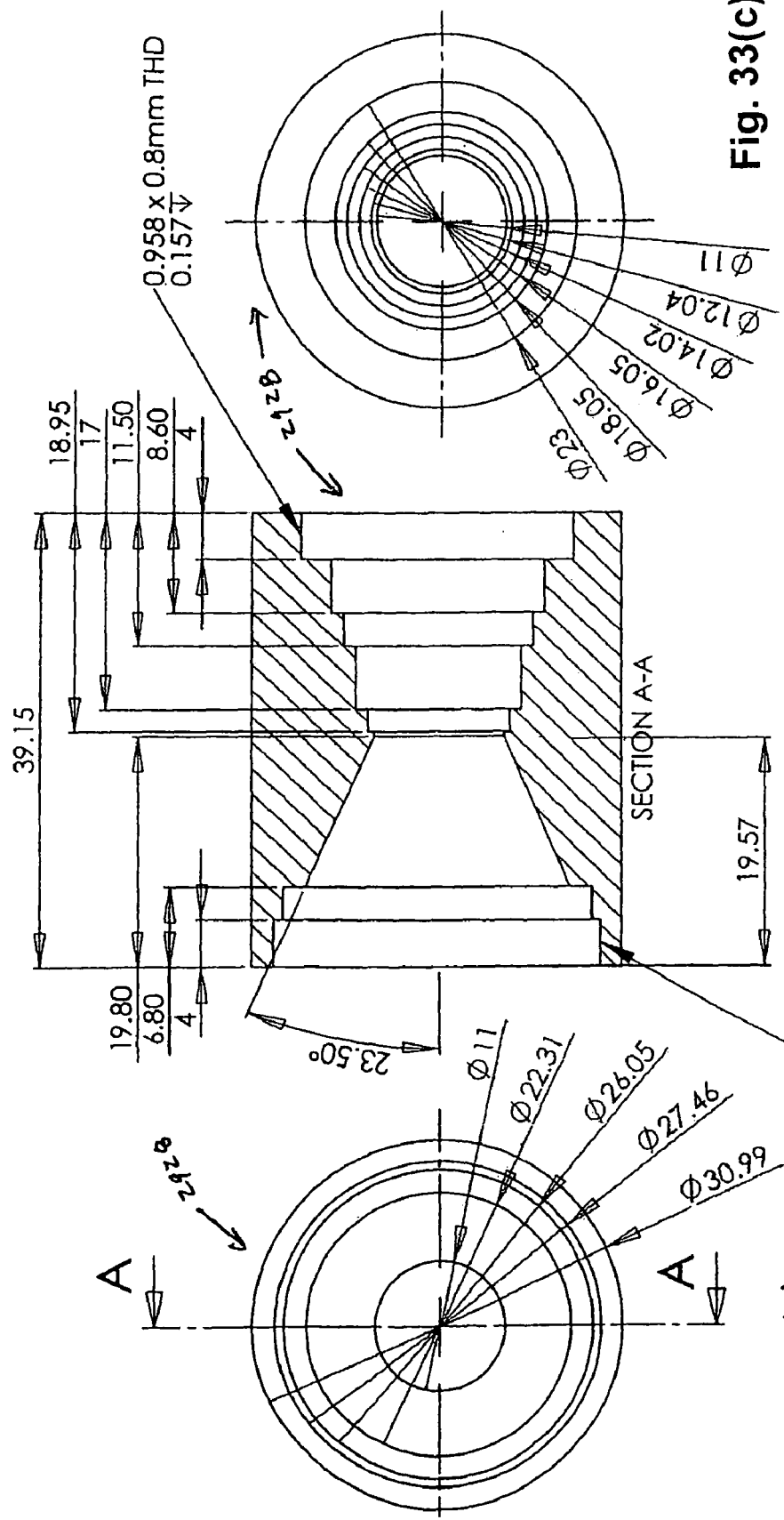

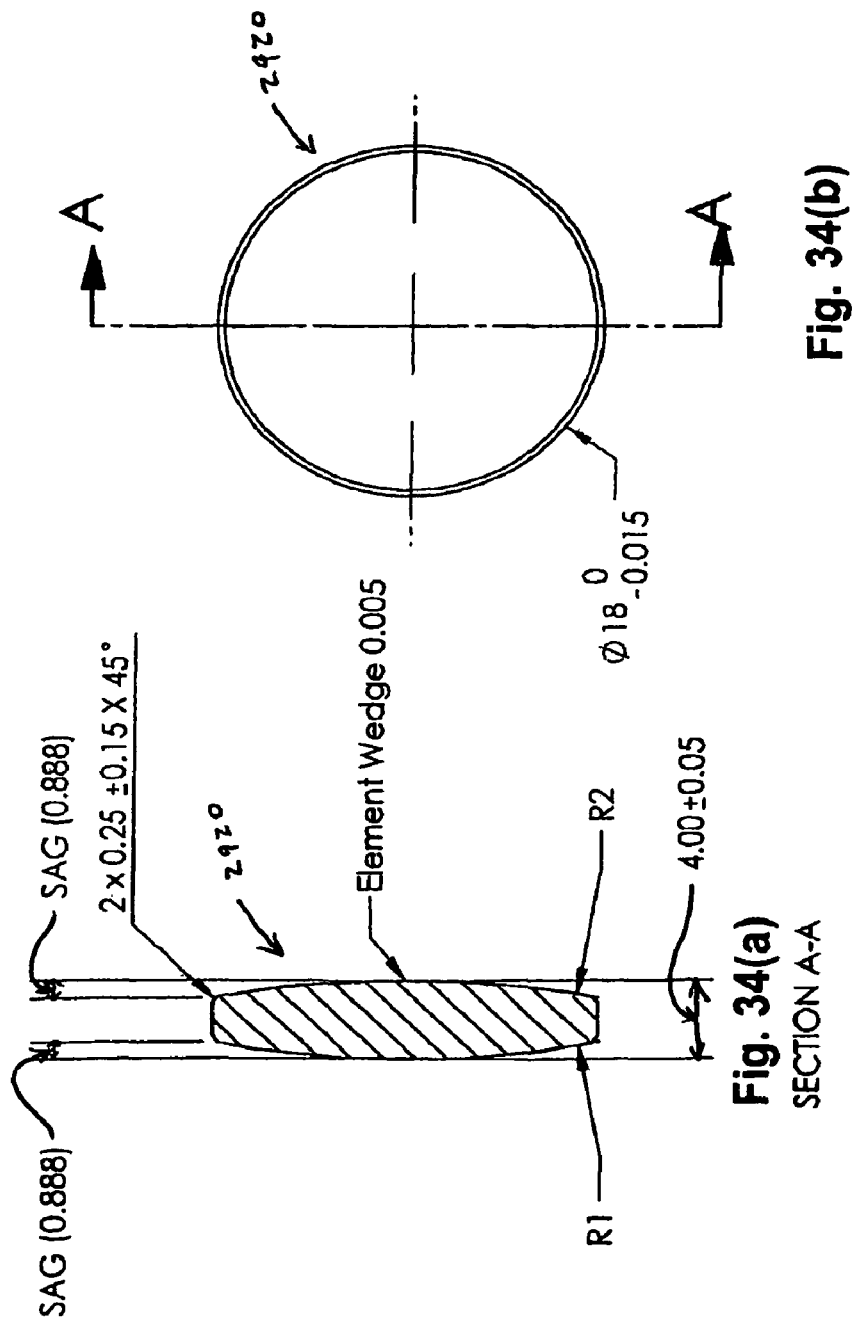

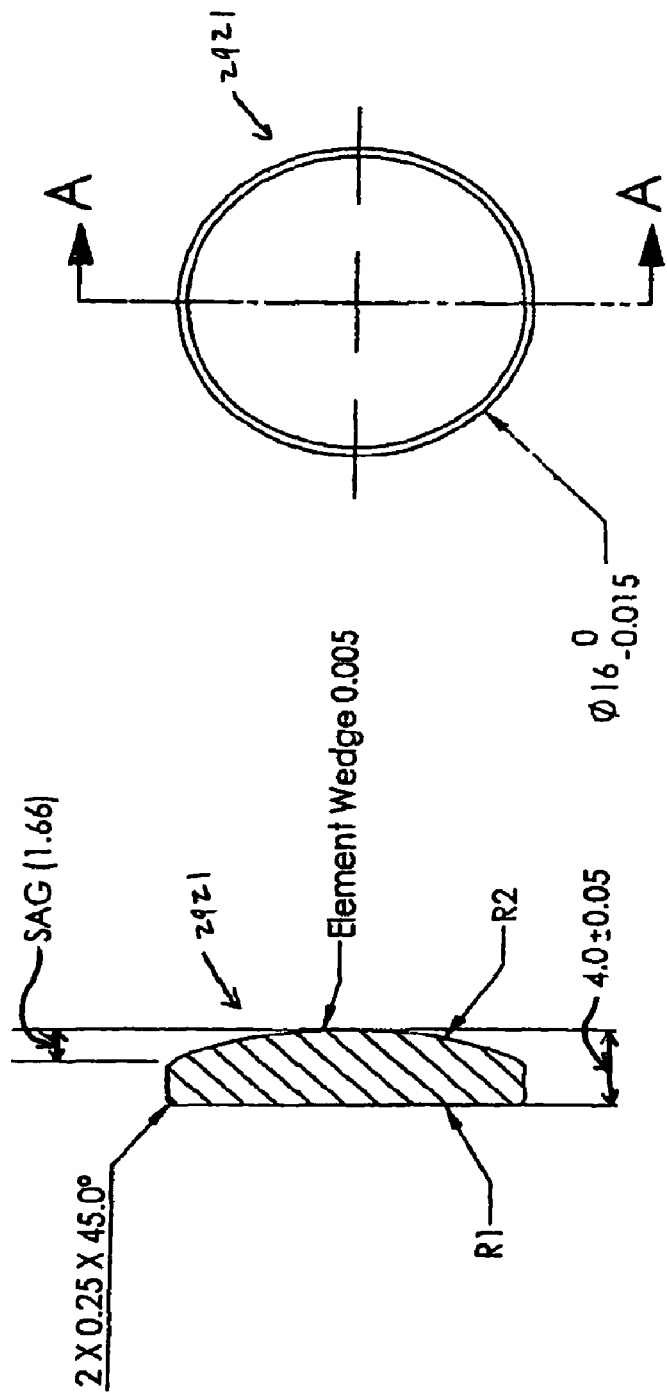

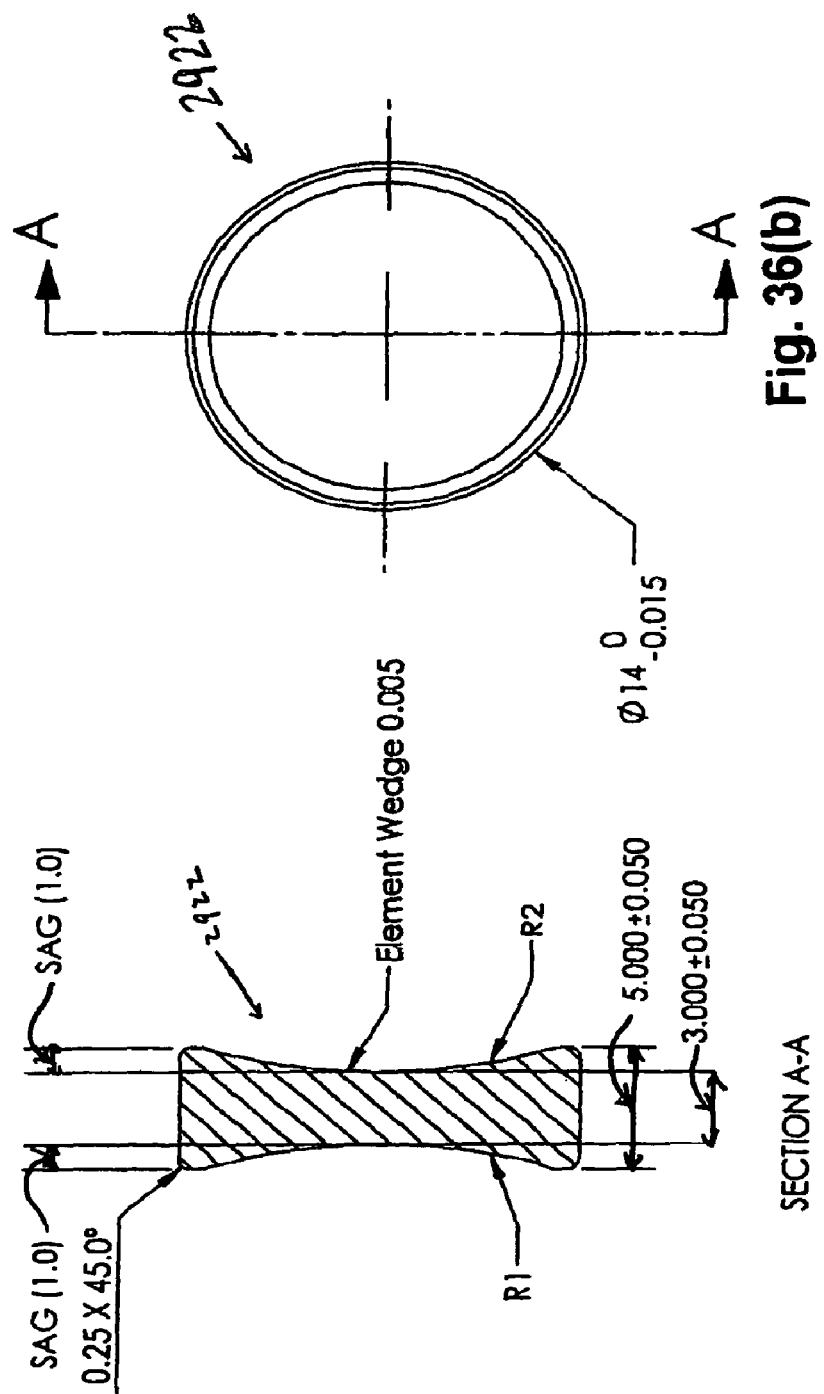

SECTION A-A

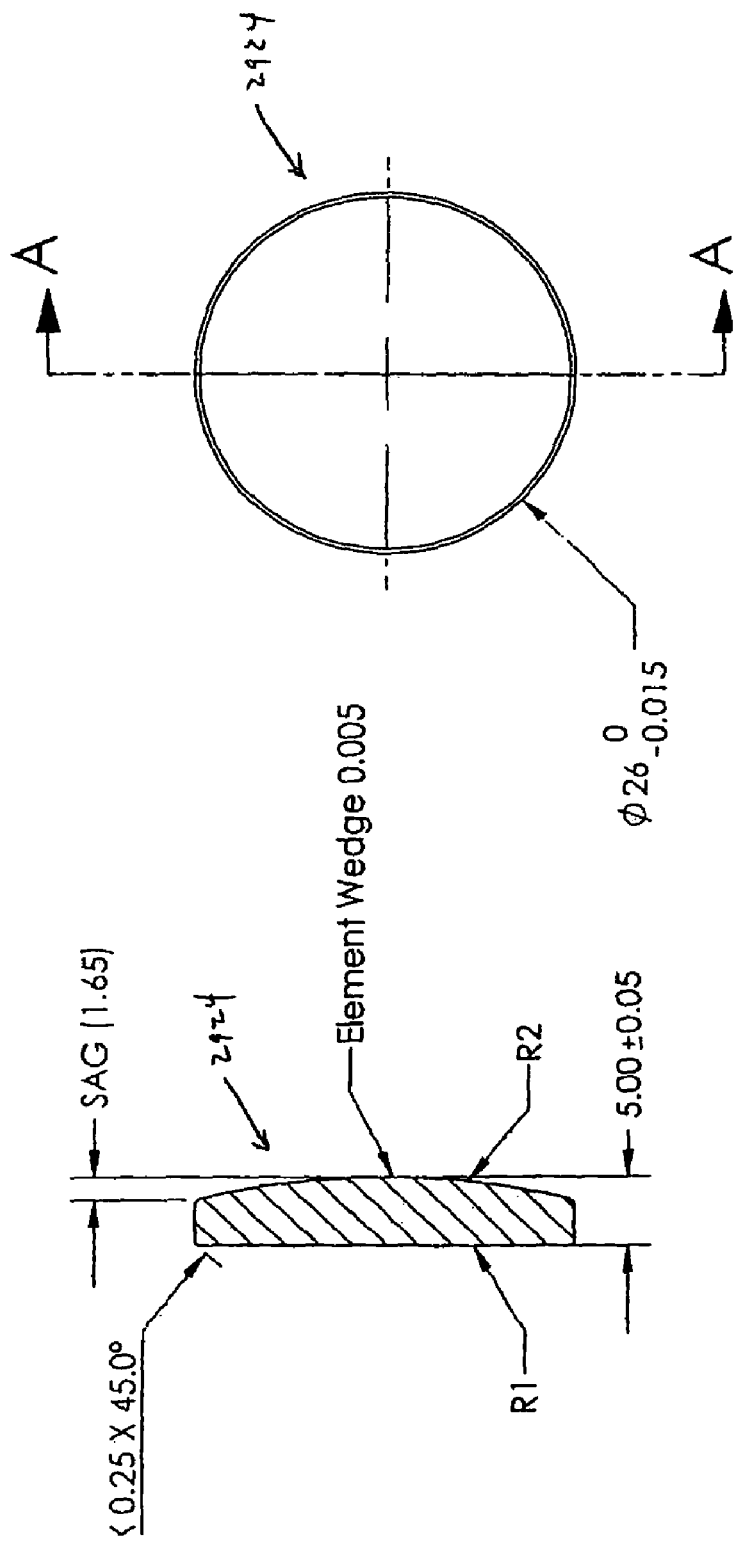

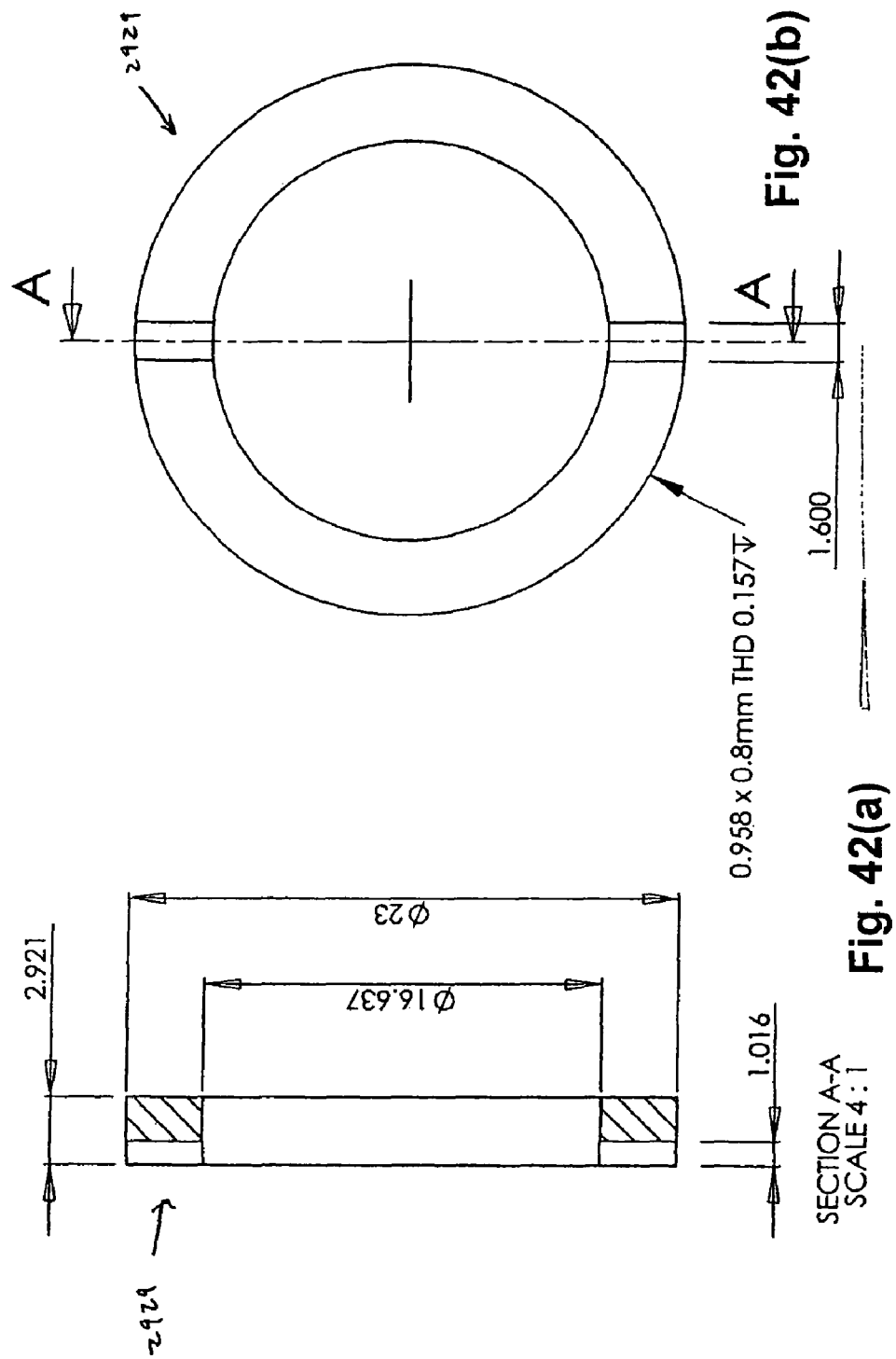

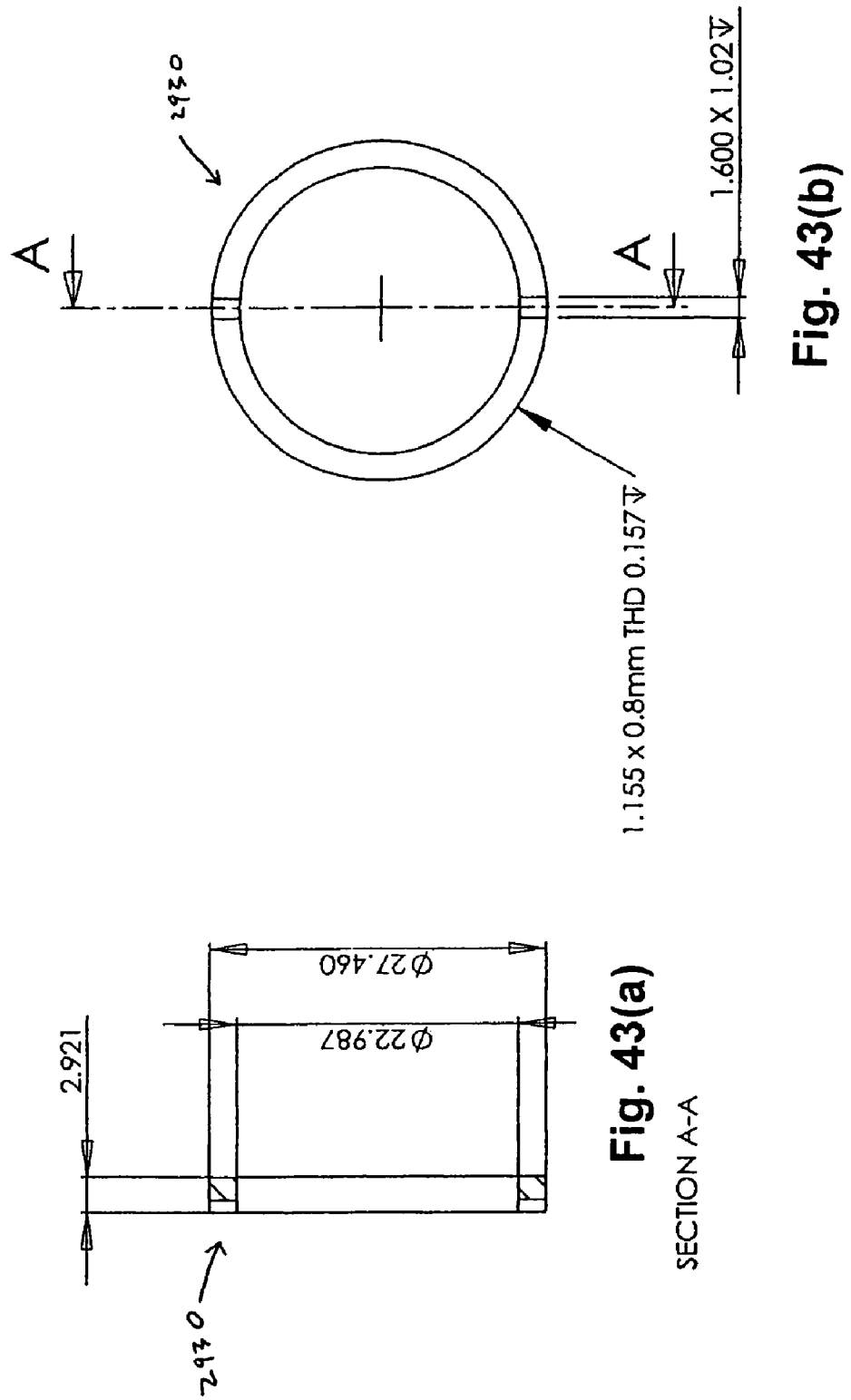

OPTICAL ADAPTER SYSTEM AND METHOD

RELATED APPLICATIONS

This application is a continuation-in-part application of U.S. patent application Ser. No. 11/698,534, filed on Jan. 26, 2007 now U.S. Pat. No. 7,648,291, which is a continuation-in-part of U.S. patent application Ser. No. 11/297,035, filed on Dec. 7, 2005 now U.S. Pat. No. 7,510,340, each of which is expressly incorporated herein in its entirety by reference thereto.

FIELD OF INVENTION

This invention relates to an optical adapter system and method, and more particularly to an easily assembled adapter system, for example, for modifying a standard assembly with an otherwise incompatible image modifying device in order to readily increase the functionality of the existing optical assembly in different lighting or atmospheric conditions.

BACKGROUND

Standard optical assemblies, e.g., firearm day scopes, camera-telephoto lens assemblies, and day-time monoculars, may need to be readily modifiable upon a change in lighting or atmospheric conditions, without going through the expense and burden of creating and carrying around a variety of custom-made optical assemblies for each type of condition. This is especially true for military operations that may take place in darkened harsh climates, e.g., where humidity or wind-strewn sand or other fine particles threatens to damage or wear any equipment, and where any excessive sound may inadvertently reveal the position of our military forces and put their lives further at risk.

Existing adapters designed to facilitate the connection of a second image modifying device to a standard optical assembly (e.g., connecting a night vision monocular to a camera) fail to address the above concerns. For example, existing adapters:

(1) have limited applications (e.g., are only operational with a subset of the optical assemblies carried around by most servicemen and women);

(2) are too complex and noisy to be quickly, quietly and securely assembled in the dark (e.g., requiring the user to carry and use Allen wrenches or other tools in the assembly or disassembly, lacking discernable labels or markings, and requiring the user to loudly snap a metal buckle onto the outer surface of the adapter in order to secure an image modifying device to the adapter);

(3) are not manufactured consistently (e.g., sometimes requiring additional components to be added in order to adjust an error in the focal length between lenses);

(4) are made with metals and other materials that erode, deform or rust after continual usage in harsher climates;

(5) unduly expose delicate components in the adapter and in the image modifying devices, e.g., wiring and pin connectors, to the elements during use or assembly; and/or (6) are more expensive to manufacture by including the manufacture and inclusion of such delicate components in the adapters.

SUMMARY

The present invention provides adapter assemblies that are more flexible, simple, quiet, secure, reliable, sturdy, protective, and less expensive than the existing adapters. The invention may include an adapter assembly of two adapters to securely but releasably connect or couple three image modifying devices together. The middle device (also referred to as the second image modifying device) may be a night vision monocular that, without the adapter assembly, could not be coupled to two other image modifying devices compatible with each other, such as a camera and telephoto lens. The middle device is securely but releasably coupled or connected between the two adapters.

Each adapter includes a collar, the inner portion of which receives and securely holds a portion of the middle device therein. The outer portion of each collar is coupled with one of the other image modifying devices (also referred to as the first and third image modifying devices). Each adapter also includes an attachment member attached to or integrally formed with the collar that couples or connects the two adapters to each other. The attachment member of one adapter has a female electric connector and dowels that mate with or connect or couple with a male electric connector and holes or cavities in the attachment member of the other adapter.

The mechanisms or configuration used to assemble the devices with the adapters are quieter and securely releasable. There are no snapping buckles and there are no surfaces (metal or plastic) that loudly strike against other surfaces during assembly or disassembly. Thus, the system and method does not produce excessive noise that may jeopardize the safety and reveal the location of our servicemen during combat or similar situations.

The middle device is held on either end by the inner portion of the collar on each adapter. One collar may include one or more channels and a locking mechanism. The channels slidably receive mating members (such as pins or dowels or posts on an outer surface of the middle image modifying device), and the locking mechanism secures the position of the mating member in the channel. The locking mechanism may be a screw that extends through an opening into the top channel, and that when inserted, blocks movement of the mating member back out of the channel. The other collar may include a gripping mechanism to hold onto the other end of the middle imaging device. The gripping mechanism may include a screw running through an opening in the collar, that when further inserted, presses down on the middle device, and may press an outer surface of the middle device against an inner surface of the collar. The mechanisms and configurations of how each collar holds the middle device are interchangeable or one of the above-described mechanisms and configurations may be used on both collars to retain and hold the middle imaging device between them.

Each attachment member may also include electric wiring contained therein that are connected on one end to the electric connectors in the attachment member, and at the other end to electric interfaces or connectors in the collar of each adapter. The electric wiring and interface allow a front image modifying device (also referred to as a first image modifying device) to be electrically connected to the back image modifying device (also referred to as a third image modifying device), while electrically isolating the middle or second image modifying device. If the camera is the first image modifying device, a night vision minimonocular is the middle image modifying device, and a telephoto lens is the third image modifying device, then the camera may still be electrically connected to the telephoto lens, while the minimonocular may be electrically isolated from the two (and operating with its own battery or other independent power source). Each collar may also include engraved or printed markings either with fluorescent, phosphorescent, reflective or other illuminable materials or ink (whether illuminated independently or by a power source) to allow the three devices and adapters to be easily assembled in a darkened or less clear environment.

At least part of the adapter assembly may be made of a hardened plastic material, such as Delrin®, or other acetal homopolymers, that, unlike metal, does not corrode, deform or rust, and is easily and accurately molded or machined by automated manufacturing systems in high volume. Additionally, one or more of the devices and/or the adapters may be painted with a camouflage print or style for desert and/or jungle conditions, to further conceal and provide additional coverage for servicemen using this equipment during combat and other similar conditions.

In an example embodiment, an adapter system includes a first adapter configured to couple a first image modifying device, e.g., a lens, with a second image modifying device, e.g., a night vision monocular. The proximal portion of the first adapter is configured to be connected to the first image modifying device. The distal portion of the first adapter is configured to be connected to the second image modifying device. The distal portion includes a first channel and a locking mechanism. The first channel is configured to receive a first mating member on the second image modifying device. The locking mechanism is selectively engageable to releasably secure a position of the first mating member in the first channel.

In an example embodiment, an adapter system includes a first adapter configured to couple a first image modifying device with a second image modifying device. A distal portion of the first adapter is configured to be connected to the first image modifying device. A proximal portion of the first adapter is configured to be connected to the second image modifying device. The proximal portion includes a locking mechanism. The locking mechanism includes a threaded opening through a periphery of the proximal portion and a screw. The screw is long enough to extend through the opening and to push an outer surface of the distal portion of the second image modifying device against an inner surface of the proximal portion of the first adapter when the screw is further inserted through the opening.

In an example embodiment, the first image modifying device is connected to the proximal portion of a first adapter. A first mating member on the proximal portion of the second image modifying device is inserted into a first channel in a distal portion of the first adapter. After the insertion step, a position of the first mating member on the second image modifying device is secured in the first channel.

In an example embodiment, the first image modifying device is connected to the distal portion of the first adapter. A screw on the proximal portion of the first adapter is rotated through an opening through a periphery of the proximal portion of the first adapter until a lower end of the screw presses against an upper portion of the outer surface of the distal portion of the second image modifying device.

In an example embodiment, the present invention may also relate to an adapter system. The adapter system may include a first adapter configured to couple a first image modifying device with a second image modifying device, a proximal portion of the first adapter configured to be connected to the first image modifying device, a distal portion of the first adapter configured to be connected to the second image modifying device. The distal portion may include a first channel and a locking mechanism, the first channel configured to receive a first mating member on the second image modifying device, and the locking mechanism selectively engageable to releasably secure a position of the first mating member in the first channel. In addition, the adapter system may include a second adapter releasably connectable to the first adapter, the second adapter being configured to couple the second image modifying device to a third image modifying device, a distal portion of the second adapter being configured to be connected to the third image modifying device, and a proximal portion of the second adapter is configured to be connected to the second image modifying device. Advantageously, at least one of the first and second adapters may comprise a second locking mechanism for locking the first and second adapters to each other, the second locking mechanism also maintaining the connection between the proximal portion of the second adapter and the second image modifying device.

In an example embodiment, the present invention may also relate to an adapter system. The adapter system may include a first adapter configured to couple a first image modifying device with a second image modifying device, a proximal portion of the first adapter configured to be connected to the first image modifying device, a distal portion of the first adapter configured to be connected to the second image modifying device. The distal portion may include a locking mechanism, the locking mechanism including a pin configured to be received within a groove on the second image modifying device, the locking mechanism selectively engageable against a biasing force of a spring to releasably secure a position of the pin in the groove. Also, the adapter system may include a second adapter releasably connectable to the first adapter, the second adapter being configured to couple the second image modifying device to a third image modifying device, a distal portion of the second adapter being configured to be connected to the third image modifying device, and a proximal portion of the second adapter is configured to be connected to the second image modifying device. At least one of the first and second adapters may comprise a second locking mechanism for locking the first and second adapters to each other, the second locking mechanism also maintaining the connection between the proximal portion of the second adapter and the second image modifying device.

According to an example embodiment, an adapter system includes a first adapter configured to couple a first image modifying device with a second image modifying device, a proximal portion of the first adapter being arranged to be connected to the first image modifying device, a distal portion of the first adapter being configured to be connected to the second image modifying device. The distal portion is arranged to mate with the second image modifying device via a pin-and-channel coupling, the distal portion including a locking mechanism selectively engageable to releasably secure the pin-and-channel coupling. The example system further includes a second adapter releasably connectable to the first adapter, the second adapter being arranged to couple the second image modifying device to a third image modifying device, a distal portion of the second adapter being arranged to be connected to the third image modifying device. A proximal portion of the second adapter is configured to be connected to the second image modifying device. The example system further includes an extension member attached to one of the first and second adapters and having a first position, in which the extension member is arranged to direct a beam of infrared light onto an object within an image received by the second image modifying device.

The extension member may be movable between the first position and a second position, the extension member extending a greater lateral distance from the one of the first and second adapters when the extension member is in the second position. The extension member may be connected to the one of the first and second adapters via a hinge, the extension member being rotatable about the hinge between the first and second positions. The extension member may be attached to the first adapter, the extension member extending from the hinge toward the second adapter when the extension member is in the second position. The extension member may rotate 90 degrees between the first and second positions.

The first image modifying device may be a lens. The third image modifying device may be at least one of an optical viewing piece and a camera, and the second image modifying device is a night-vision monocular.

At least a portion of the adapter system may be made of a hardened plastic substance. The hardened plastic substance may be a type of an acetal homopolymer.

The locking mechanism may include a threaded opening through a surface in the distal portion into an interior of a channel of the pin-and-channel connection and a screw having a length sufficient to extend through a length of the opening into the channel and to at least partially block a portion of the channel when the screw is further inserted through the opening. An upper portion of the screw may include at least one of a ring therethrough and a member hingedly fixed thereon, the at least one of the ring and the member having a width sufficient to facilitate manual rotation of the screw.

According to an example embodiment, an adapter system includes a first adapter configured to couple a first image modifying device with a second image modifying device, a proximal portion of the first adapter configured to be connected to the first image modifying device, a distal portion of the first adapter arranged to be connected to the second image modifying device. The distal portion is arranged to mate with the second image modifying device via a pin-and-channel coupling, the distal portion including a locking mechanism selectively engageable to releasably secure the pin-and-channel coupling. The example device also includes a second adapter releasably connectable to the first adapter, the second adapter being arranged to couple the second image modifying device to a third image modifying device, a distal portion of the second adapter being arranged to be connected to the third image modifying device, and a proximal portion of the second adapter being configured to be connected to the second image modifying device. At least one of the first and second adapters includes a relay lens and an adjustment mechanism arranged to allow manual adjustments to the relay lens.

The adjustment mechanism may include an adjustment element that extends through and slides along a slot in the at least one of the first and second adapters to adjust the relay lens. The adjustment element may be a thumbscrew. The adjustment mechanism may further include a setting element arranged to set the relay lens in its adjusted position. The setting element may be a thumbscrew arranged to function as a setscrew. The at least one of the first and second adapters may include a second setscrew configured to set the relay lens in its adjusted position.

The first image modifying device may be a lens, the third image modifying device may be at least one of an optical viewing piece and a camera, and the second image modifying device may be a night-vision monocular.

At least a portion of the adapter system may be made of a hardened plastic substance. The hardened plastic substance may be a type of an acetal homopolymer.

The locking mechanism may include a threaded opening through a surface in the distal portion into an interior of a channel of the pin-and-channel connection and a screw having a length sufficient to extend through a length of the opening into the channel and to at least partially block a portion of the channel when the screw is further inserted through the opening. An upper portion of the screw may include at least one of a ring therethrough and a member hingedly fixed thereon, the at least one of the ring and the member having a width sufficient to facilitate manual rotation of the screw.

BRIEF DESCRIPTION OF THE DRAWINGS

FIGS. 33($a$) to 44 illustrate various views of an optics system, along with details of various components of same, according to an embodiment of the present invention.

DETAILED DESCRIPTION

The present invention relates to an optical adapter system and method. FIGS. 1 through 20 illustrate various aspects of the optical adapter system and method according to the present invention.

Figure 1:
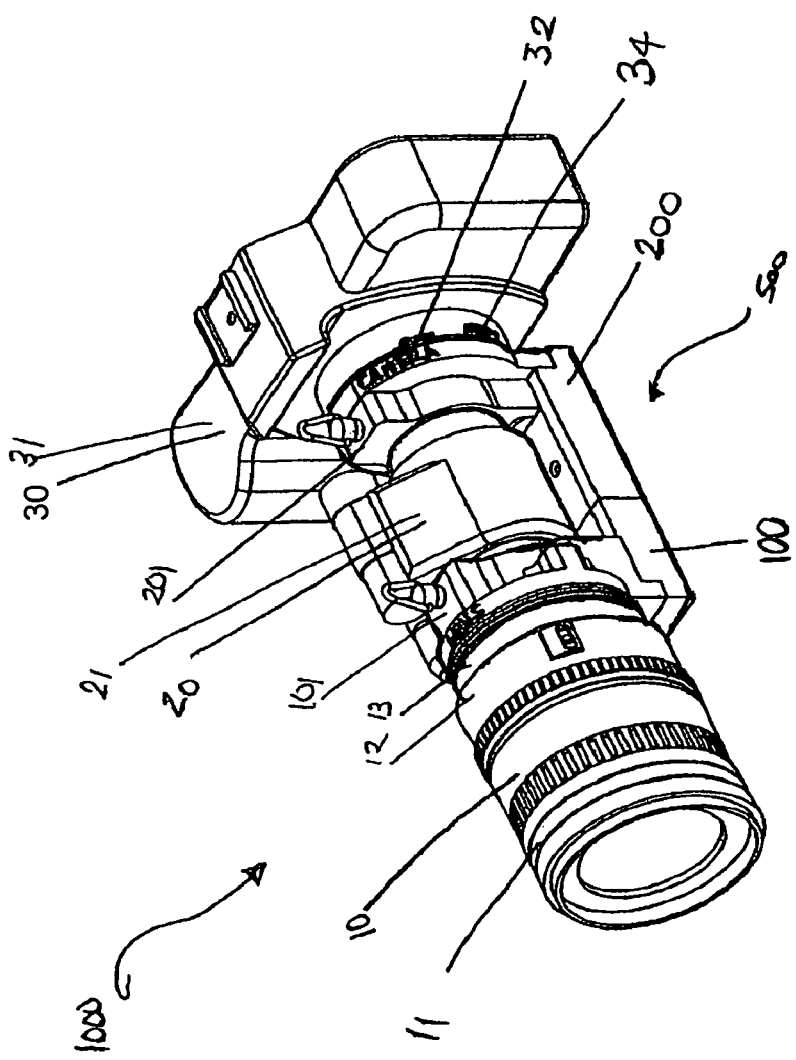
FIG. 1 illustrates a perspective view of an embodiment of an optical adapter system and method according to the present invention.
Figure 2:
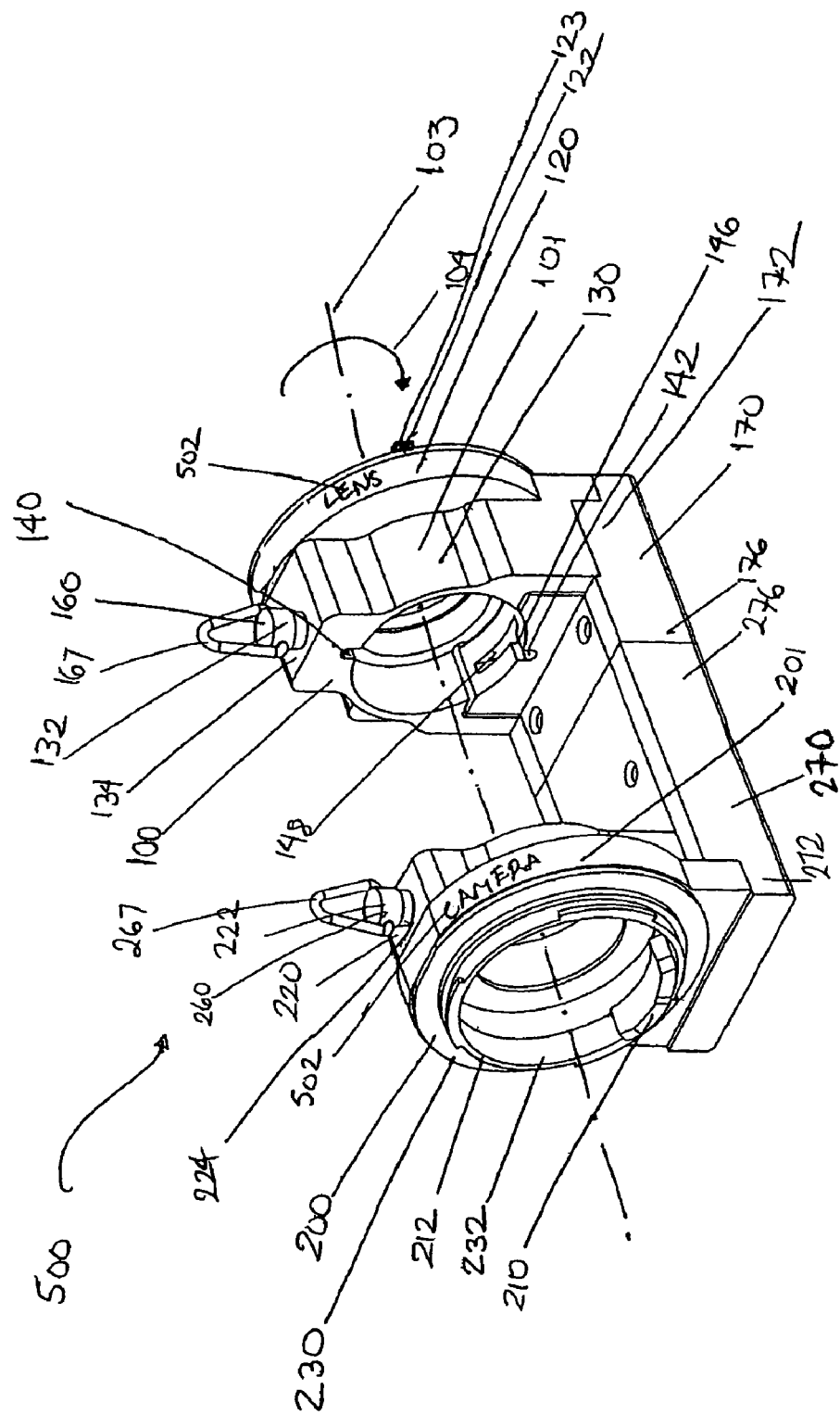
FIG. 2 illustrates a perspective view of first and second adapters in the embodiment of the optical adapter system and method of FIG. 1.

As illustrated in FIGS. 1 and 2, the optical adapter system 1000 includes an adapter assembly 500 to releasably connect image modifying devices 10, 20 and 30 to each other. One or more of the image modifying devices 10, 20, and 30 may be part of a standard optical assembly. For example, as illustrated in FIG. 1, the first and third image modifying devices 10 and 30 may be part of a standard lens 11 camera 31 assembly that are configured to be directly connected or coupled with each other. The second image modifying device 20 may be a night vision monocular 21, part of a standard night vision optical assembly, that without the adapter assembly 500, could not be otherwise connected, coupled or functional with the camera-lens assembly.

The term "image modifying device" is used herein in a more expansive, rather than a limited sense, and encompasses any device or assembly or component or portion thereof that processes any visual image information, including by generating, capturing, altering, transmitting, rendering, recording, storing, playing back, encoding or decoding originally live images or digitally created images, either alone, or with additional types of information, e.g., sound or other sensory-related information. For example, "image modifying devices" may refer to analog or digital cameras, telephoto lenses and other types of lenses and filters, night vision monoculars, eyepieces, fiber optic viewers, camcorders, digital or analog video cameras, visual image processors, display screens, monitors, rifle or gun scopes, spotting scopes, telescopes, binoculars, laser rangefinders, bow sights, mortar sights, anti-tank sights, anti-aircraft sights, infared cameras, image pickup devices, gyro stabilized and digitally stabilized optics, film-type cameras, devices that transform an image into electrical signals such as still or video cameras of the digital or analog type, image recording devices, image pickup heads, or flying spot scanners, or any component or portion or accessory to any of the foregoing.

Image modifying devices may alter visual information, e.g., by changing the brightness, intensity, magnification, color and/or filed of view of an image. Image modifying devices may include image intensifying or generating technologies such as night vision, infrared, thermal imaging, and/or sonar, ultrasound, electrical and radio imaging technologies. Optical assemblies of first and third image modifying devices 10 and 30 may be standard optical assemblies that are available off-the-shelf, e.g., camera-telephoto lens assemblies, monocular-telephoto lens assemblies, and/or rifle or gun scopes. Such optical assemblies may not be directly compatible or operational with a second image modifying device 20, without the use of adapter assembly 500.

The adapter assembly 500, as illustrated in FIGS. 1 through 4, includes first adapter 100 and second adapter 200. The first adapter 100 is configured to connect the first image modifying device 10 to the second image modifying device 20. The second adapter 200 is configured to connect the second image modifying device 20 to the third image modifying device 30. Although each adapter is described below with a particular configuration for releasably but securely connecting or coupling with the image modifying devices and with each other, the connecting or coupling configurations are interchangeable between each of the adapters, as are the image modifying devices. At least a portion or all of adapters 100 and 200 may be made from a hardened plastic substance, such as Delrin®, an acetal homopolymer made by DuPont Corporation. Such material can be readily manufactured, and is not subject to the same deformation and rust and wear and tear of metal components. "CAMERA" and "LENS" markings 502 (as well as other markings) on adapter assembly may be visually enhanced by being engraved with fluorescent or phosphorescent materials or otherwise illuminable from an electrical source in adapters 100 and/or 200, or from an electrical connection to the first or third image modifying devices 10 and 30. Additionally parts of the assembly may be painted with camouflage cover to provide additional cover for the user.

As illustrated in FIGS. 2 through 7, and FIGS. 10, and 12 through 15, the first adapter 100 includes a collar 101 having a proximal portion 120 and a distal portion 130, and an attachment member 170 attached to the distal portion 130 (attachment member 170 also being regarded as part of the distal portion 130 and may be integrally formed as part of collar 101 or a separate piece attached to collar 101).

The illustrated collar 101 is closed when attached to attachment member 170, but the collar 101 may also be open, or more of a casing or housing in other embodiments. Proximal portion 120 is configured with a mechanism 122 to mechanically connect or couple the first adapter 100 to the lens 11, and an electric connector 110 to electrically connect or couple the first adapter 100 to the lens 11. Mechanism 122 as illustrated, inter alia, in FIG. 6, includes a twist and lock mechanism 123 configured to be releasably but securely connected or coupled with the matching interface 13 on the distal portion 12 of the lens 11. Electrical connector 110 may include depressible pins 112, as illustrated, that are securely attached within collar 101. Mechanism 122 and connector 110 may be similar or the same as the mechanism 32 (or match the manner in which mechanism 32) on camera 33, illustrated in FIG. 1, that enables the camera 33 to be directly mechanically and electrically connected or coupled with the lens 11. In the case of the camera 33 and lens 11 being standard off-the-shelf designs, the mechanism 122 and connector 110 may have a standard configuration to couple or connect a variety of lenses 11 with a variety of other image modifying devices 200 and 300 in optical adapter systems 1000.

Figure 7:
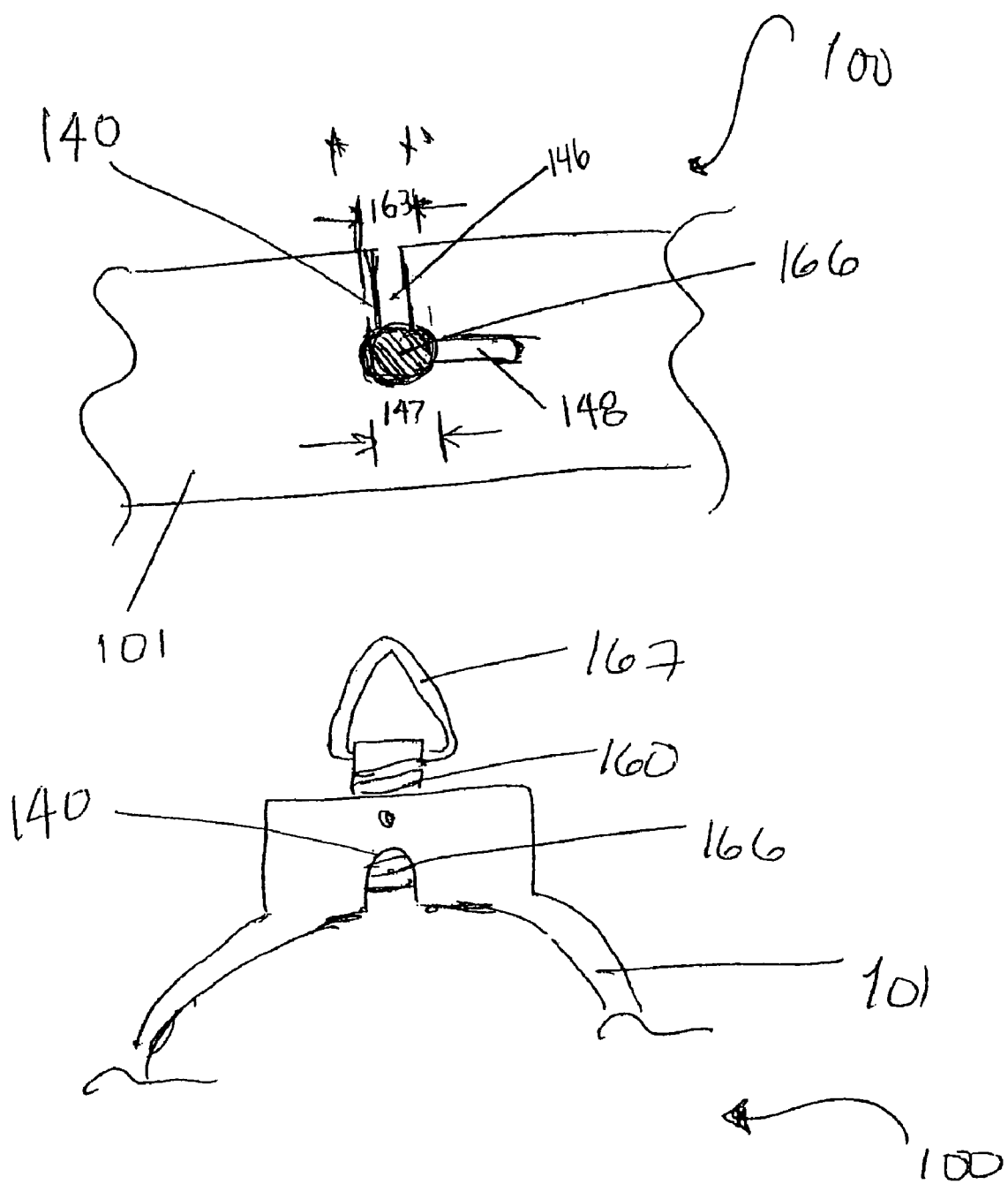
FIG. 7 illustrates partial underside and side views of the top portion of the first adapter in the embodiment of the optical adapter system and method of FIG. 1.

The distal portion 130 of the collar 101 is configured to receive the proximal portion 22 of the night vision monocular 21, as illustrated in FIGS. 2 through 7, and FIGS. 10, and 12 through 15. The distal portion 130 includes a locking mechanism 132 and two channels 140 and 142 to securely but releasably couple or connect the distal portion 130 of first adapter 100 with the proximal portion 22 of the night vision monocular 21 (sometimes referred to as a "monoloc"). Each channel 140, 142 is configured to receive a mating member 25, 28 on the proximal portion 22 of night vision monocular 21. Locking mechanism 132 is designed to secure a position of upper mating member 25 in upper channel 140, or, in other words, at least partially obstruct or prevent movement of mating member 25 out of channel 140. Mating member 25 may have some freedom of movement within upper channel 140, e.g., within portion 148 of channel 140 as illustrated in FIG. 7, when the position of the mating member 25 is secured by locking mechanism 132, provided that mating member 25 is not readily removable from the upper channel 140 once locking mechanism 132 is engaged in upper channel 140. Additionally, securing a position of mating member 25 in channel 140 may include sufficiently securing the focal length between lenses in the first image modifying device 10 and the second image modifying devices 20, so that the two image modifying devices may be usable together.

Figure 10:
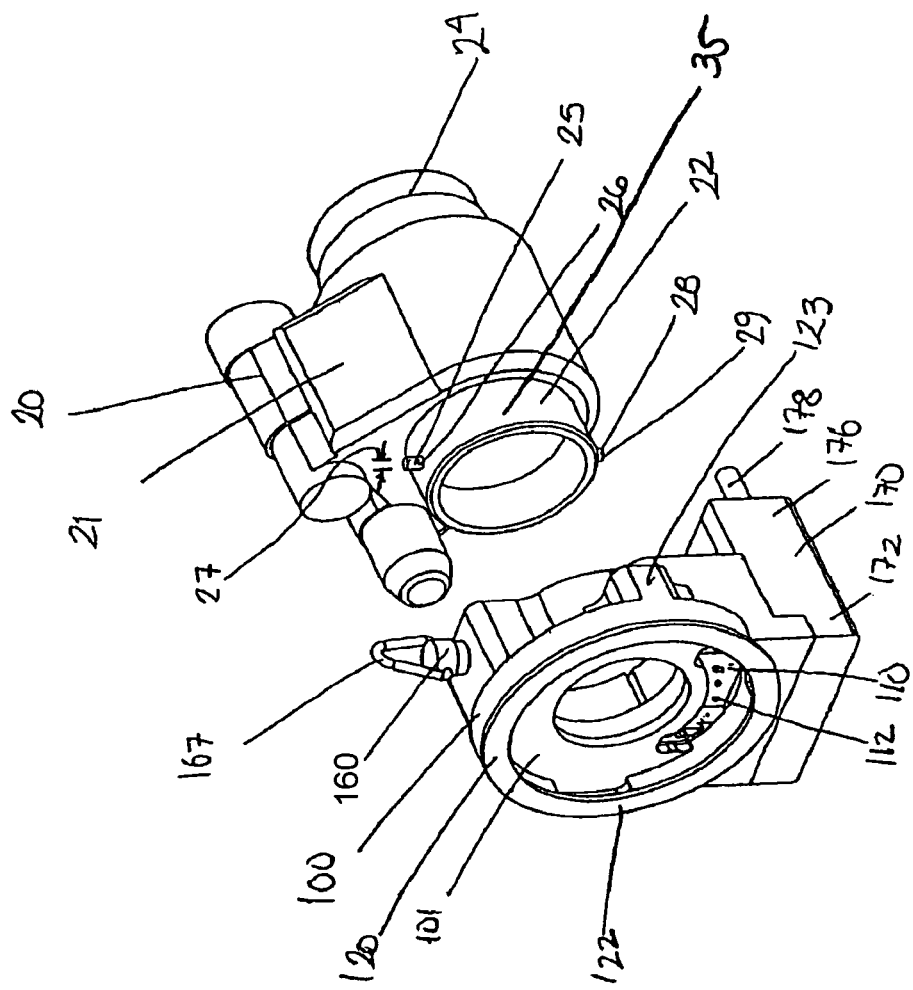
FIG. 10 illustrates a perspective view of a first adapter and a night vision monocular in the embodiment of the optical adapter system and method of FIG. 1.
Figure 11:
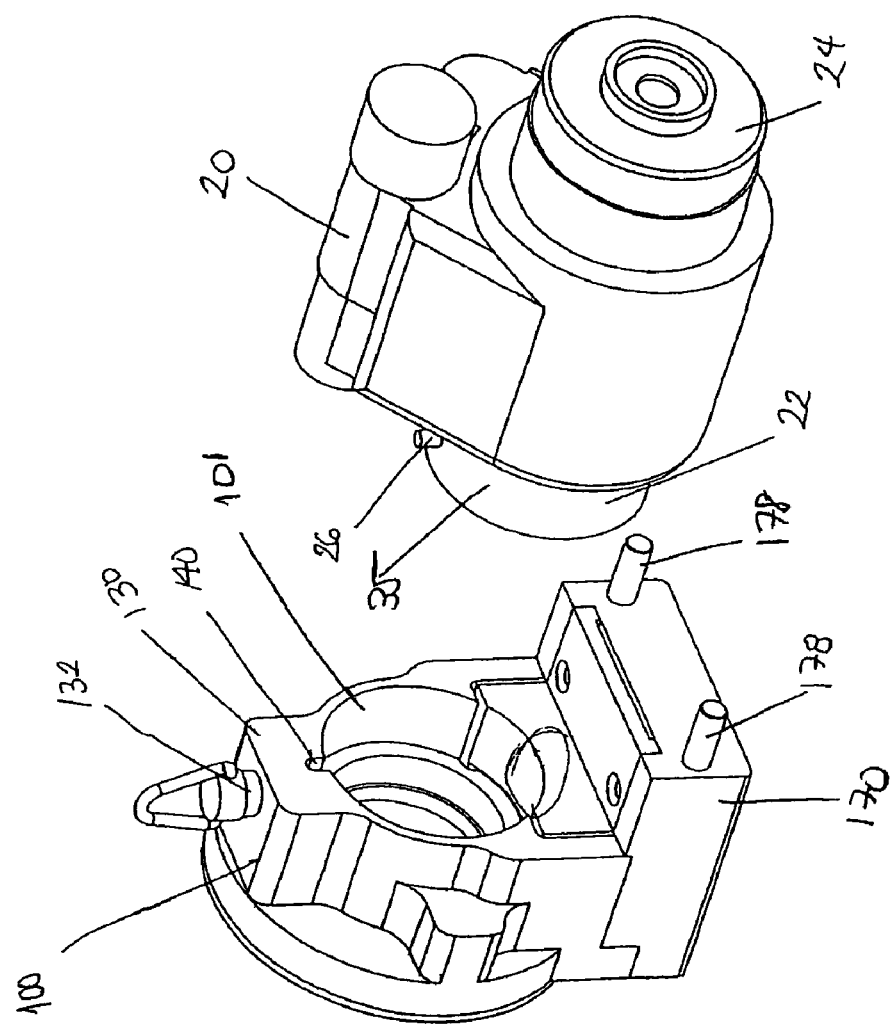
FIG. 11 illustrates a perspective view of a first adapter and a night vision monocular in an embodiment of an optical adapter system and method according to the present invention.
Figure 12:
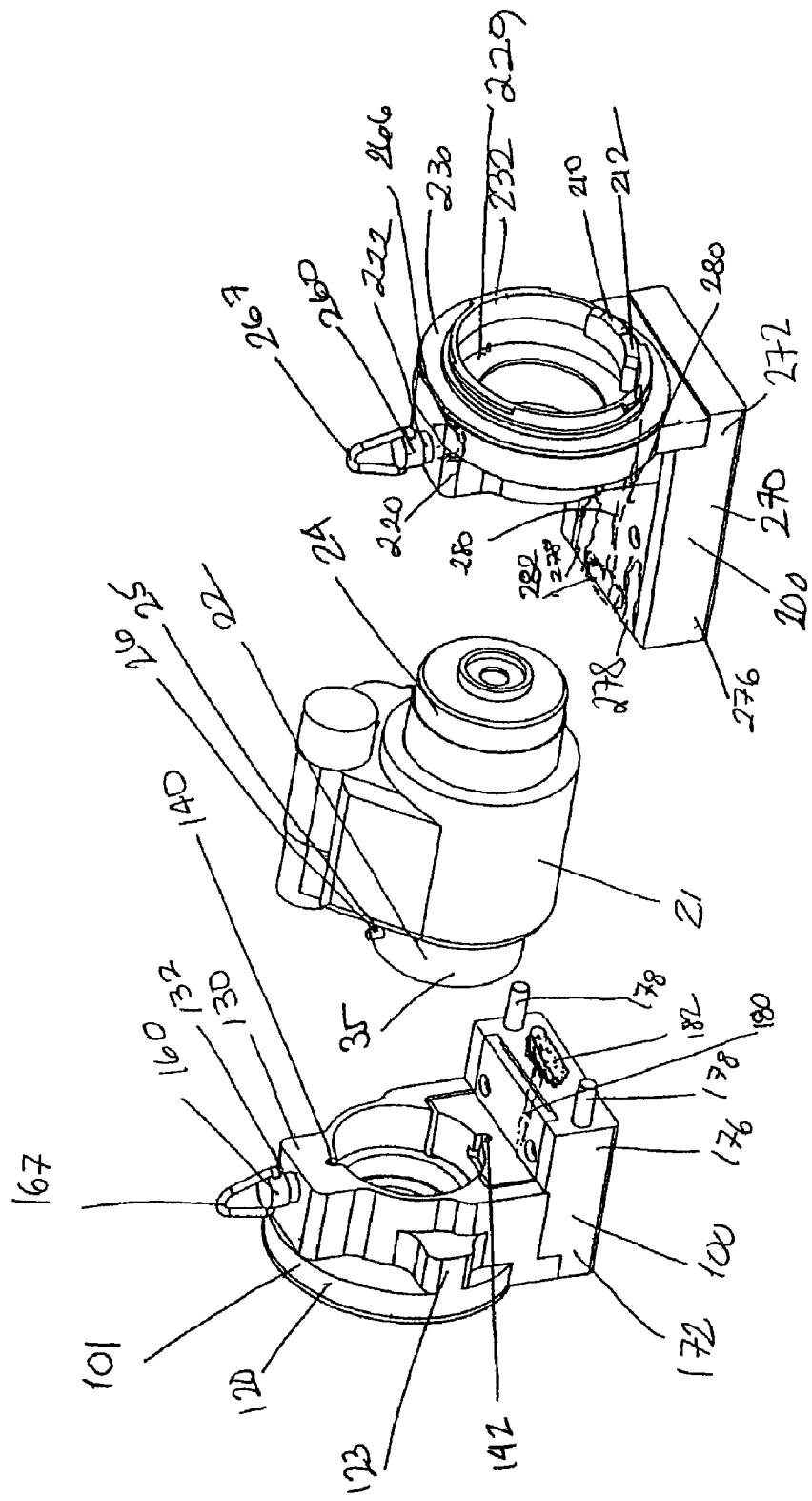
FIG. 12 illustrates a perspective view of the first adapter, the night vision monocular, and the second adapter in the embodiment of the optical adapter system and method of FIG. 1.
Figure 13:
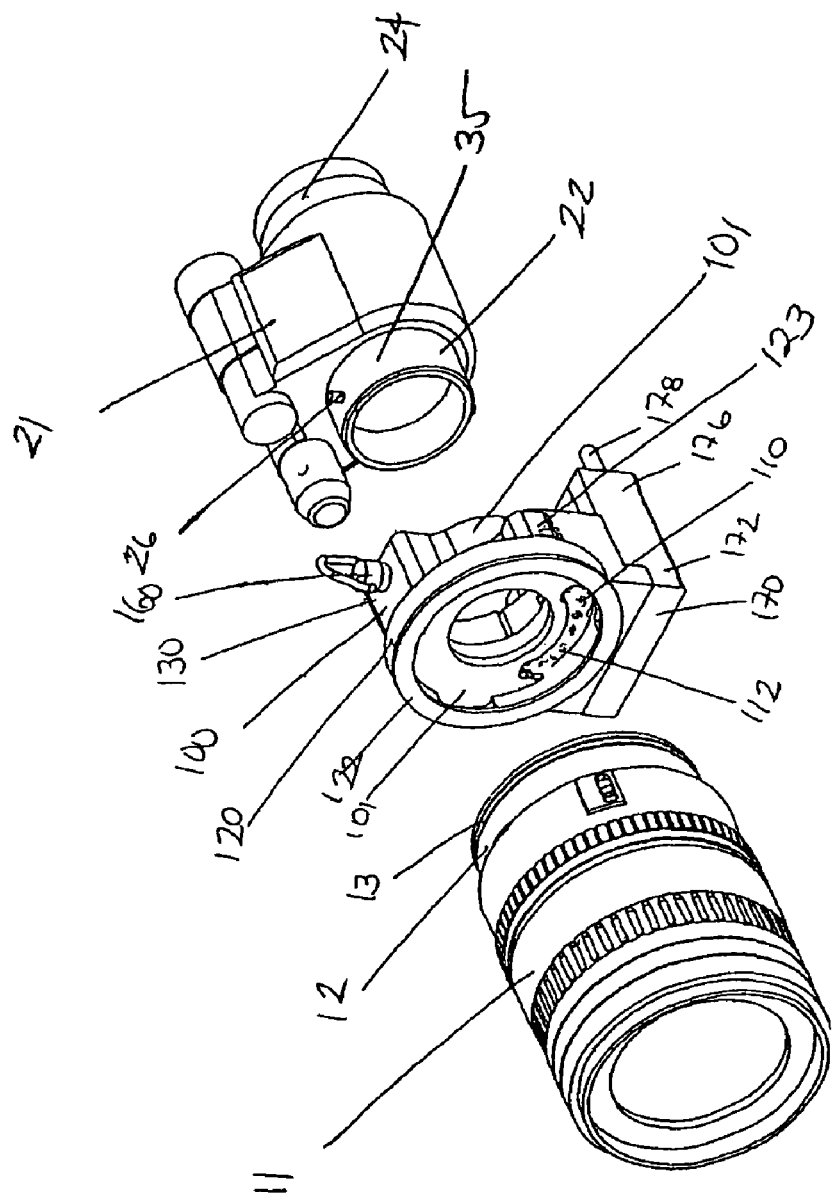
FIG. 13 illustrates a perspective view of a lens, the first adapter, and the night vision monocular in the embodiment of the optical adapter system and method of FIG. 1.
Figure 14:
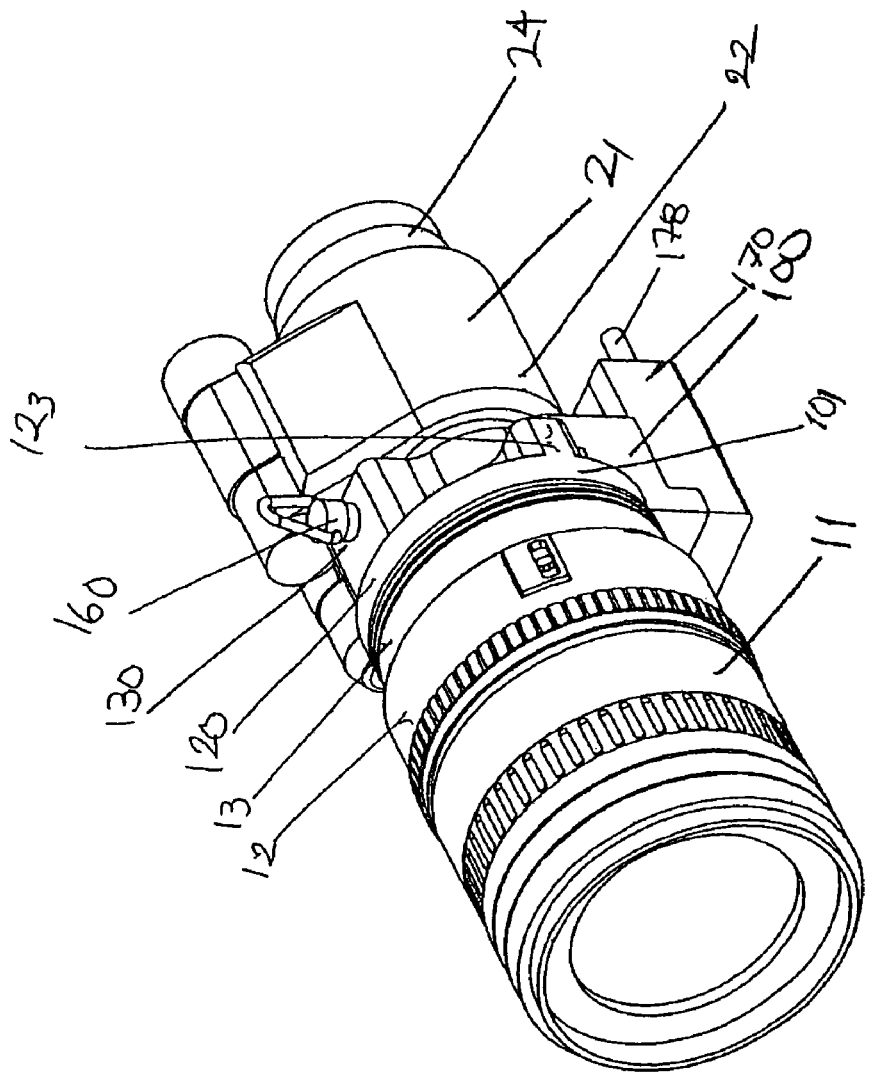
FIG. 14 illustrates a perspective view of an assembly of the lens, the first adapter and the night vision monocular of FIG. 13.
Figure 15:
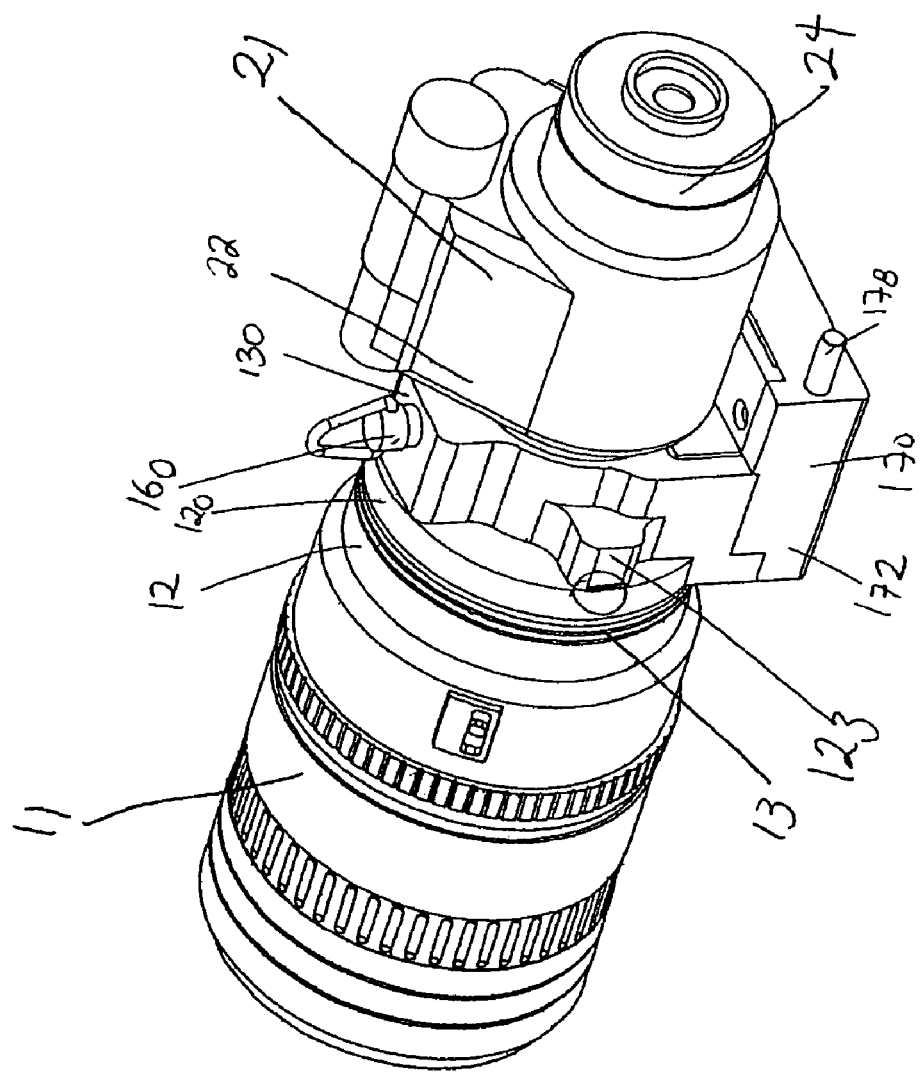
FIG. 15 illustrates a perspective view of an assembly of the lens, the first adapter and the night vision monocular of FIG. 13.

Mating members 25 and 28, of night vision monocular 21 or any other second image modifying device 20, extend from an outer surface thereof and may be cylindrical hollow or solid posts or pins 26 and 29, as illustrated in FIGS. 10, 12 and 13. Each of pins 26 and 29 has a diameter 27 less than a width 144 of each respective channel 140 and 142, so that pins 26 and 29 may be free to move through channels 140 and 142 as the proximal portion 22 of night vision monocular 21 is inserted into the distal portion 130 of collar 101. Pins 26 and 29 may be diametrically opposite from each other, as illustrated, as well as corresponding channels 140 and 142 that receive pins 26 and 29.

Figure 3:
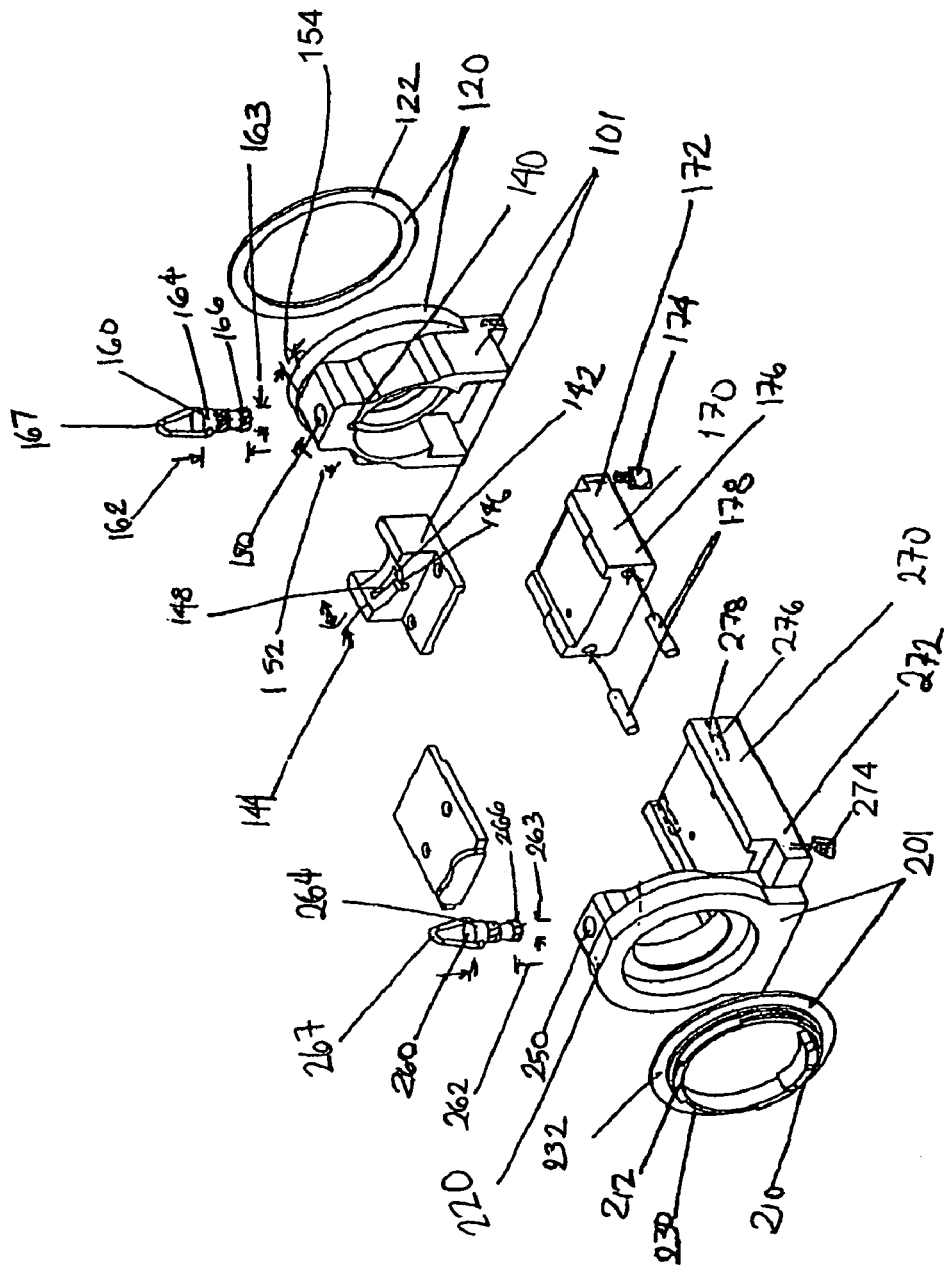
FIG. 3 illustrates an exploded view of the first and second adapters in the embodiment of the optical adapter system and method of FIG. 1.
Figure 4:
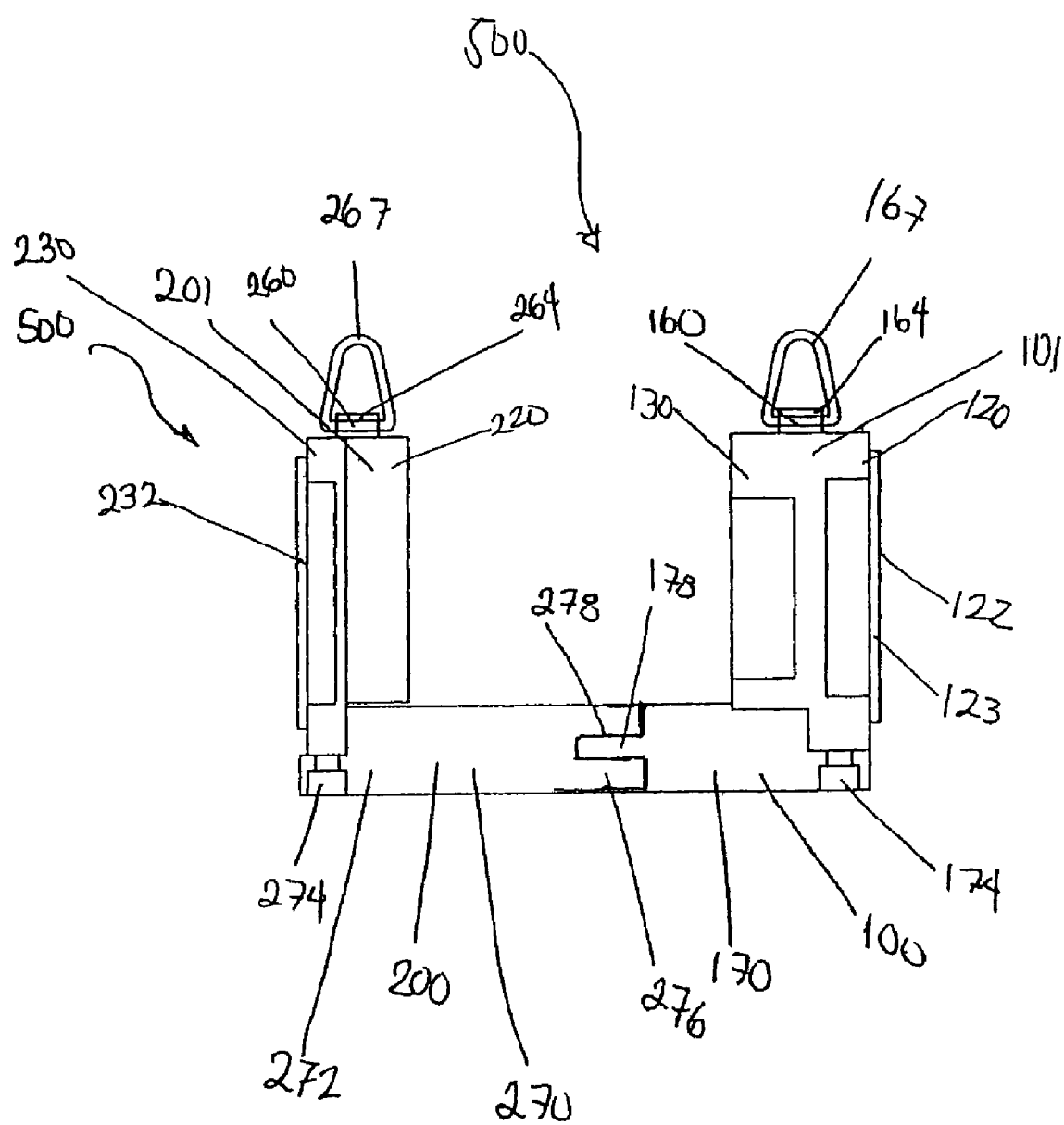
FIG. 4 illustrates a side view of the first and second adapters in the embodiment of the optical adapter system and method of FIG. 1.
Figure 5:
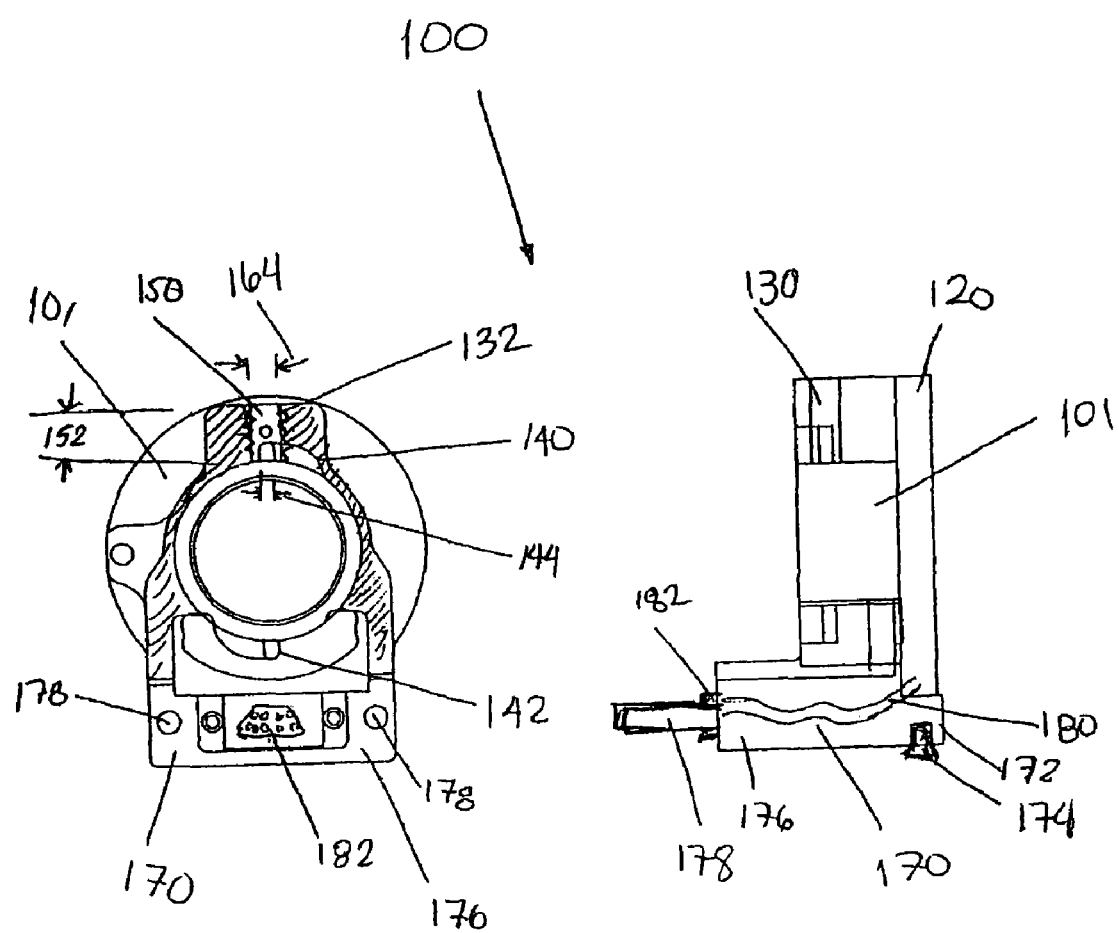
FIG. 5 illustrates a cross sectional inner view and a side view of a collar and an attachment member in the first adapter in the embodiment of the optical adapter system and method of FIG. 1.
Figure 6:
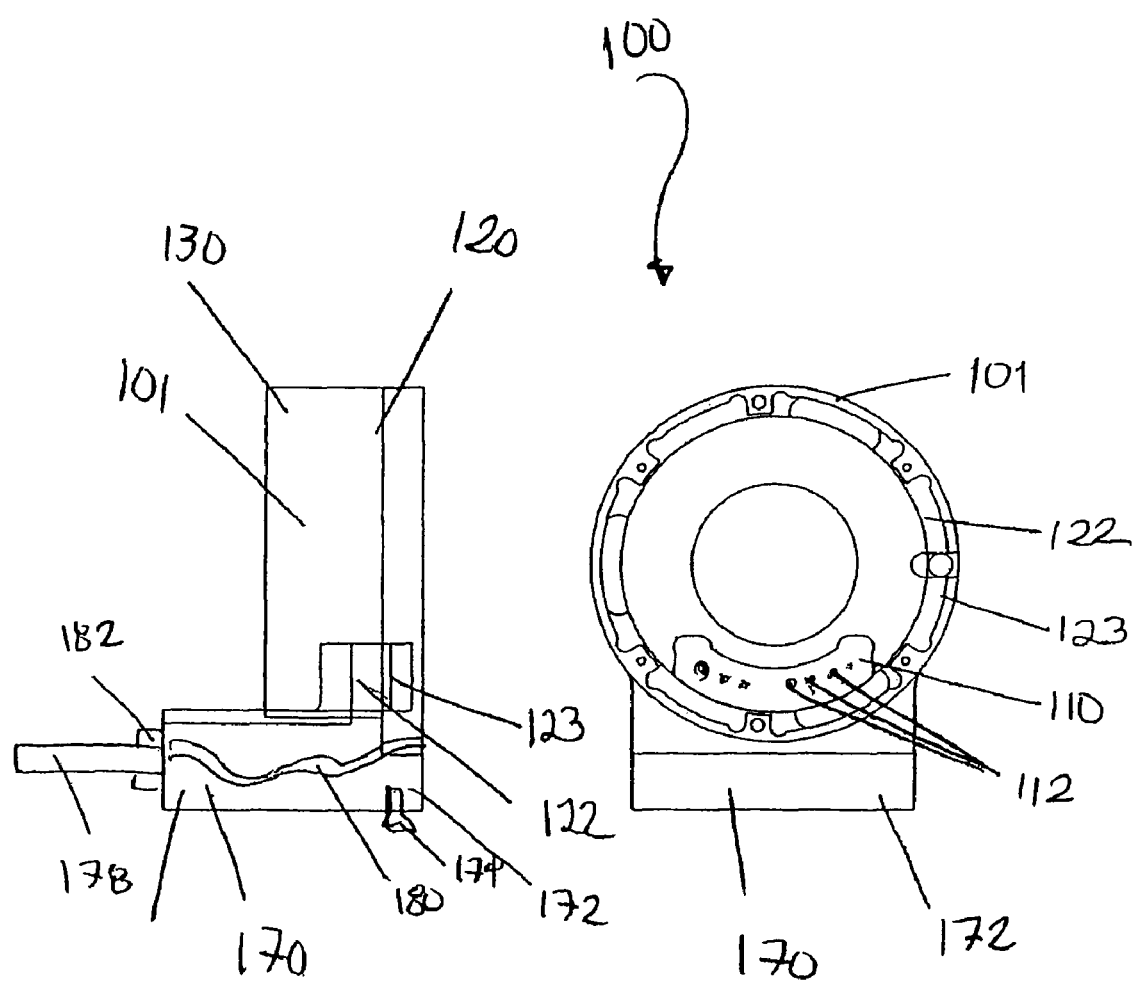
FIG. 6 illustrates outer and side views of the collar and attachment member in the first adapter in the embodiment of the optical adapter system and method of FIG. 1.

Locking mechanism 132 includes an opening 150 through a surface or periphery 134 in the distal portion 130 of collar 101, and a screw 160 configured to be threadably receivable therethrough, as illustrated in FIGS. 3, 5 and 7. Opening 150 is at least partially threaded and runs through a cross section of surface or periphery 134 into upper channel 140. Screw 160 may have a ring or member, such as d-ring 167 on top 164, to make it easier to manually rotate screw 160 in clockwise and counterclockwise directions. Additionally, d-ring 167 on first adapter 100, either alone or together with d-ring 267 on second adapter 200, allow adapter assembly 500 or the entire optical adapter assembly 1000 to be securely threaded and tied onto or around other gear or equipment (not shown), making the assembly 1000 or any portion thereof easier to carry around.

Screw 160 has a length 162 sufficient to extend through a length 152 of opening 150 to at least partially block a portion of channels 140 and 142 when screw 160 is further inserted through opening 150. Thus, screw 160 is longer than the length 152 of opening 150, and has a diameter 163 less than a diameter 154 of opening 150 to be threadably inserted therethrough. Screw 160 also has diameter 163 less a width 147 in channel 140, so that bottom portion 166 of screw 160 can be received in and obstruct channel 140 as illustrated in FIG. 7, and secure a position of mating member 25 of night vision monocular 21 therein.

Each channel 140, 142 runs a path that allows mating members 25 and 28 to be securely but releasably inserted therein as the proximal portion 22 of night vision monocular 21 is inserted into distal portion 130 of collar 101. As illustrated in FIGS. 2, 3 and 7, first portion 146 of channels 140 and 142 is parallel to the direction in which the night vision monocular 21 is inserted into the collar 101, and is also parallel to a longitudinal axis 103 of collar 101. Second portion 148 of channels 140 and 142 are perpendicular to first portion 146, and are also parallel to the direction of rotation 103 of night vision monocular 21 in collar 101.

Essentially, in order to secure night vision monocular 21 in collar 101, as illustrated in FIGS. 2, 7, 10, 12 and 14, the proximal portion 22 of night vision monocular 21 is inserted into distal portion 130 of collar 101, sliding pins 26 and 29 through the first portions 146 of channels 140 and 142. The proximal portion 22 of night vision monocular 21 is then rotated inside distal portion 130 of collar 101, sliding pins 26 and 29 through second portions 148 of channels 140 and 142. Finally, in order to secure the night vision monocular 21 in collar 101, locking mechanism 132 is activated or engaged to secure a position of pin 26 in second portion 148 of channel 140 by further screwing or inserting screw 160 through opening 150, until the bottom 166 protrudes into or obstructs channel 140. Night vision monocular 21 can be removed from collar 101 by unscrewing or removing screw 160 upwards through opening, until the bottom 166 clears or no longer obstructs channel 140. The night vision monocular 21 is then rotated and removed to move pins through the second portion 148 and then the first portion 146 of channels 140 and 142.

The channels are illustrated opposite each other as upper and bottom channels 140 and 142. However, many alternative embodiments are possible. For example, channels may be located anywhere on the interior of the distal portion 130 of the collar and have a different path of insertion. Either or both channels may have a locking mechanism. The locking mechanism 132 may be a ball bearing or lip located in an interior of each channel 140 and 142.

Alternatively, the distal portion 130 of the collar 101 may be designed and function with only one channel, and one locking mechanism, and second image modifying device may have only one mating member or pin. As illustrated in FIG. 10, first adapter 100' includes one channel 140' configured to slidably receive pin 26' on second image modifying device 20'. Locking mechanism 132' is configured to secure a position of pin 26' within distal portion 130' of collar 101.'

As illustrated in FIGS. 3 through 6, 8 through 10, and FIGS. 12 and 13, the first adapter 100 includes an attachment member 170 for releasably connecting or coupling first adapter 100 with second adapter 200. Attachment member 170 may be integrally formed with collar 101 or removably attached to collar 101 with screws 174 in proximal portion 172 of attachment member 170. Attachment member 170 includes two means for connecting first adapter 100 to second adapter 200, one mechanical and one that is both electrical and mechanical. First, attachment member 170 includes two dowels 178 in distal end 176 configured to be inserted in corresponding holes in proximal end 276 of attachment member 270 of second adapter 200. Attachment member 170 has female connector 182 at distal end 176 to interface and connect with male connector 282 in proximal end 276 of attachment member 270 of second adapter 200. Attachment member 170 further includes circuitry 180 therein that is connected with female connector 182, and attachment member 270 includes circuitry 280 therein that is connected with male connector 282. Electrical circuitry 180, 280 and female and male connectors 182 and 282, together with electrical connectors 110 and 210 allow lens 11 to be electrically connected to camera 31 through adapter assembly 500, when fully assembled, while electrically isolating the night vision monocular 21 from both lens 11 and camera 31. In alternative embodiments, there may be any number of dowels or posts or pins to attach the first adapter to the second adapter, and the dowels or posts or pins may be included on one or both of the first and second adapters 100 and 200, with corresponding cavities or hopes or openings on either side. Additionally, the female and male electrical connectors 182 and 282 are interchangeable, and may be on either first or second adapter 100 and 200.

As illustrated in FIGS. 2 through 4, and FIGS. 8, 9 and 12, the second adapter 200 includes a collar 201 having a proximal portion 220 and a distal portion 230, and an attachment member 270 attached to the distal portion 230 (attachment member 270 also being regarded as part of the distal portion 230 and may be integrally formed as part of collar 201 or a separate piece attached to collar 201).

Figure 9:
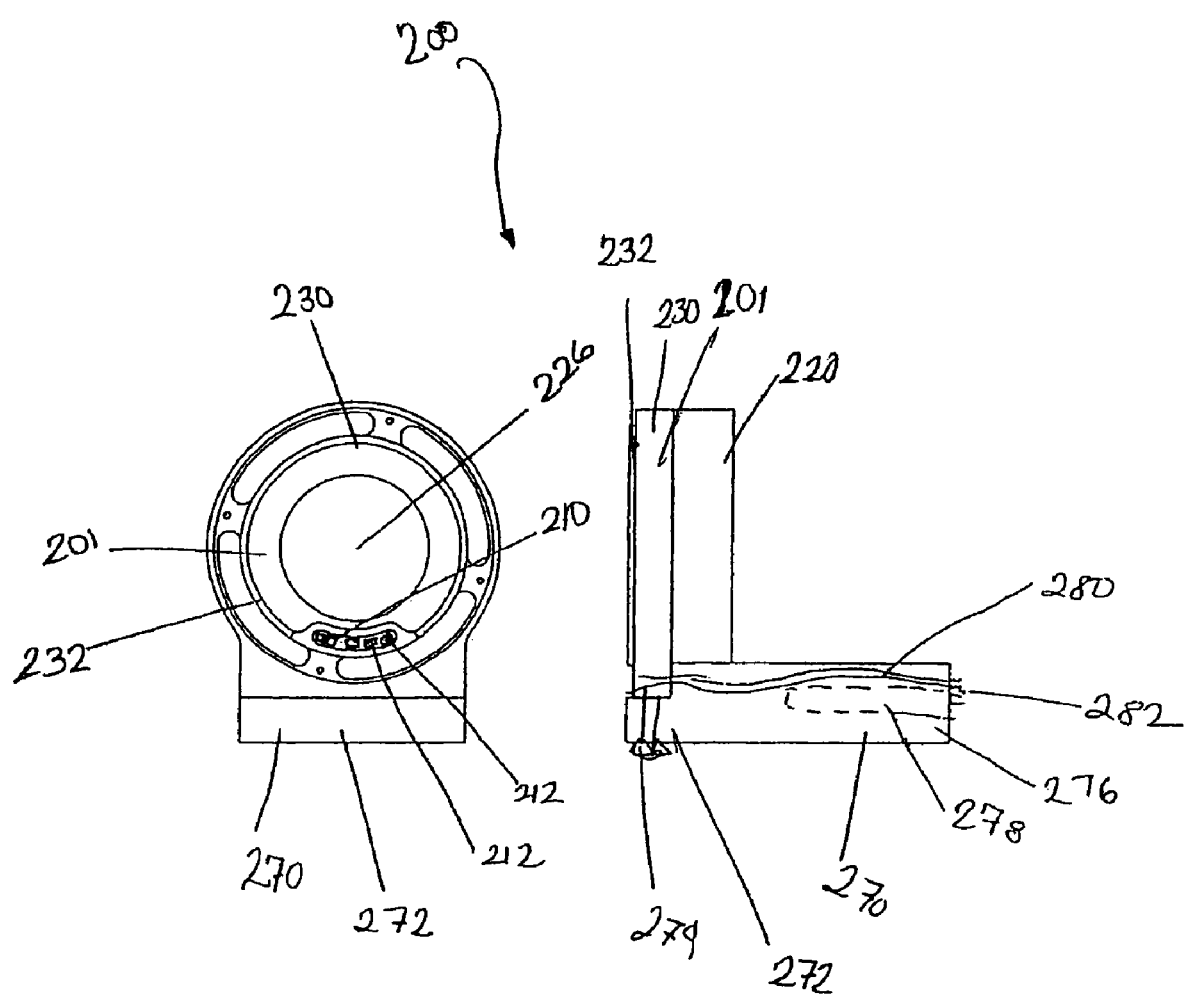
FIG. 9 illustrates outer and side views of the collar and attachment in the second adapter in the embodiment of the optical adapter system and method of FIG. 1.

The illustrated collar 201 is closed when attached to attachment member 270, but the collar 201 may also be open, or more of a casing or housing in other embodiments. Distal portion 230 is configured with an interface 232 to mechanically connect or couple second adapter 200 to the camera 31, and an electric connector 210 to electrically connect or couple second adapter 200 to camera 31. Electrical connector 210 may include metal interface 212, as illustrated, that are securely attached within collar 201. Interface 232 and electrical connector 210 may be similar or the same as the interface 13 (or match the manner in which interface 13) on lens 11 enables lens 11 to be directly mechanically and electrically connected or coupled with the camera 31. In the case of the camera 33 and lens 11 being standard off-the-shelf designs, interface 232 and electrical connector 210 may have a standard configuration to couple or connect a variety of cameras 31 with a variety of other image modifying devices 100 and 200 in optical adapter systems 1000. Interface 232 and electrical connector 210 as illustrated in FIGS. 9 and 12, interacts and matches with a twist and lock mechanism 32 and electrical connection 34 on camera 31, to releasably but securely mechanically and electrically connect or couple camera 31 with second adapter 200 as illustrated in FIG. 1.

Figure 8:
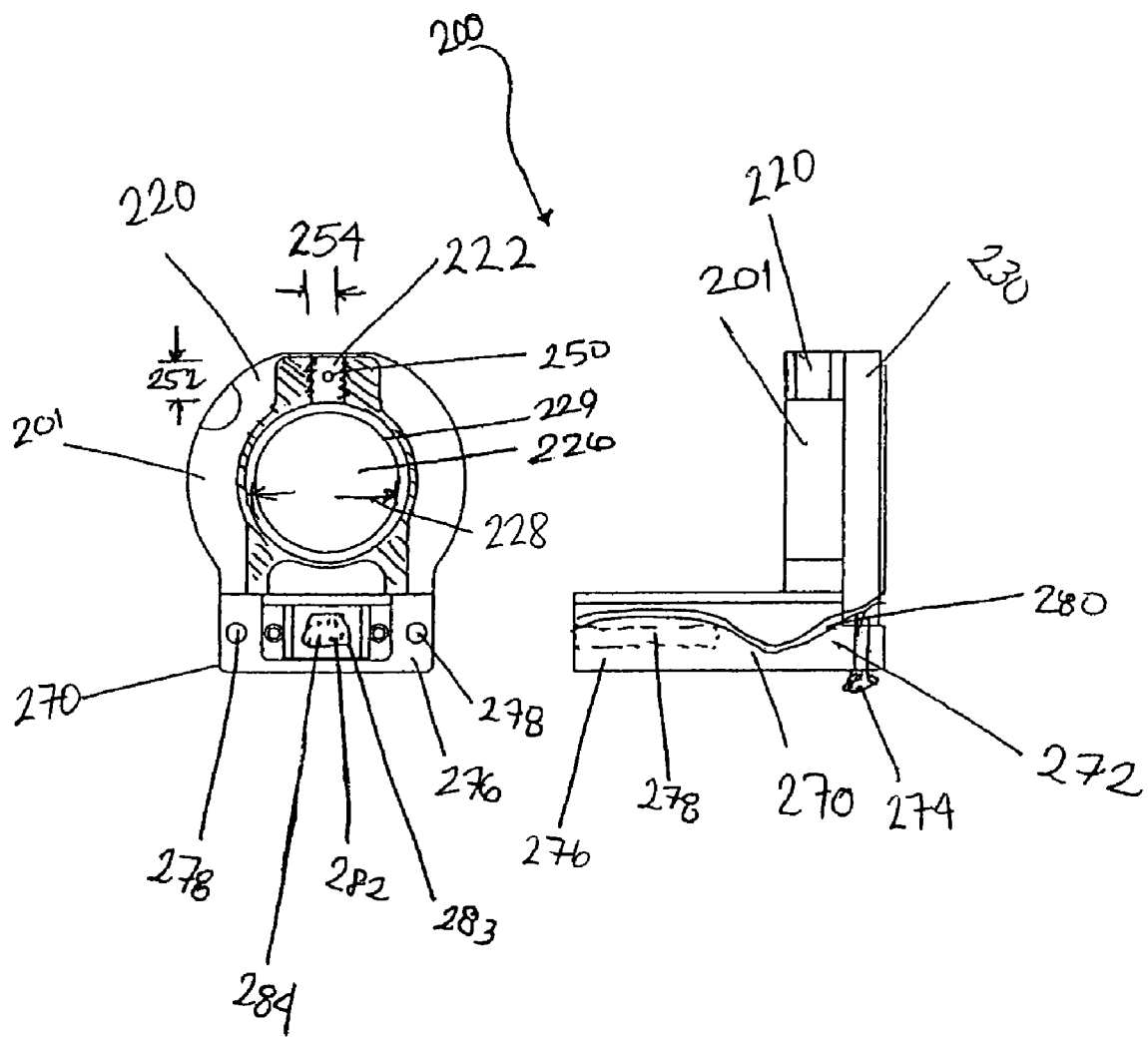
FIG. 8 illustrates a cross-sectional inner view and a side view of a collar and an attachment member in the second adapter in the embodiment of the optical adapter system and method of FIG. 1.

As illustrated in FIGS. 2, 8 and 12, the proximal portion 220 of the collar 201 is configured to receive the distal portion 24 of the night vision monocular 21. The proximal portion 220 includes a mechanism 222 to securely but releasably grip the proximal portion 220 of second adapter 200 with the distal portion 24 of the night vision monocular 21 (sometimes referred to as a "monoloc"). The gripping mechanism 222 an opening 250 through a surface or periphery 224 in the proximal portion 220 of collar 201, and a screw 260 configured to be threadably receivable therethrough. Opening 250 is at least partially threaded and runs through a cross section of surface or periphery 224 into an interior 226 of collar 201, as illustrated in FIG. 8. Screw 260 may have a ring or member, such as the d-ring 267 illustrated in FIG. 3 on top 264, to make it easier to manually rotate screw 260 in clockwise and counterclockwise directions. Additionally, d-ring 267 on second adapter 200, either alone or together with d-ring 167 on first adapter 100, allow adapter assembly 500 or the entire optical adapter assembly 1000 to be securely threaded and tied onto or around other gear or equipment (not shown), making the assembly 1000 or any portion thereof easier to carry around.

Screw 260 is longer than the length 252 of opening 250, and has a diameter 263 less than a diameter 254 of opening 250 to be threadably inserted therethrough. Screw 260 has a length 262 sufficient to extend through a length 252 of opening 250 to reduce inner diameter 228 of collar 201 when screw 260 is further inserted through opening 250. When further inserted through opening 250, bottom 266 of screw 260 pushes or presses distal portion 24 of night vision monocular 21 against proximal portion 220 of collar 201. In addition to bottom 266 of screw 260 acting upon and pressing upon proximal portion 220 of collar 201, the force of the screw 260 on the night vision monocular 21 presses or pushes an outer surface 35 of distal portion 24 of the night vision monocular 21 against inner surface 229 in proximal portion 220 of collar 201.

Essentially, in order to secure night vision monocular 21 in collar 201, the distal portion 24 of night vision monocular 21 is inserted into proximal portion 220 of collar 201, as illustrated in FIG. 12. Then, in order to secure the night vision monocular 21 in collar 201, gripping mechanism 232 is activated or engaged to releasably secure night vision monocular 21 in collar 201 by further screwing or inserting screw 260 through opening 250, until the bottom 266 pushes or presses down on distal portion 24 of night vision monocular 21. Night vision monocular 21 can be removed from collar 201 by unscrewing or removing screw 260 upwards through opening, until the bottom 266 clears inner surface 229 of collar 201. The night vision monocular 21 is then slid out or removed from collar 201.

As with the first adapter 100, as described above and as illustrated in FIGS. 4, 8, 9 and 12, second adapter 200 includes an attachment member 270 for releasably connecting or coupling second adapter 200 with first adapter 100. Attachment member 270 may be integrally formed with collar 201 or removably attached to collar 201 with screws 274 in distal portion 272 of attachment member 270. Attachment member 270 includes two means for connecting second adapter 200 to first adapter 100, one mechanical and one that is both electrical and mechanical. First, attachment member 270 includes cavities 278 in proximal end 276 configured to slidably receive dowels 178 in distal end 176 of attachment member 170 of first adapter 100. Attachment member 270 has male connector 282 at proximal end 276, illustrated in FIG. 8, that interfaces and connects with female connector 182 in distal end 176 of attachment member 170 of first adapter 100, illustrated in FIG. 5. As illustrated, the male connector 282 includes pins 283 which are surrounded and protected by a casing or housing 284, which limit exposure of delicate wiring and circuitry to outside elements and harsh climate conditions. Attachment member 270 further includes circuitry 280 therein that is connected with male connector 282, and attachment member 170 includes circuitry 180 therein that is connected with female connector 182. As described above, electrical circuitry 180, 280 and female and male connectors 182 and 282, allow lens 11 to be electrically connected to camera 31 through adapter assembly 500, when fully assembled, while electrically isolating the night vision monocular 21 from both lens 11 and camera 31. The mechanical and electrical configurations mechanically and electrically connecting first adapter 100 with second adapter 200 are interchangeable between adapters 100 and 200.

The usage of dowels and electrical connectors to couple and connect two hardened plastic attachment members 170 and 270 enable the optical assembly 500 to maintain proper focal length between first, second and third image modifying devices 100, 200 and 300 each time when it is assembled. No external tools are necessary to couple and connect or release all of the parts in the optical adapter assembly 1000 together. Further, since most of the electrical circuitry 180, 280 are contained within attachment members 170, 270, the electrical components exposed to outside elements in adapter assembly 500 are limited to electrical connectors 182, 282 and electric connectors 110 and 210 included in proximal portion 120 of collar 101 and distal portion 230 of collar 201.

The first and third image modifying devices 10 and 30 may be attached at any time to adapter assembly 500. Although other configurations are possible, the second image modifying device 20 is inserted and secured into one of the first adapter 100 and second adapter 200 before the one of the first adapter 100 and second adapter 200 is coupled or connected to the other of the first adapter 100 and second adapter 200, with its respective channels 140 and 142 and locking mechanism 132, or with its respective gripping mechanism 222, as illustrated in FIG. 12. First and second adapters 100 and 200 may be coupled or connected at the same time that the second image modifying device 20 is inserted and secured into the other of the first adapter 100 and second adapter 200 as described above.

As mentioned above, there are different combinations of the above-described optical adapter system and method for releasably but securely connecting or coupling the first adapter 100 and second adapter 200 with each other and with the image modifying devices 10, 20 and 30. First, either adapter may function alone, attaching two otherwise incompatible image modifying devices.

Figure 16:
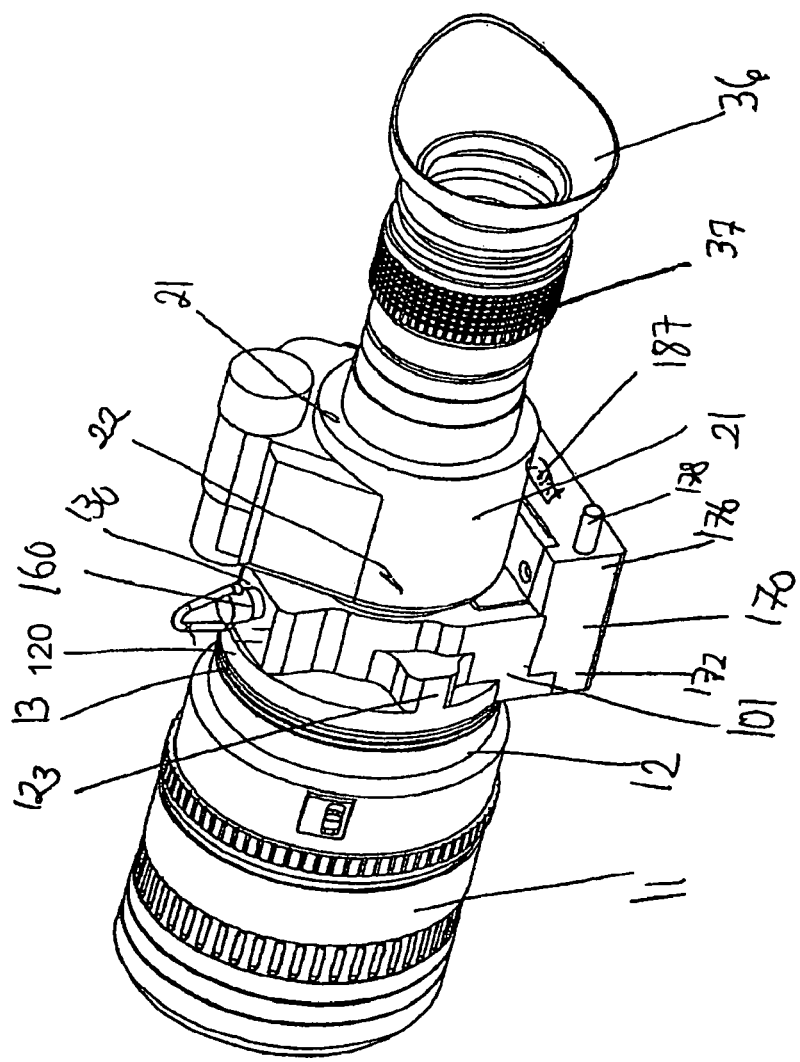
FIG. 16 illustrates a perspective view of an assembly of a night vision monocular, with a casing-lens assembly and eyepiece in an embodiment of an optical adapter system and method according to the present invention.

For example, first adapter 100 may be used alone to couple a first image modifying device 10 to a second image modifying device 20 that otherwise may be incompatible with each other. As illustrated in FIG. 16, first adapter 100 may be used to couple a lens 11 with a night vision monocular 21. Casing-lens assembly 37 is unscrewed from proximal portion 22 of night vision monocular 21, and eyepiece 36 is screwed onto proximal portion 22 of night vision monocular 21 in its place. Distal portion 24 of monocular 21 is then inserted into proximal portion 120 of collar 101, and lens 11 is connected to distal portion 130 of collar 101. The assembly of the monocular 21 with collar 101 and lens 11 provides expanded zooming capability to monocular 21. Then, the same assembly can be readily adapted for photo surveillance by replacing eyepiece 36 with casing-lens assembly 37, inserting and securing distal portion 24 of monocular 21 to proximal portion 220 of collar 201, and connecting or coupling camera 31 to distal portion 230 of collar 201 to form assembly 1000 illustrated in FIGS. 1 and 12 through 15.

Figure 17:
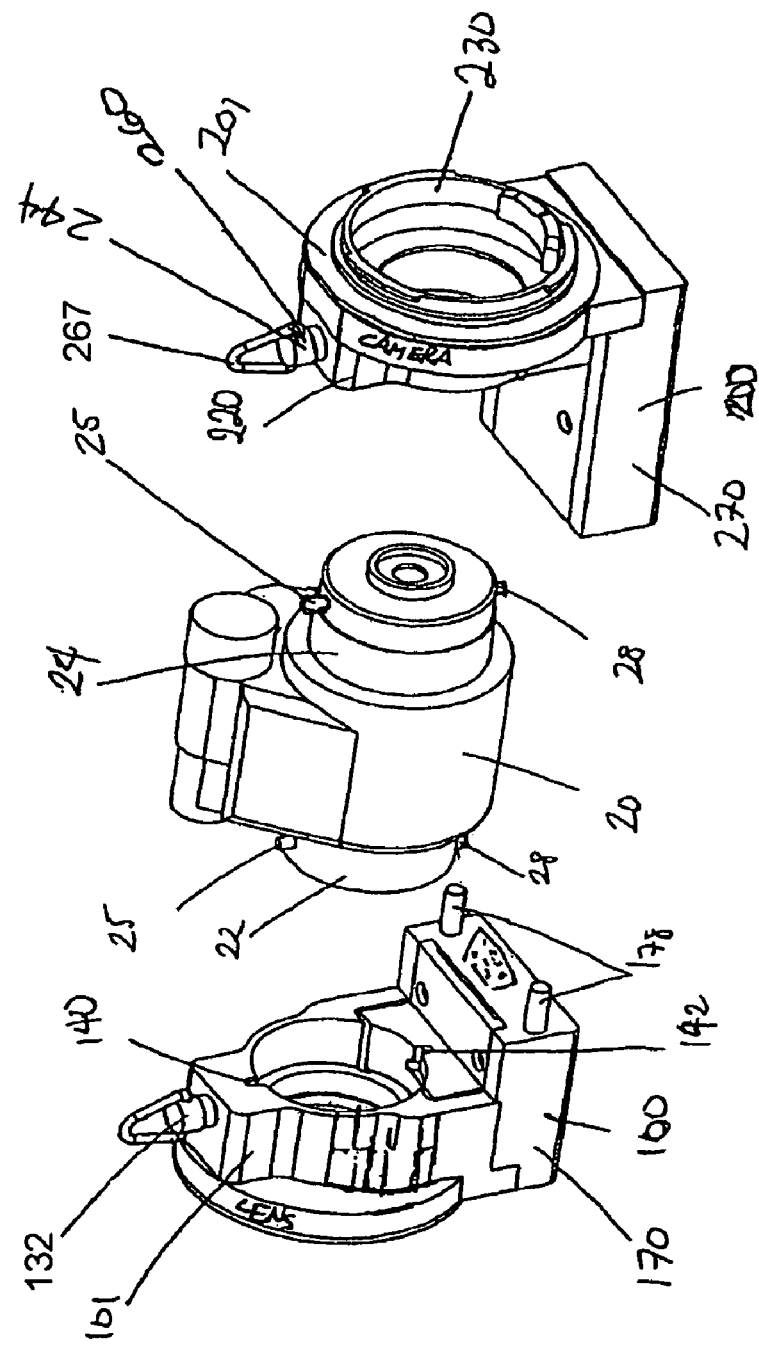
FIG. 17 illustrates a perspective view of a first adapter, a second image modifying device, and a second adapter in an embodiment of an optical adapter system and method according to the present invention.
Figure 18:
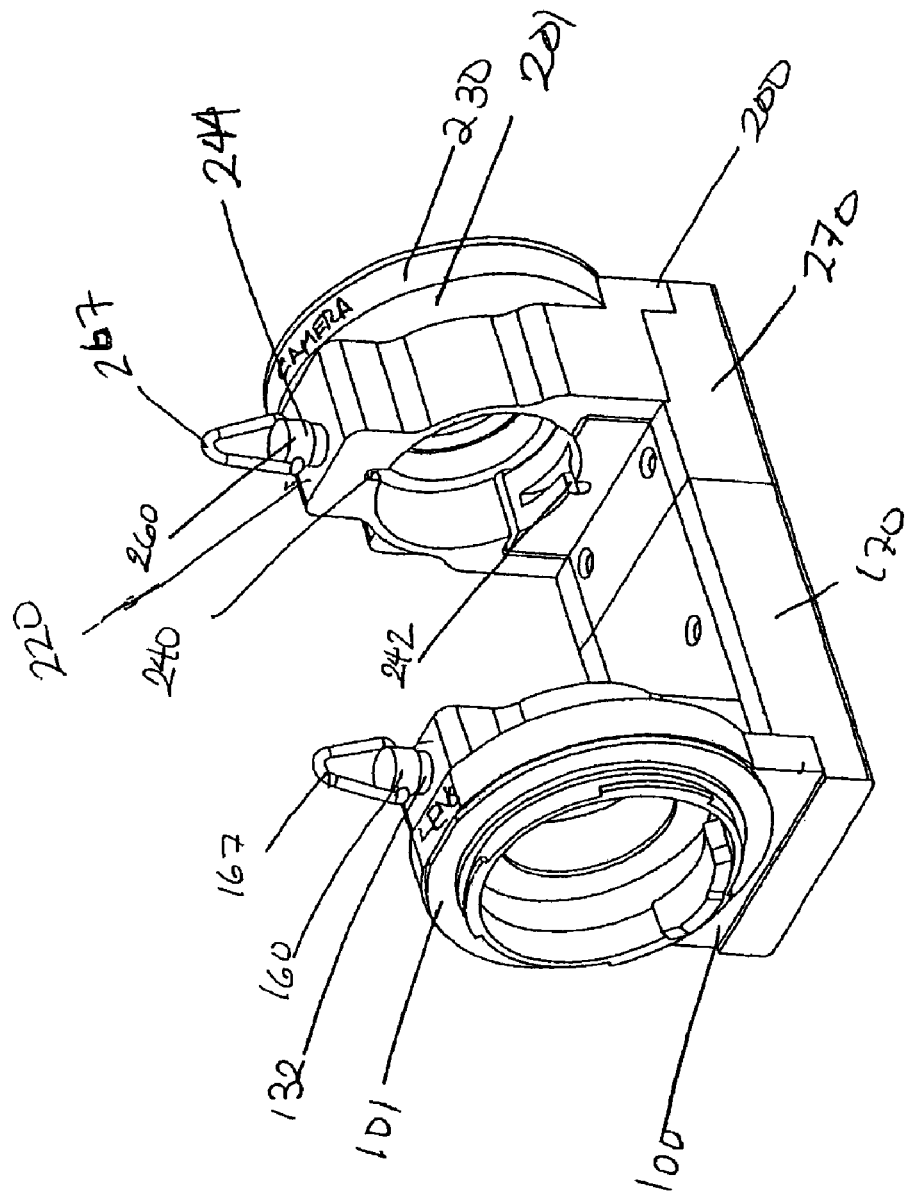
FIG. 18 illustrates a perspective view of the first adapter and second adapter in the embodiment of the optical adapter system and method of FIG. 17.

In an embodiment, the mechanisms and members used or involved in releasably but securely coupling or connecting the proximal portion 22 of second image modifying device 20 to the first adapter 100 may also be used to couple or connect the distal portion 24 of second image modifying device 200 to the second adapter 200, in place of or in addition to gripping mechanism 222. As illustrated in FIGS. 17 and 18, second image modifying device 20 may include mating members 25' and 28' to be inserted into channels 240 and 242 in collar 201, when second adapter 200 is slid onto distal portion 24 of second image modifying device 20. A locking mechanism 244 similar to the locking mechanism 132 on first adapter 100, may be used to releasably but securely couple or connect second adapter 200 to second image modifying device 20. Then, second image modifying device 20 has mating members on both proximal portion 22 and distal portion 24, and is coupled or connected to both first adapter 100 and second adapter 200 in the same or similar manner.

Figure 19:
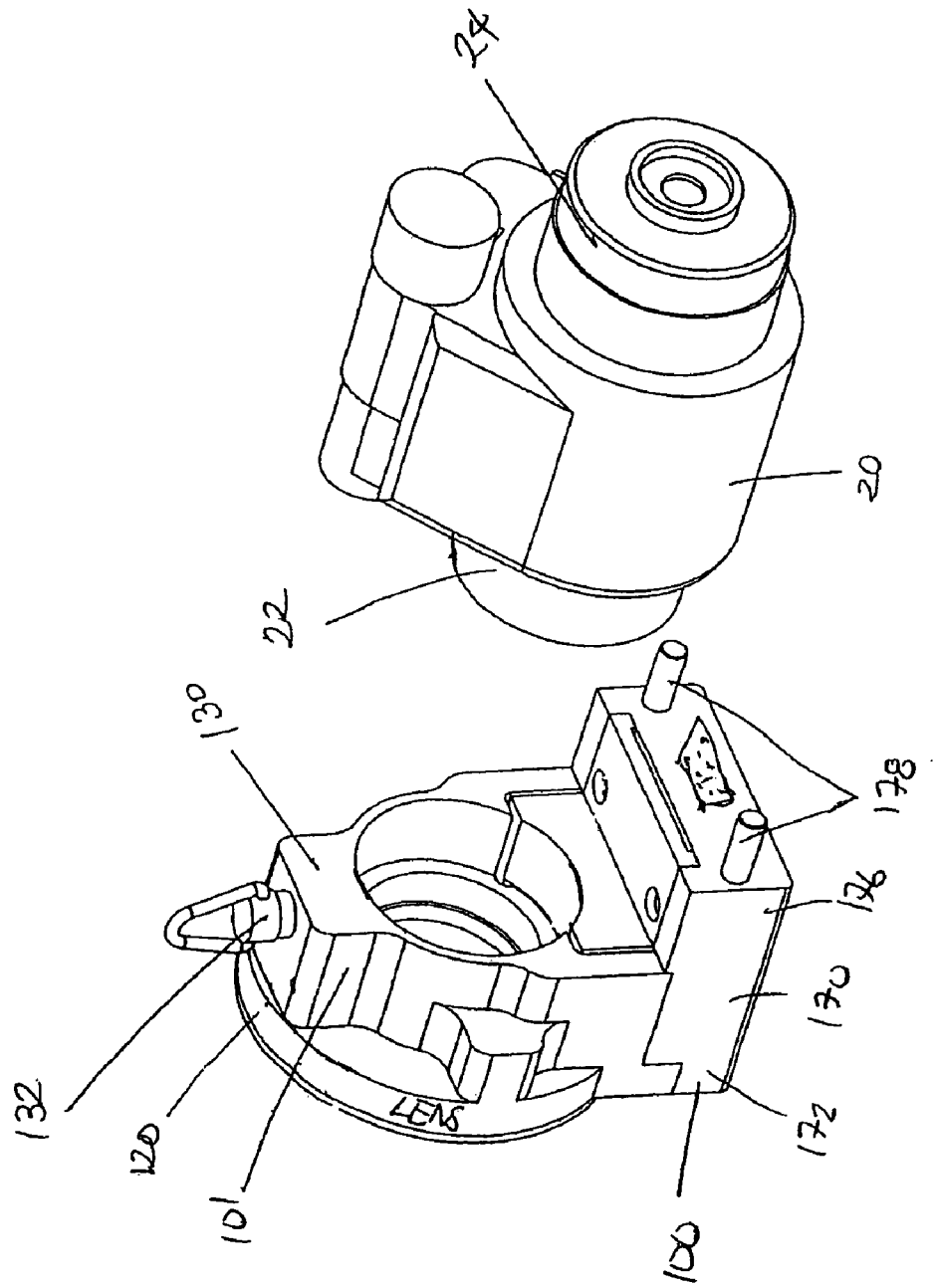
FIG. 19 illustrates a perspective view of a first adapter and a second image modifying device in an embodiment of an optical adapter system and method according to the present invention.
Figure 20:
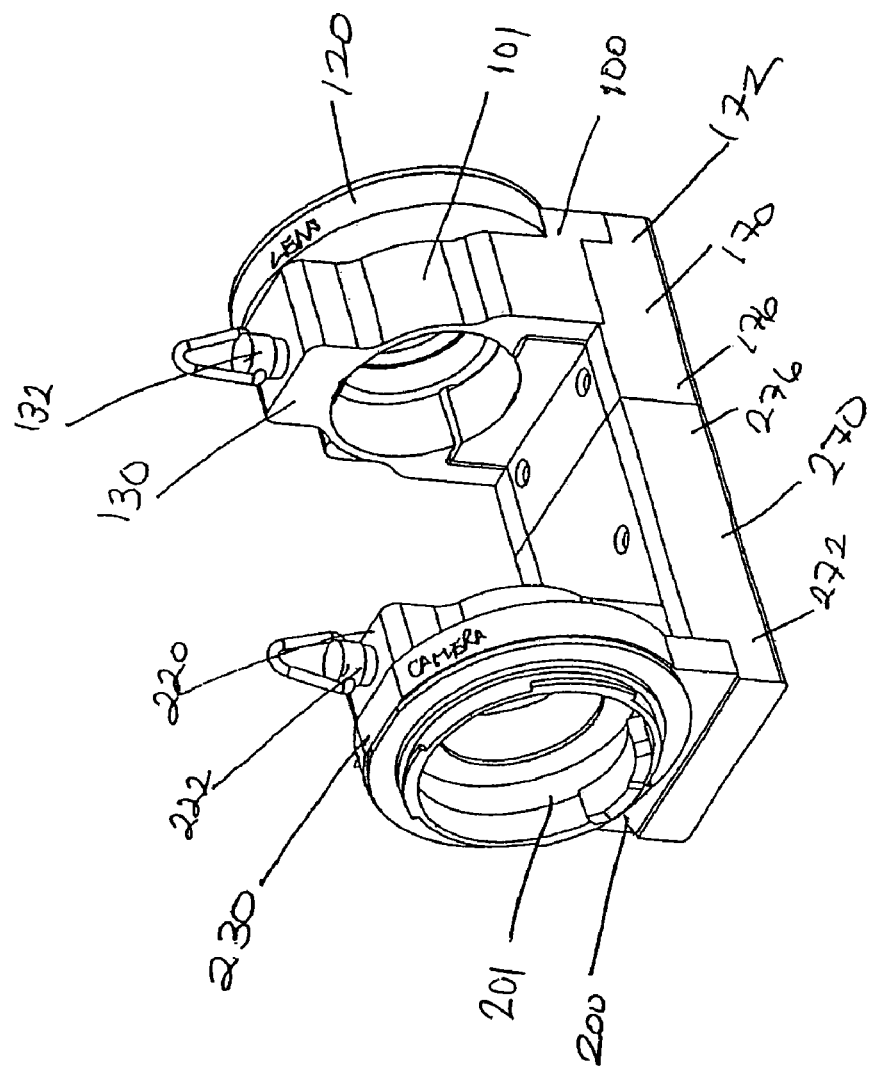
FIG. 20 illustrates a perspective view of the first adapter and a second adapter in the embodiment of the optical adapter system and method of FIG. 19.
Figure 21:
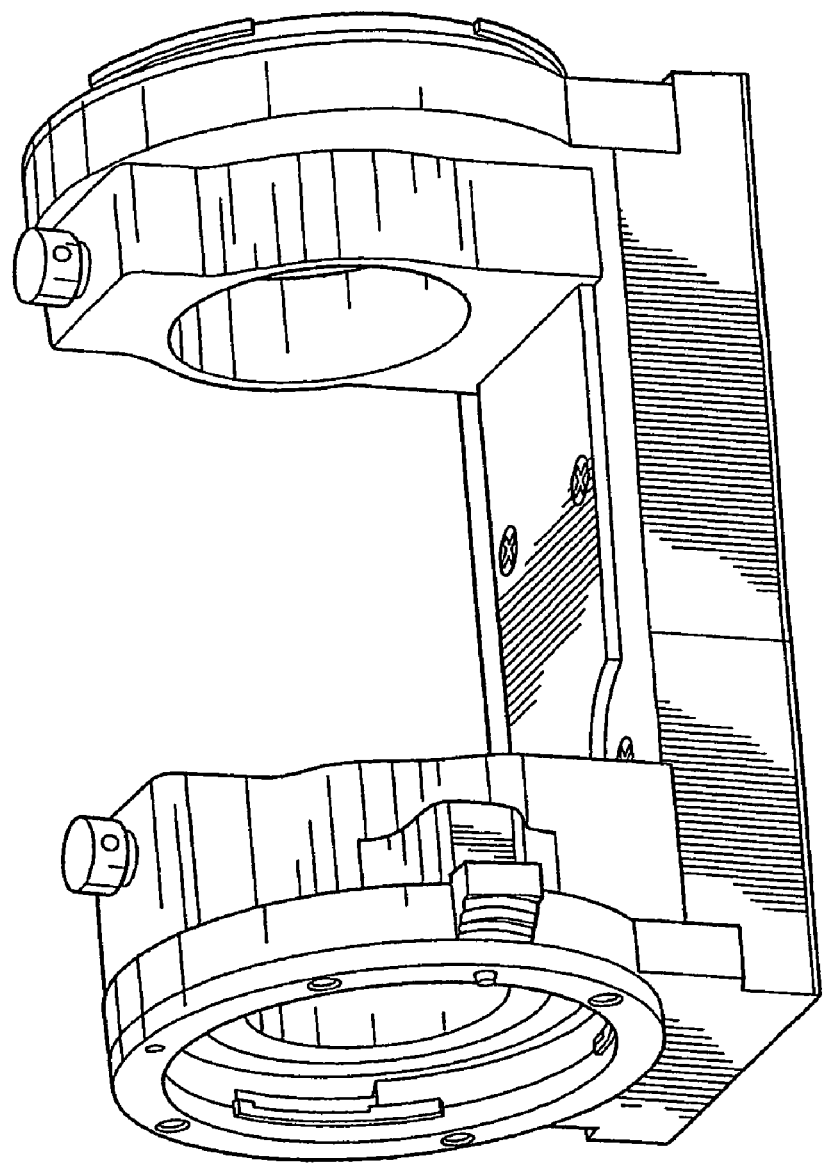
FIG. 21 illustrates an assembled perspective view of an optical adapter system, according to an embodiment of the present invention.

The reverse may also be employed in accordance with the present invention. In an embodiment, the gripping mechanism 222 used to releasably but securely couple or connect second adapter 200 to second image modifying device 20 may be used on first adapter 100 to securely or releasably couple or connect first adapter 100 to second image modifying device 20, in place of or in addition to the existing mechanisms and members used for such connection or coupling. As illustrated in FIGS. 19 and 20, proximal portion 22 of second image modifying device 20 may be inserted into distal portion 130 of collar 101, and gripping mechanism 132" similar to gripping mechanism 222 may be used to releasably but securely couple or connect first adapter 100 to second image modifying device 20. Then, second image modifying device 20 is coupled or connected to both first adapter 100 and second adapter 200 in the same or similar gripping manner, as described above with respect to second adapter 200.

As set forth above, the optical adapter system of the present invention, in accordance with various embodiments thereof, may employ alternative configurations by which to releasably connect the image modifying devices 10, 20, and 30. For example, FIGS. 21 to 26 illustrate an adapter assembly 2500, according to an alternative embodiment of the present invention. Various features of this particular embodiment may be similar to features described hereinabove in connection with alternative embodiments; to the extent that various features may differ, relevant aspects of same may be set forth in additional detail below.

Figure 22:
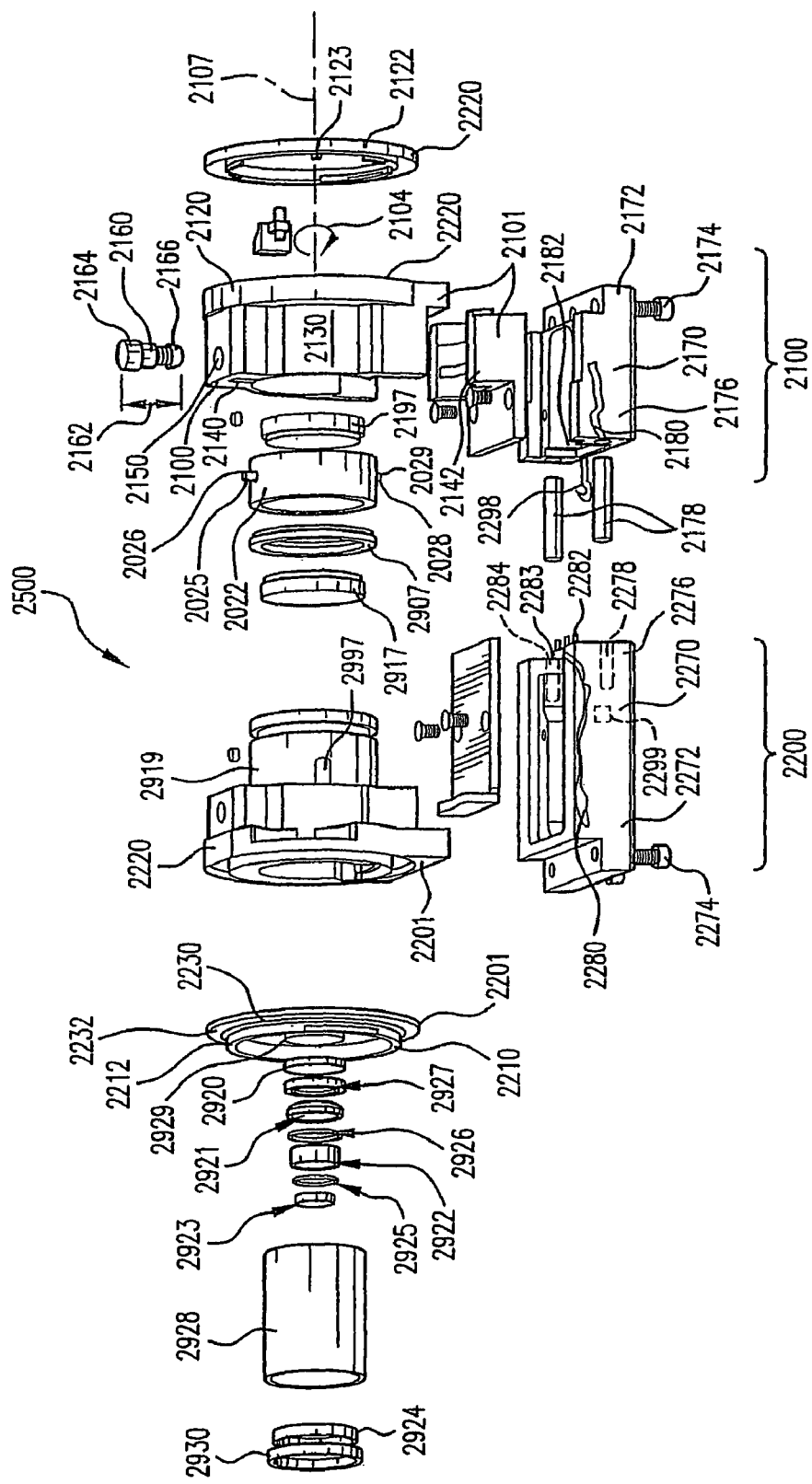
FIG. 22 illustrates an exploded perspective view of an optical adapter system, according to the embodiment of the present invention shown in FIG. 21.
Figure 23:
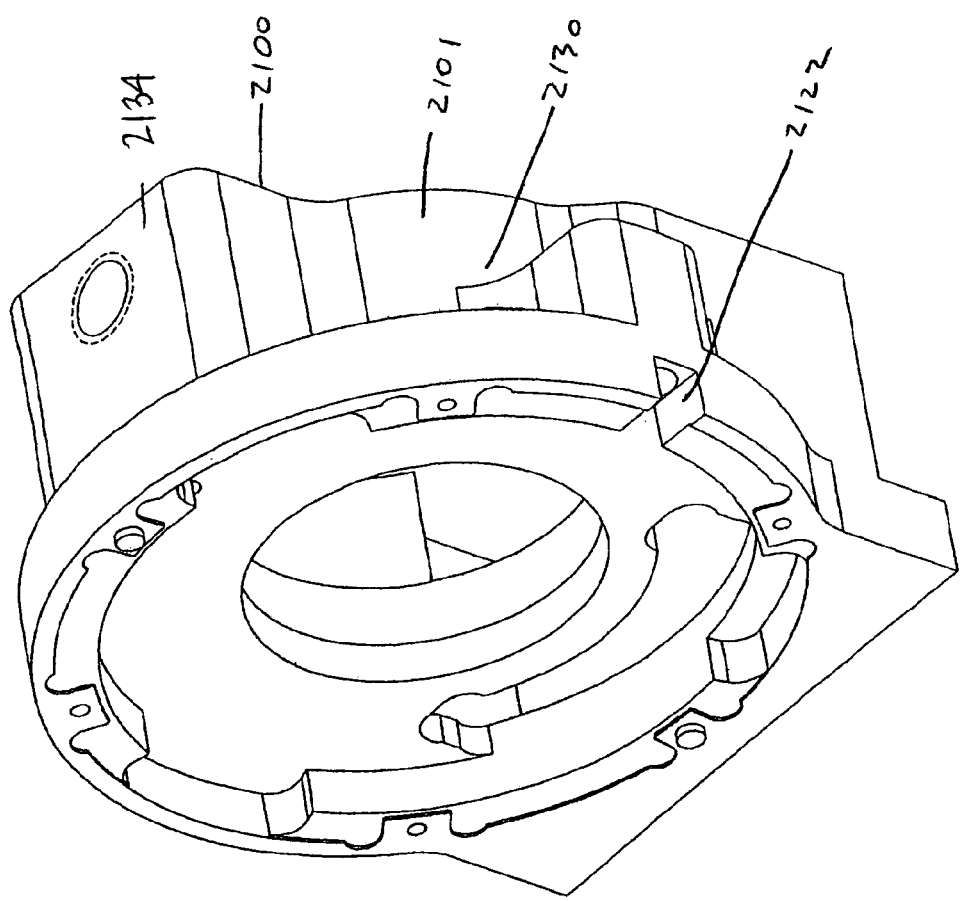
FIGS. 23 to 26 illustrate perspective views of various components of the optical adapter system, according to the embodiment of the present invention shown in FIG. 21.
Figure 24:
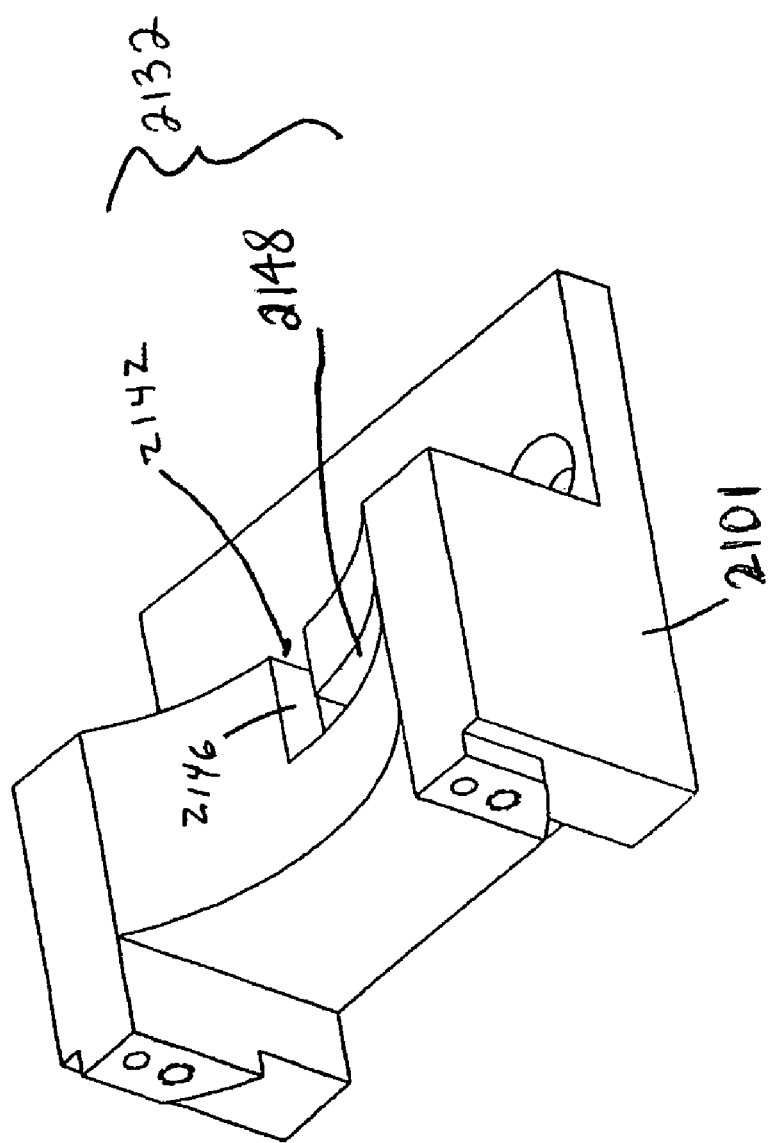
Figure 25:
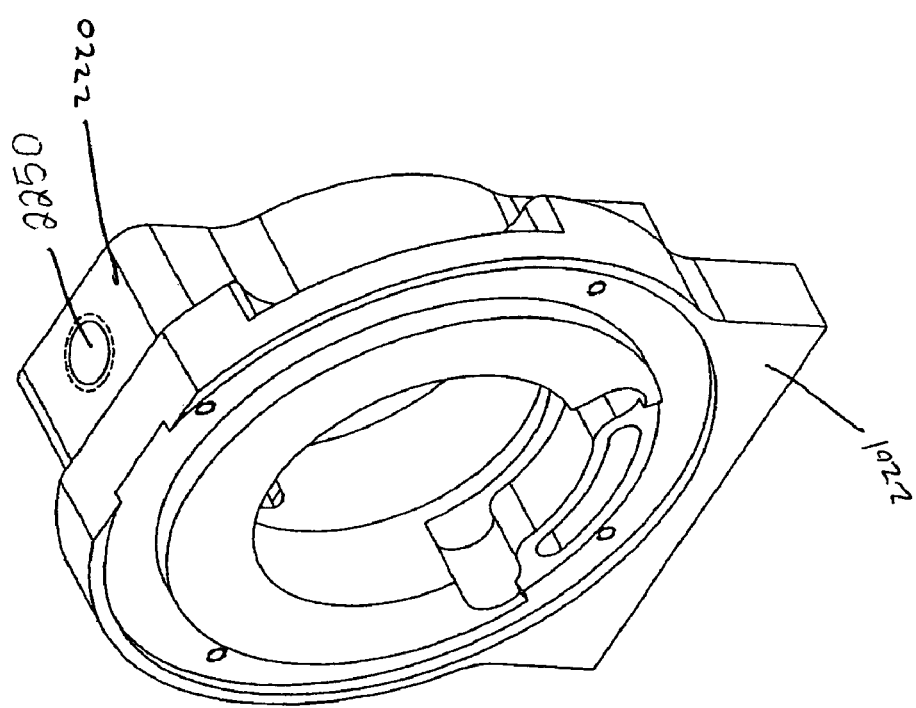
Figure 26:
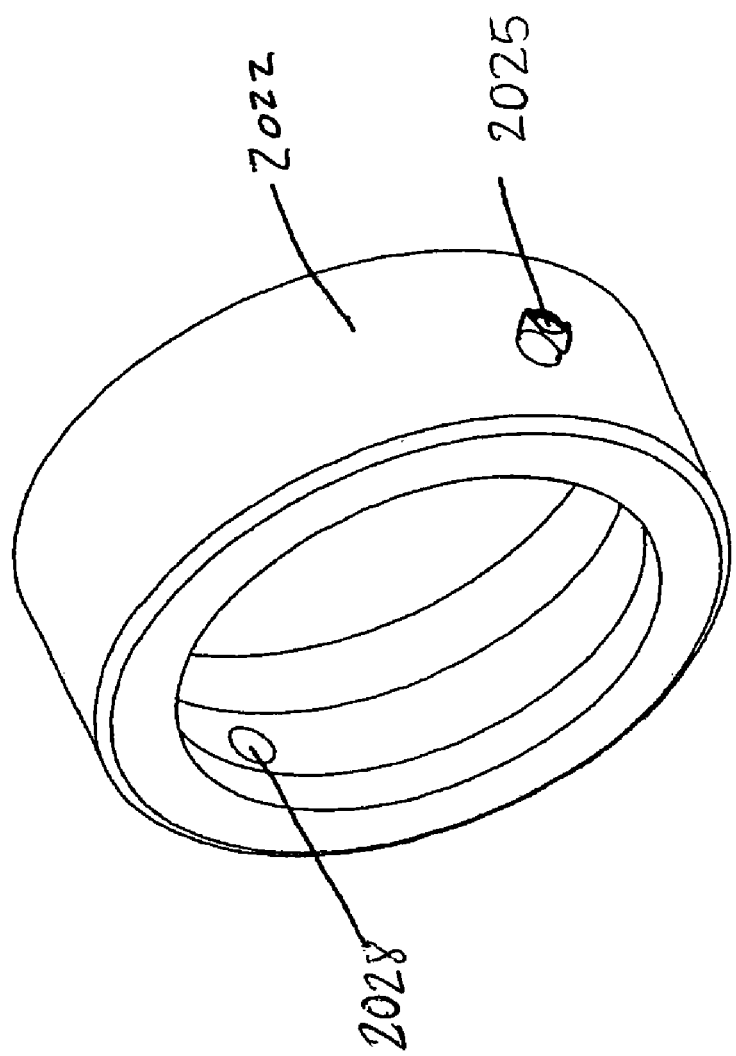
Figure 27:
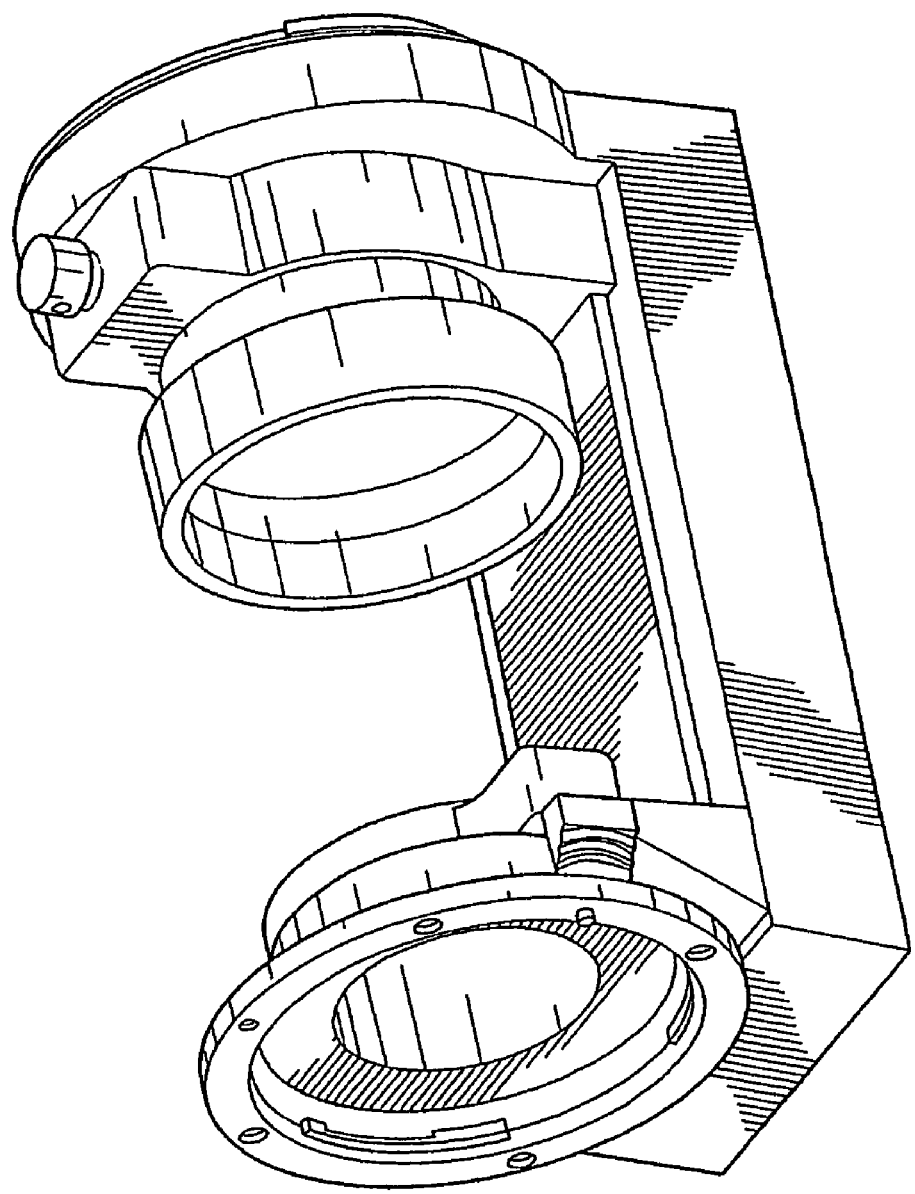
FIG. 27 illustrates an assembled perspective view of an optical adapter system, according to another embodiment of the present invention.

Specifically, referring to FIG. 22, the adapter assembly 2500 is configured to releasably connect image modifying devices, e.g., the image modifying devices 10, 20 and 30 illustrated in FIG. 1, etc., to each other. Again, one or more of the image modifying devices 10, 20, and 30 may be part of a standard optical assembly, e.g., the first and third image modifying devices 10 and 30 may be part of a standard lens 11/camera 31 assembly that are configured to be directly connected or coupled with each other, while the second image modifying device 20 may be a night vision monocular 21, part of a standard night vision optical assembly, that without the adapter assembly 500, may not be otherwise connected, coupled or functional with the camera-lens assembly.

The adapter assembly 2500 includes first adapter 2100 and second adapter 2200. The first adapter 2100 is configured to connect the first image modifying device 10 to the second image modifying device 20. The second adapter 2200 is configured to connect the second image modifying device 20 to the third image modifying device 30. Although each adapter is described below with a particular configuration for releasably but securely connecting or coupling with the image modifying devices and with each other, the connecting or coupling configurations may be interchangeable between each of the adapters, as are the image modifying devices.

The first adapter 2100 includes a collar 2101 having a proximal portion 2120 and a distal portion 2130, and an attachment member 2170 attached to the distal portion 2130 (attachment member 2170 may be regarded as part of the distal portion 2130 and may be integrally formed as part of collar 2101 and/or a separate piece attached to collar 2101).

The illustrated collar 2101 is closed when attached to attachment member 2170, but the collar 2101 may also be open, or more of a casing or housing in other embodiments. Proximal portion 2120 is configured with a mechanism 2122 to mechanically connect or couple the first adapter 2100 to the lens 11, and an electric connector 2110 to electrically connect or couple the first adapter 2100 to the lens 11. Mechanism 2122 includes a twist and lock mechanism 2123 configured to be releasably but securely connected or coupled with the matching interface 13 on the distal portion 12 of the lens 11. Electrical connector 2110 may include depressible pins 112, as illustrated, e.g., in the embodiment shown in FIG. 6, that are securely attached within collar 2101. Mechanism 2122 and connector 2110 may be similar to or the same as the mechanism 32 (or be otherwise compatible with mechanism 32) on camera 33, illustrated in FIG. 1, that enables the camera 33 to be directly mechanically and electrically connected or coupled with the lens 11. In the case of the camera 33 and lens 11 being standard off-the-shelf designs, the mechanism 2122 and connector 2110 may have a standard configuration to couple or connect a variety of lenses 11 with a variety of other image modifying devices 20 and 30 in optical adapter systems.

The distal portion 2130 of the collar 2101 is configured to receive the proximal portion 22 of the night vision monocular 21. The distal portion 2130 includes a locking mechanism 2132 and two channels 2140 and 2142 to securely but releasably couple or connect the distal portion 2130 of first adapter 2100 with the proximal portion 22 of the night vision monocular 21. Specifically, each channel 2140, 2142 is configured to receive a mating member 2025, 2028 on a lens filter ring 2012 located at the proximal portion 2022 of night vision monocular 21. Locking mechanism 2132 is designed to secure a position of upper mating member 2025 in upper channel 2140, e.g., by at least partially obstructing or preventing movement of mating member 2025 out of channel 2140. When the position of the mating member 2025 is secured by locking mechanism 2132, mating member 2025 is not readily removable from the upper channel 2140 once locking mechanism 2132 is engaged in upper channel 2140. Additionally, securing a position of mating member 2025 in channel 2140 may include sufficiently securing the focal length between lenses in the first image modifying device 10 and the second image modifying devices 20, so that the two image modifying devices may be usable together.

Mating members 2025 and 2028, of night vision monocular 21 or any other second image modifying device 20, extend from an outer surface thereof and may be cylindrical hollow or solid posts or pins 2026 and 2029. Each of pins 2026 and 2029 may have a diameter that is less than a width of each respective channel 2140 and 2142, so that pins 2026 and 2029 may be free to move through channels 2140 and 2142 as the lens filter ring 2012 located at the proximal portion 2022 of night vision monocular 21 is inserted into the distal portion 2130 of collar 2101. Pins 2026 and 2029 may be diametrically opposite from each other, as illustrated, as well as corresponding channels 2140 and 2142 that receive pins 2026 and 2029.

Locking mechanism 2132 may include an opening 2150 through a surface or periphery in the distal portion 2130 of collar 2101, and a screw 2160 may be configured to be threadably receivable therethrough. Opening 2150 may be at least partially threaded and may communicate with upper channel 2140. Screw 2160 may be manually rotatable in clockwise and/or counterclockwise directions. Additionally, screw 2160 may have a length 2162 sufficient to extend through a length of opening 2150 to at least partially block a portion of channels 2140 and 2142 when screw 2160 is further inserted through opening 2150. Advantageously, screw 2160 is longer than the length 152 of opening 150 but does not contact or press down on the proximal portion 2022 of night vision monocular 21 when such is inserted into the distal portion 2130 of collar 2101, so as to minimize the likelihood of damage to same if screw 2160 is tightened, e.g., over-tightened. Screw 2160 also has diameter that is less than a width of channel 2140, so that bottom portion 2166 of screw 2160 can be received in and obstruct channel 2140, and secure a position of mating member 2025 of night vision monocular 21 therein.

Each channel 2140, 2142 defines a path that allows mating members 2025 and 2028 to be securely but releasably inserted therein as the lens filter ring 2012 located at the proximal portion 2022 of night vision monocular 21 is inserted into distal portion 2130 of collar 2101. First portion 2146 of channels 2140 and 2142 are parallel to the direction in which the night vision monocular 21 is inserted into the collar 2101, and is also parallel to a longitudinal axis 2103 of collar 2101. Second portion 2148 of channels 2140 and 2142 are perpendicular to first portion 2146, and are also parallel to the direction of rotation 2103 of night vision monocular 21 in collar 2101.

In order to secure night vision monocular 21 in collar 2101, the lens filter ring 2012 located at the proximal portion 2022 of night vision monocular 21 is inserted into distal portion 2130 of collar 2101, sliding pins 2026 and 2029 through the first portions 2146 of channels 2140 and 2142. The proximal portion 2022 of night vision monocular 21 is then rotated inside distal portion 2130 of collar 2101, sliding pins 2026 and 2029 through second portions 2148 of channels 2140 and 2142. In order to secure the night vision monocular 21 in collar 2101, locking mechanism 2132 is activated or engaged to secure a position of pins 2026, 2029 in second portion 2148 of respective channels 2140 by inserting screw 2160 through opening 2150, until the bottom 2166 protrudes into or obstructs channel 2140. Night vision monocular 21 can be removed from collar 2101 by unscrewing or removing screw 2160 upwards through opening 2150, until the bottom 2166 clears or no longer obstructs channel 2140. The night vision monocular 21 can then be rotated and removed by moving pins 2026, 2029 through the second portion 2148, and then the first portion 2146, of their respective channels 2140 and 2142.

While the channels are illustrated as being circumferentially opposite relative to each other, e.g., as upper and bottom channels 2140 and 2142, alternative embodiments are also possible. For example, the channels may be located anywhere on the interior of the distal portion 2130 of the collar and have a different path of insertion. Either or both channels may have a locking mechanism such as locking mechanism 2132. The locking mechanism 2132 may be, e.g., a ball bearing or lip located in an interior of each channel 2140 and 2142, or any other suitable arrangement. Again, the distal portion 2130 of the collar 2101 may be configured and may function with, e.g., a single channel, and a single locking mechanism, and second image modifying device may have a single mating member or pin. Alternatively, the pins and their respective channels may be located on opposite components from that described hereinabove.

The first adapter 2100 includes an attachment member 2170 for releasably connecting or coupling first adapter 2100 with second adapter 2200. Attachment member 2170 may be integrally formed with collar 2101 or removably attached to collar 2101 with screws 2174 in proximal portion 2172 of attachment member 2170. Attachment member 2170 may include two means for connecting first adapter 2100 to second adapter 2200, e.g., one mechanical and one that is both electrical and mechanical. For example, attachment member 2170 may include two dowels 2178 in distal end 2176 configured to be inserted in corresponding holes in proximal end 2276 of attachment member 2270 of second adapter 2200. Attachment member 2170 has female connector 2182 at distal end 2176 to interface and connect with male connector 2282 in proximal end 2276 of attachment member 2270 of second adapter 2200. Attachment member 2170 further includes circuitry 2180 therein that is connected with female connector 2182, and attachment member 2270 includes circuitry 2280 therein that is connected with male connector 2282. Electrical circuitry 2180, 2280 and female and male connectors 2182 and 2282, together with electrical connectors 2110 and 2210 allow lens 11 to be electrically connected to camera 31 through adapter assembly 2500, when fully assembled, while electrically isolating the night vision monocular 21 from both lens 11 and camera 31. In alternative embodiments, there may be any number of dowels or posts or pins to attach the first adapter to the second adapter, and the dowels or posts or pins may be included on one or both of the first and second adapters 2100 and 2200, with corresponding cavities, holes, openings, etc. on either side. Additionally, the female and male electrical connectors 2182 and 2282 may be interchangeable, and may be on either first or second adapter 2100 and 2200.

Furthermore, the second adapter 2200 may include a collar 2201 having a proximal portion 2220 and a distal portion 2230, and an attachment member 2270 attached to the distal portion 2230 (attachment member 2270 may be regarded as part of the distal portion 2230 and may be integrally formed as part of collar 2201 or a separate piece attached to collar 2201).

The illustrated collar 2201 is closed when attached to attachment member 2270, but the collar 2201 may also be open, or more of a casing or housing in other embodiments. Distal portion 2230 is configured with an interface 2232 to mechanically connect or couple second adapter 2200 to the camera 31, and an electric connector 2210 to electrically connect or couple second adapter 2200 to camera 31. Electrical connector 2210 may include metal interface 2212, as illustrated, that are securely attached within collar 2201. Interface 2232 and electrical connector 2210 may be similar to or the same as the interface 13 (or match the manner in which interface 13) on lens 11 that enables lens 11 to be directly mechanically and electrically connected or coupled with the camera 31. In the case of the camera 33 and lens 11 being standard off-the-shelf designs, interface 2232 and electrical connector 2210 may have a standard configuration to couple or connect a variety of cameras 31 with a variety of other image modifying devices 10 and 20 in optical adapter systems. Interface 2232 and electrical connector 2210 may interact and match with a twist and lock mechanism 32 and electrical connection 34 on camera 31, to releasably but securely mechanically and electrically connect or couple camera 31 with second adapter 2200.

The proximal portion 2220 of the collar 2201 is configured to receive the distal portion 24 of the night vision monocular 21. In an embodiment, a bottom surface of the attachment member 2170 includes a pivoting hook 2298 that is configured to releasably engage a pin 2299 of the attachment member 2270 when the attachment members 2170, 2270 are connected to each other. It should be recognized that any such arrangement may be employed. In the embodiment shown, this hook/pin arrangement functions to securely but releasably maintain a coupling between the proximal portion 2220 of second adapter 2200 with the distal portion 24 of the night vision monocular 21.

Essentially, in order to secure night vision monocular 21 in collar 2201, the distal portion 24 of night vision monocular 21 is inserted into proximal portion 2220 of collar 2201, similar to that illustrated in FIG. 12. Then, in order to secure the night vision monocular 21 in collar 2201, the pivoting hook 2298 on the bottom surface of the attachment member 2170 is pivoted until it engages the pin 2299 of the attachment member 2270. Night vision monocular 21 can be removed from collar 2201 by disengaging the pin 2299 from the hook 2298. The night vision monocular 21 is then slid out or removed from collar 2201.

As with the first adapter 2100, second adapter 2200 includes an attachment member 2270 for releasably connecting or coupling second adapter 2200 with first adapter 2100. Attachment member 2270 may be integrally formed with collar 2201 or removably attached to collar 2201 with screws 2274 in distal portion 2272 of attachment member 2270. Attachment member 2270 may include two means for connecting second adapter 2200 to first adapter 2100, e.g., one mechanical and one that is both electrical and mechanical. First, attachment member 2270 includes cavities 2278 in proximal end 2276 configured to slidably receive dowels 2178 in distal end 2176 of attachment member 2170 of first adapter 2100. Attachment member 2270 has male connector 2282 at proximal end 2276 that interfaces and connects with female connector 2182 in distal end 2176 of attachment member 2170 of first adapter 2100. As illustrated, the male connector 2282 includes pins 2283 which are surrounded and protected by a casing or housing 2284, which limit exposure of delicate wiring and circuitry to outside elements and harsh climate conditions. Attachment member 2270 further includes circuitry 2280 therein that is connected with male connector 2282, and attachment member 2170 includes circuitry 2180 therein that is connected with female connector 2182. As described above, electrical circuitry 2180, 2280 and female and male connectors 2182 and 2282, allow lens 11 to be electrically connected to camera 31 through adapter assembly 2500, when fully assembled, while electrically isolating the night vision monocular 21 from both lens 11 and camera 31. The mechanical and electrical configurations mechanically and electrically connecting first adapter 2100 with second adapter 2200 may be interchangeable between adapters 2100 and 2200.

The usage of dowels and electrical connectors to couple and connect two hardened plastic attachment members 2170 and 2270 may enable the optical assembly 2500 to maintain proper focal length between first, second and third image modifying devices 10, 20 and 30 each time when it is assembled. The use of external tools to couple and connect or release all of the parts in the optical adapter assembly 2500 together may be avoided. Further, since most of the electrical circuitry 2180, 2280 are contained within attachment members 2170, 2270, the electrical components exposed to outside elements in adapter assembly 2500 are limited to electrical connectors 2182, 2282 and electric connectors 2110 and 2210 included in proximal portion 2120 of collar 2101 and distal portion 2230 of collar 2201.

The first and third image modifying devices 10 and 30 may be attached at any time to adapter assembly 2500. Although other configurations are possible, the second image modifying device 20 may be inserted and secured into one of the first adapter 2100 and second adapter 2200 before the one of the first adapter 2100 and second adapter 2200 is coupled or connected to the other of the first adapter 2100 and second adapter 2200, with its respective channels 2140 and 2142 and locking mechanism 2132, or with its respective hook/pin coupling arrangement. First and second adapters 2100 and 2200 may be coupled or connected at the same time that the second image modifying device 20 is inserted and secured into the other of the first adapter 2100 and second adapter 2200 as described above.

As mentioned above, various components of the optical adapter system, e.g., the first adapter 100 and second adapter 200, may be employed in different combinations so as to releasably but securely connecting or coupling the first adapter 2100 and second adapter 2200 with each other, with one or more of the image modifying devices 10, 20 and 30, etc. For example, either adapter may function alone, attaching two otherwise incompatible image modifying devices.

Figure 44:
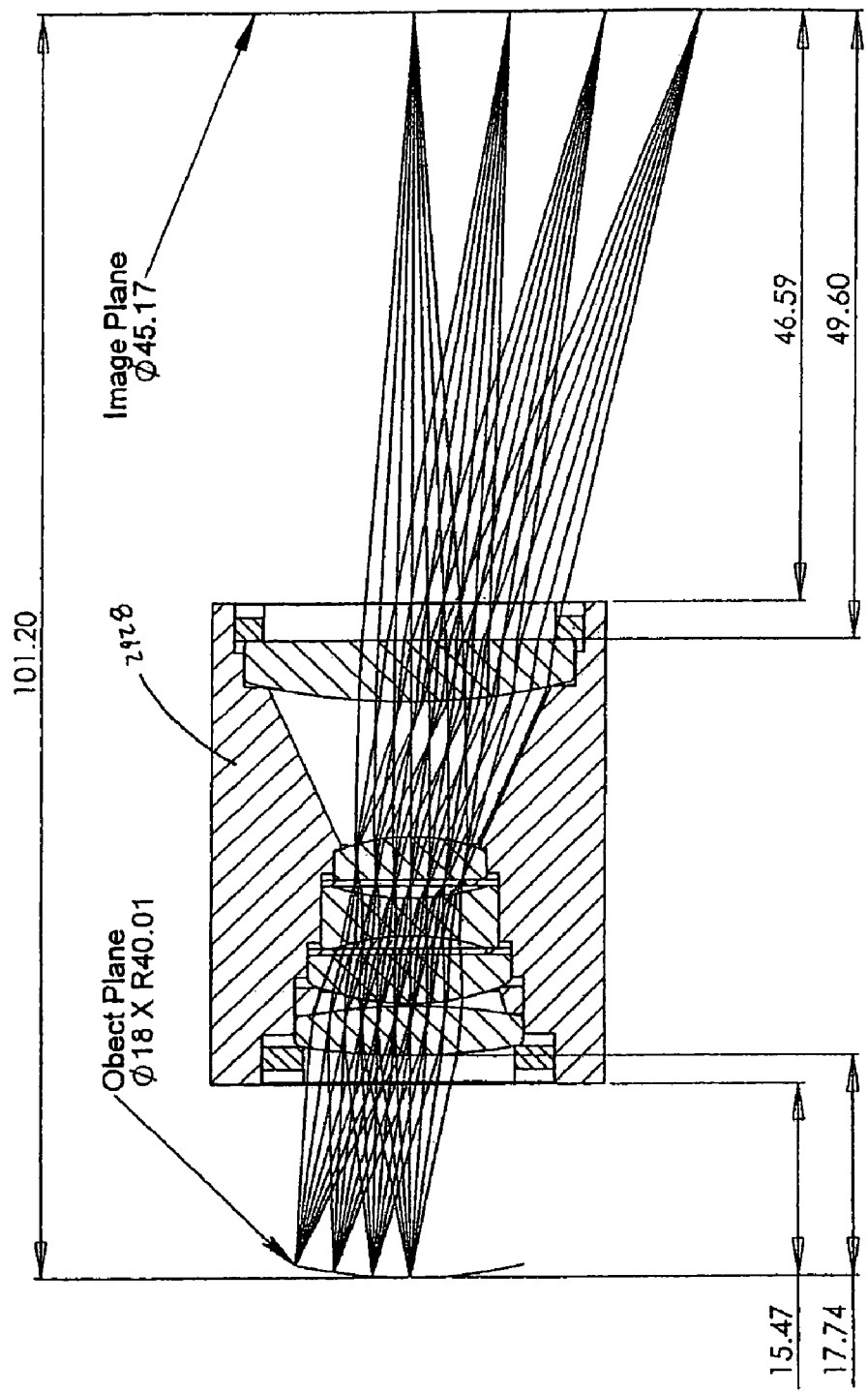

While various different second image modifying devices 20 may be employed, FIG. 22 illustrates some components of an optical arrangement that may be employed with the above-described optical adapter system, according to an embodiment of the present invention. For example, FIG. 22 illustrates a relay lens barrel 2928 that may be mounted within and relative to the collar 2201 via a relay lens holder 2919. The relay lens holder 2919 may define a slot 2997 through which the position of the relay lens barrel 2928 may be adjusted. The relay lens barrel 2928 (additional details of an example embodiment of same being illustrated in FIGS. 33(a) through 33(c)) may house an arrangement of optical relay lens elements, e.g., optical relay lens elements 2920, 2921, 2922, 2923 and 2924 (additional details of an example embodiment of each being illustrated in FIGS. 34(a) through 34(b), FIGS. 35(a) through 35(b), FIGS. 36(a) through 36(b), FIGS. 37(a) through 37(b) and FIGS. 38(a) through 38(b), respectively), that are spaced apart by relay lens spacer elements 2925, 2926 and 2927 (additional details of an example embodiment of each being illustrated in FIGS. 39(a) through 39(b), FIGS. 40(a) through 40(b) and FIGS. 41(a) through 41(b)) and maintained therein by lock rings 2929 and 2930 (additional details of an example embodiment of each being illustrated in FIGS. 42(a) through 42(b), FIGS. 43(a) through 43(b)). An assembled view of such an arrangement is further illustrated in FIG. 44, the figure further illustrating the optical performance of an example embodiment that employs the components illustrated in FIGS. 33(a) through 43(b).

In addition, FIG. 22 illustrates the filter cap 2022, as set forth above, that may be coupled to an optical UV filter or filters 2917 via a filter holder 2907. The filter cap 2022 may be mounted, e.g., threaded, onto one end of a night vision monocular 21, enabling the night vision monocular 21 to be coupled to the collar 2101 via the mating members 2025 and 2028, e.g., the pins 2026 and 2029, being disposed within respective channels 2140 and 2142 and being locked therein by the screw 2160 being adjusted so as to block egress of the pins therefrom, as described above.

As set forth above, the optical adapter system of the present invention, in accordance with various embodiments thereof, may employ alternative configurations by which to releasably connect the image modifying devices 10, 20, and 30. For example, FIGS. 27 to 32 illustrate an adapter assembly 3500, according to an alternative embodiment of the present invention. Various features of this particular embodiment may be similar to features described hereinabove in connection with alternative embodiments; to the extent that various features may differ, relevant aspects of same may be set forth in additional detail below.

Figure 28:
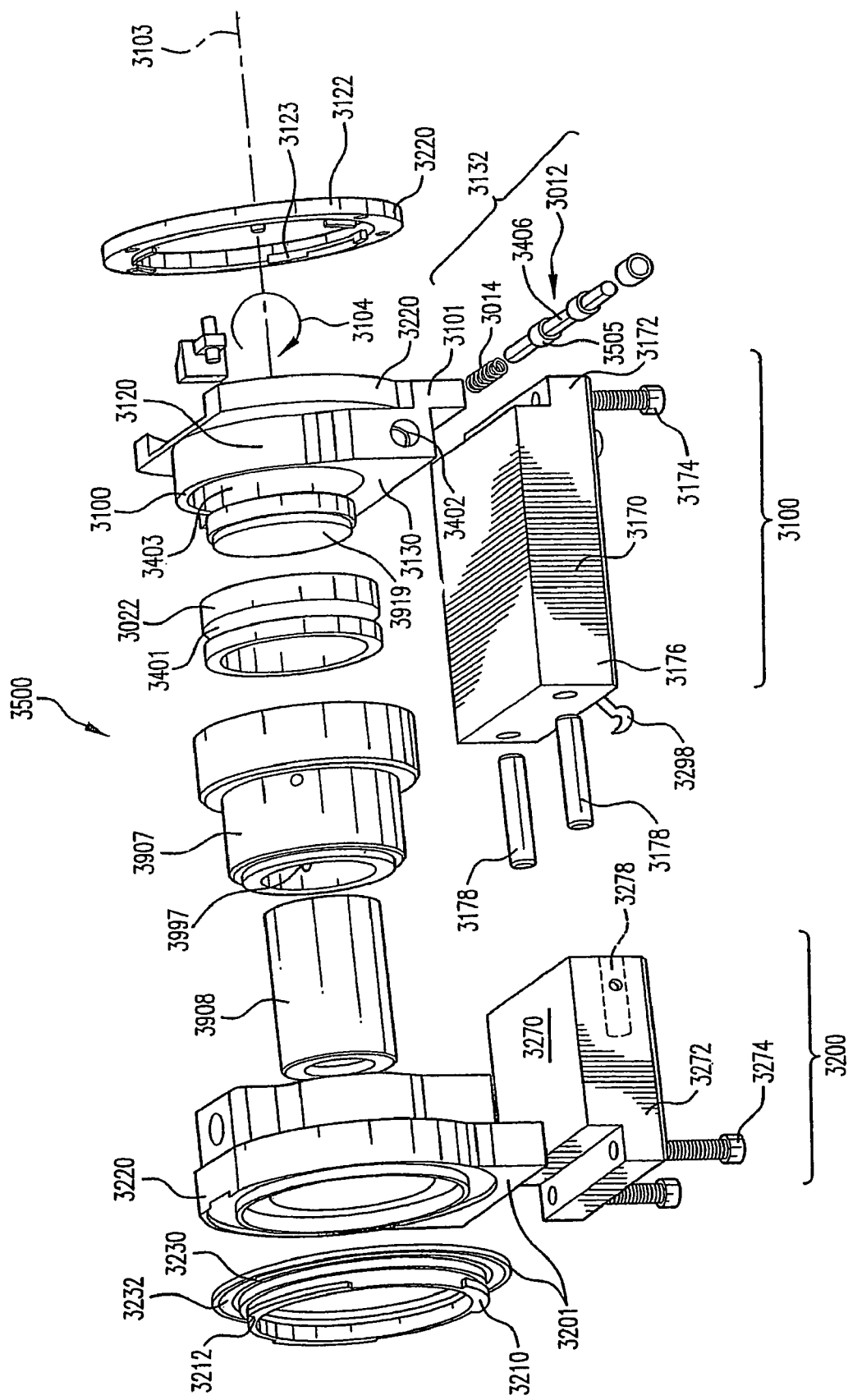
FIG. 28 illustrates an exploded perspective view of an optical adapter system, according to the embodiment of the present invention shown in FIG. 27.

Specifically, referring to FIG. 28, the adapter assembly 3500 is configured to releasably connect image modifying devices, e.g., the image modifying devices 10, 20 and 30 illustrated in FIG. 1, etc., to each other. Again, one or more of the image modifying devices 10, 20, and 30 may be part of a standard optical assembly, e.g., the first and third image modifying devices 10 and 30 may be part of a standard lens 11/camera 31 assembly that are configured to be directly connected or coupled with each other, while the second image modifying device 20 may be a night vision monocular 21, part of a standard night vision optical assembly, that without the adapter assembly, may not be capable of being otherwise connected, coupled or functional with the camera-lens assembly.

The adapter assembly 3500 includes first adapter 3100 and second adapter 3200. The first adapter 3100 is configured to connect the first image modifying device 10 to the second image modifying device 20. The second adapter 3200 is configured to connect the second image modifying device 20 to the third image modifying device 30. Although each adapter is described below with a particular configuration for releasably but securely connecting or coupling with the image modifying devices and with each other, the connecting or coupling configurations are interchangeable between each of the adapters, as are the image modifying devices.

The first adapter 3100 includes a collar 3101 having a proximal portion 3120 and a distal portion 3130, and an attachment member 3170 attached to the distal portion 3130 (attachment member 3170 may be regarded as part of the distal portion 3130 and/or may be integrally formed as part of collar 3101 or a separate piece attached to collar 3101).

The illustrated collar 3101 is closed when attached to attachment member 3170, but the collar 3101 may also be open, or more of a casing or housing in other embodiments. Proximal portion 3120 is configured with a mechanism 3122 to mechanically connect or couple the first adapter 3100 to the lens 11. Proximal portion 3120 is configured with a mechanism 3122 to mechanically connect or couple the first adapter 3100 to the lens 11. Mechanism 3122 may include a twist and lock mechanism 3123 configured to be releasably but securely connected or coupled with the matching interface 13 on the distal portion 12 of the lens 11. Mechanism 3122 may be similar to or the same as the mechanism 32 on camera 33, illustrated in FIG. 1, that enables the camera 33 to be directly mechanically and electrically connected or coupled with the lens 11. In the case of the camera 33 and lens 11 being standard off-the-shelf designs, the mechanism 3122 may have a standard configuration to couple or connect a variety of lenses 11 with a variety of other image modifying devices 20 and 30 in optical adapter systems.

Figure 29:
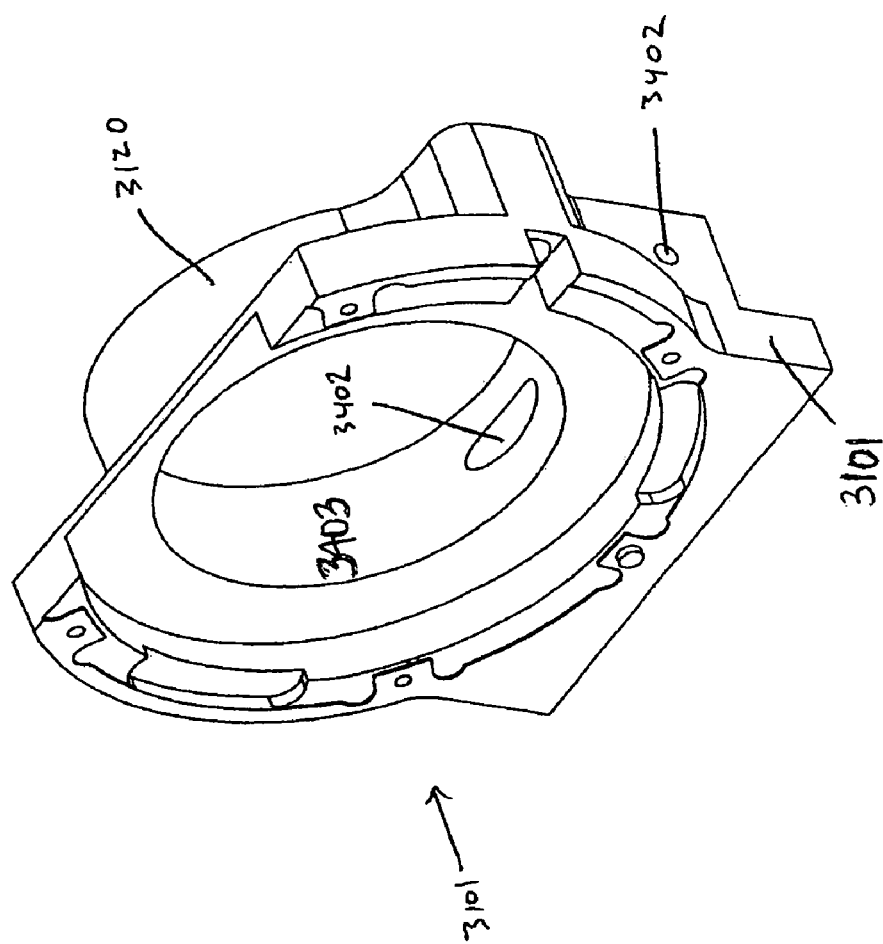
FIGS. 29 to 32 illustrate perspective views of various components of the optical adapter system, according to the embodiment of the present invention shown in FIG. 27.
Figure 30:
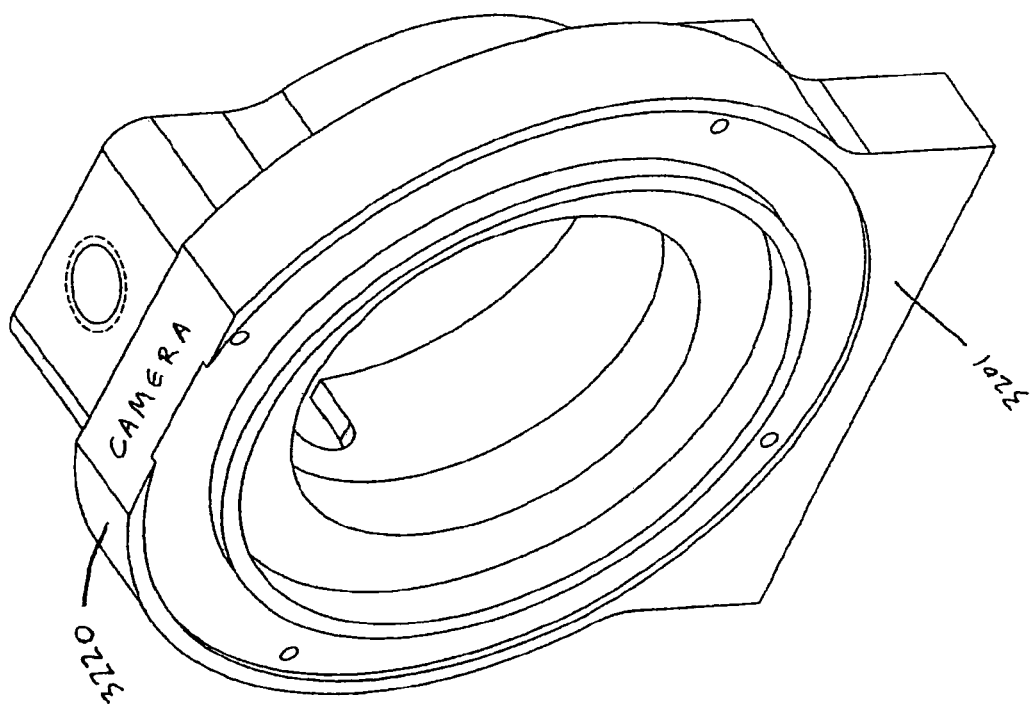
Figure 31:
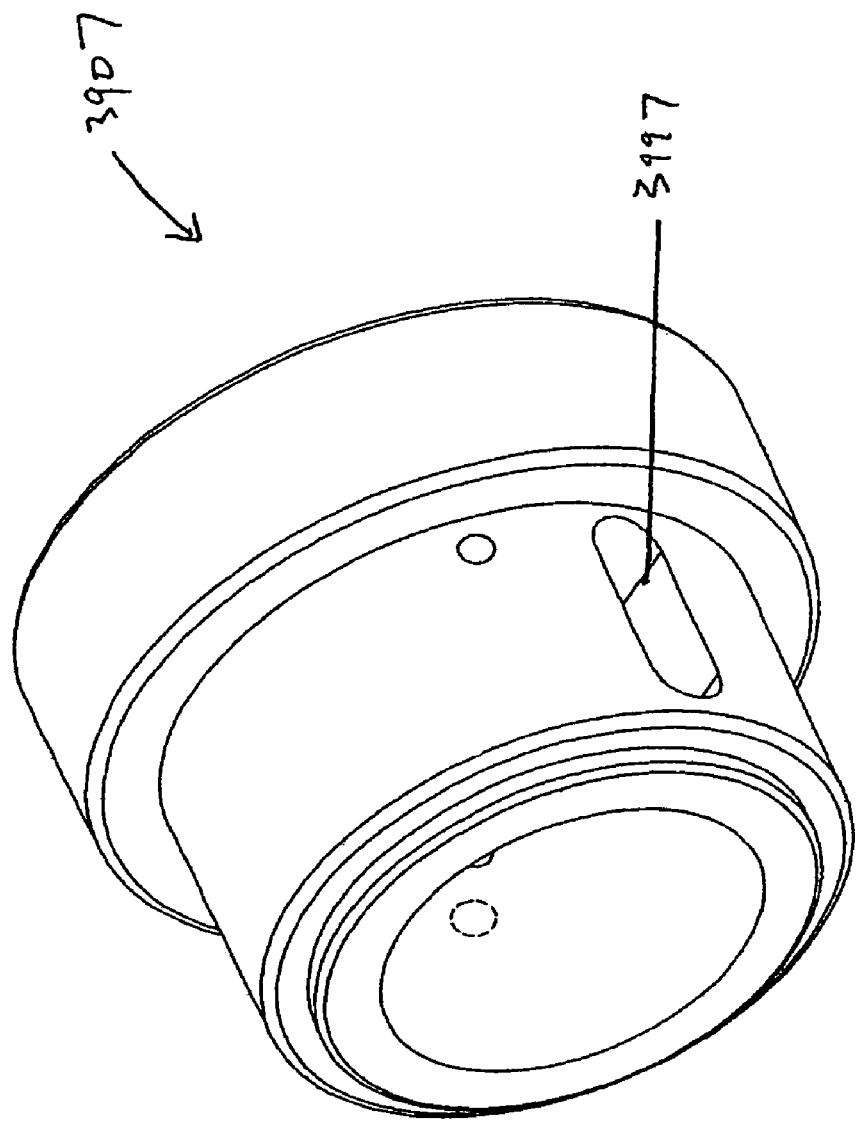
Figure 32:
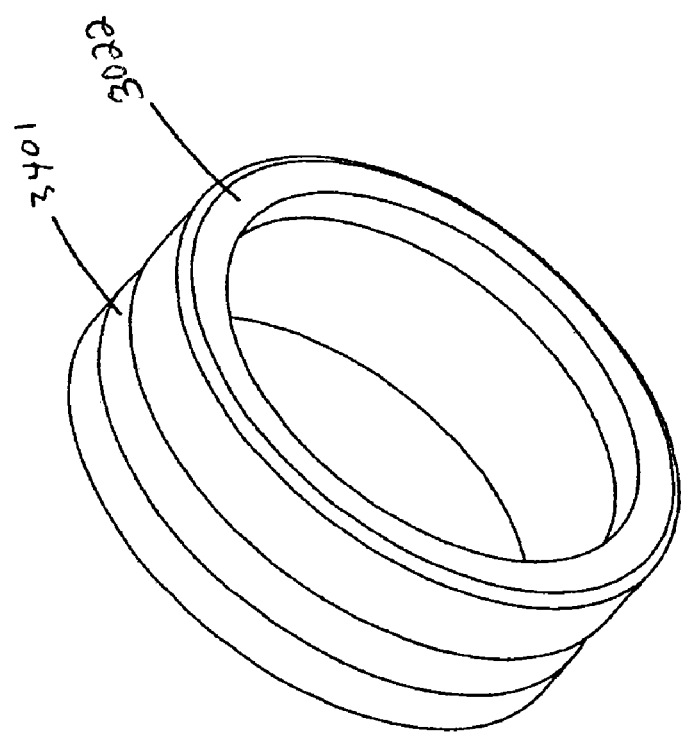
Figure 37B:
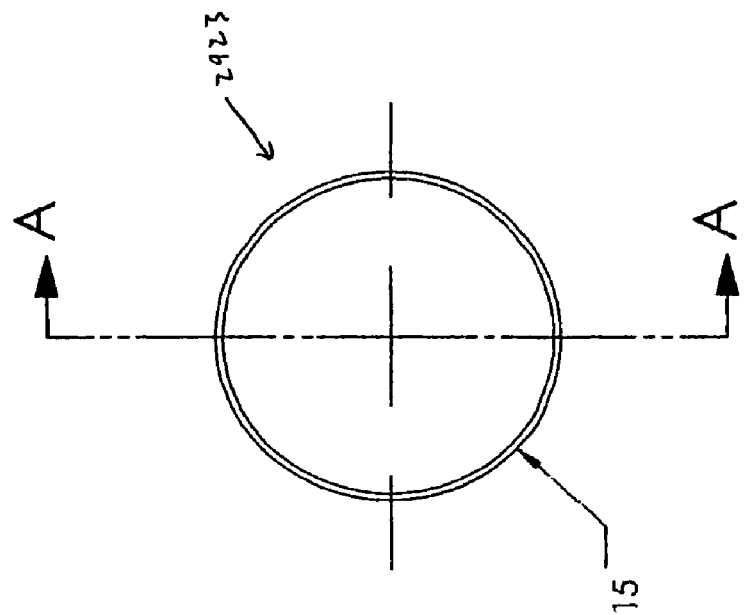
Figure 37A:
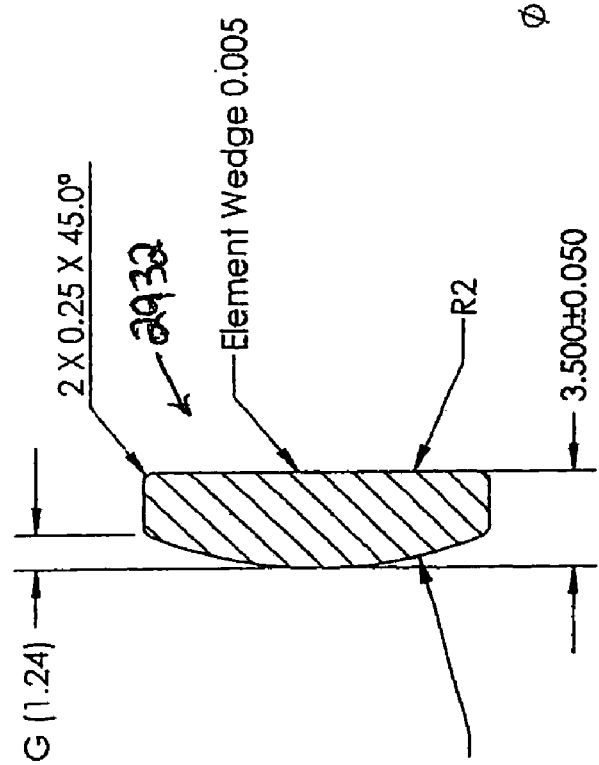
Figure 39B:
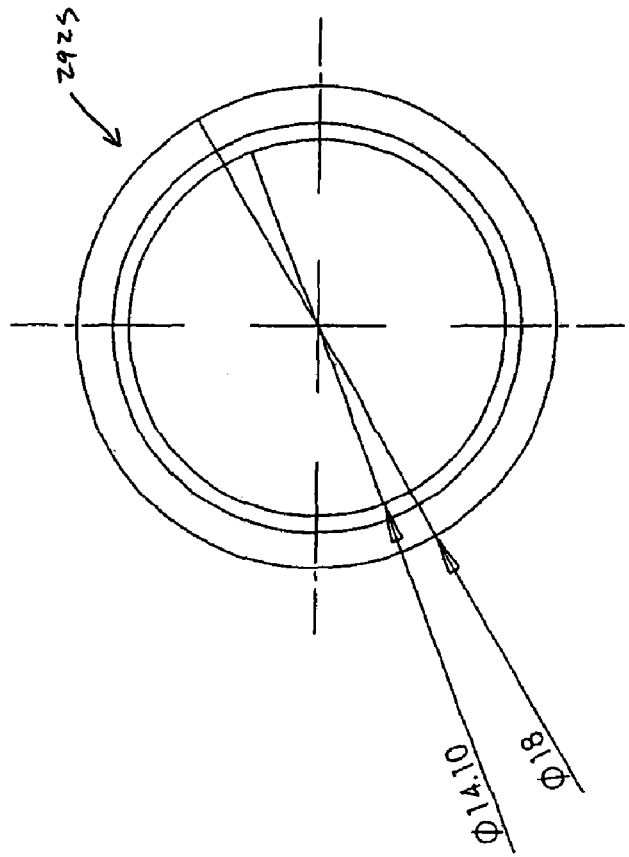
Figure 39A:
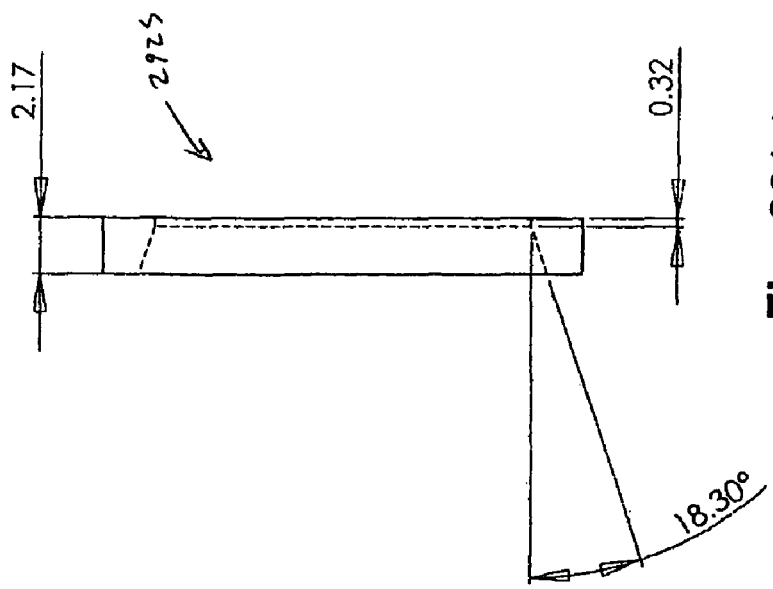
Figure 40B:
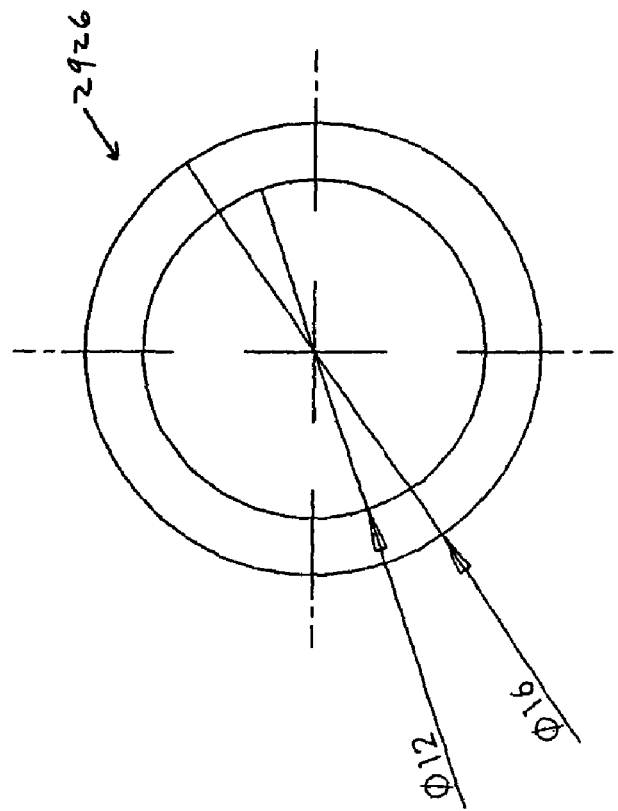
Figure 40A:
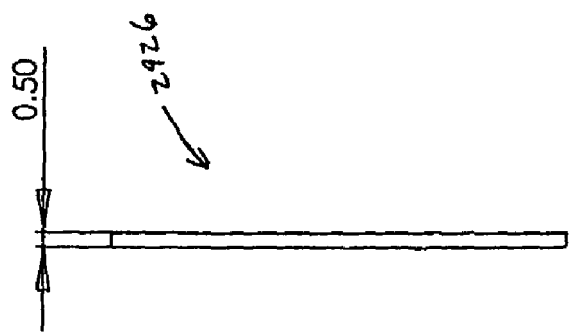
Figures 41A, 41B:
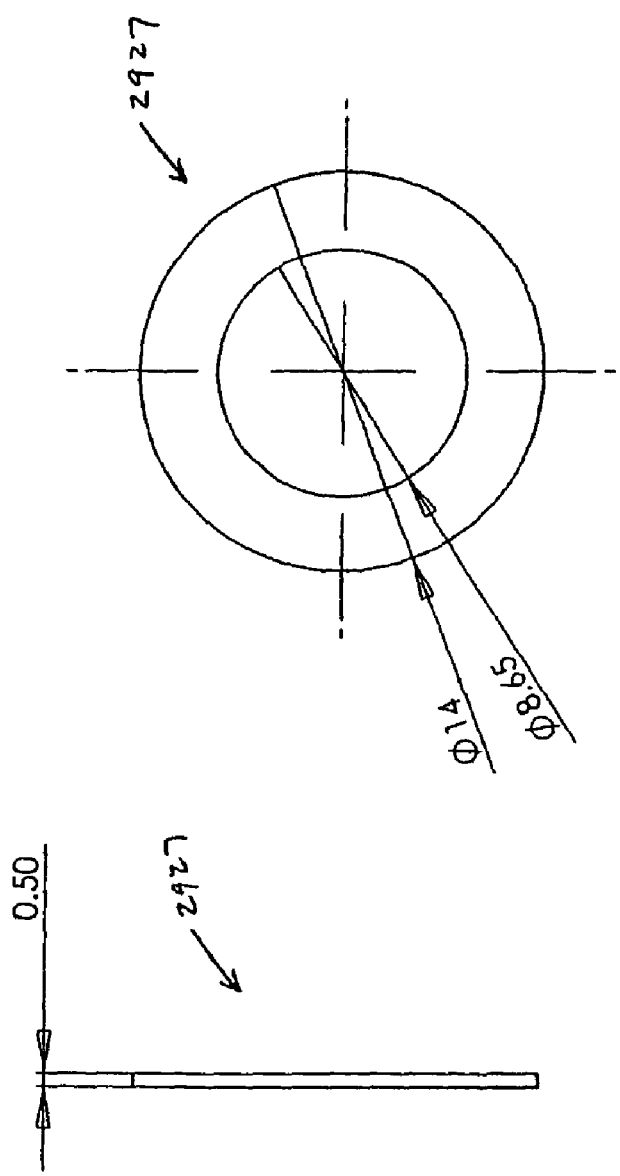

The distal portion 3130 of the collar 3101 is configured to receive the second image modifying device 20. The distal portion 3130 includes a locking mechanism 3132. Specifically, mechanism 3132 includes an arrangement that enables the proximal portion 22 of the night vision monocular 21 to be releasably but securely coupled to the first adapter 3100. The mechanism 3132 may include various features of e.g., a filter cap 3022 (additional details of which are illustrated in FIG. 32), the collar 3101 (additional details of which are illustrated in FIG. 29), a lock pin 3012 and a compression spring 3014. The filter cap 3022 defines a groove 3401 on its outer circumferential surface that, when engaged by the lock pin 3012, enables the filter cap 3022 to be secured to the collar 3101. Specifically, the collar 3101 defines a bore 3402 which partially intersects with an inner circumferential surface 3403 of the collar 3101. The lock pin 3012 has a first longitudinal portion 3405, having a relatively large diameter, and a second longitudinal portion 3406, having a relatively small diameter. The lock pin 3012 is adjustably positioned within the bore 3402 and is biased therein by the compression spring 3014. For example, when the compression spring 3014 is in an actuated position, the lock pin 3012 is positioned relative to collar 3101 such that the second longitudinal portion 3406 of the lock pin 3012 aligns with the inner circumferential surface 3403 of the collar 3101, the diameter of the second longitudinal portion 3406 of the lock pin 3012 being sufficiently small such that it is not disposed radially within the inner circumferential surface of the collar 3101. When the lock pin 3012 is biased by the compression spring 3014 out of the actuated position and into a resting position, the lock pin 3012 is positioned relative to collar 3101 such that the first longitudinal portion 3405 of the lock pin 3012 aligns with the inner circumferential surface 3403 of the collar 3101, the diameter of the first longitudinal portion 3405 of the lock pin 3012 being sufficiently large so as to be disposed radially within the inner circumferential surface 3403 of the collar 3101.

In order to secure night vision monocular 21 in collar 3101, the lock pin 3012 is pressed so as to overcome the biasing force of the compression spring 3014 until the lock pin 3012 is in the actuated position. With the inner circumferential surface 3403 of the collar 3101 thus being clear (because the diameter of the second portion of the lock pin 3012 is sufficiently small such that it is not disposed radially within the inner circumferential surface 3403 of the collar 3101), the filter cap 3022 is fully inserted into the collar 3101. In this position, the groove 3401 of the filter cap 3022 is aligned with the bore 3402 of the collar 3101. The lock pin 3012 is then allowed to be moved by the biasing force of the compression spring 3014 until the first longitudinal portion 3505 of the lock pin 3012 is disposed within the inner circumferential surface 3403 of the collar 3101. In this position, the first longitudinal portion 3505 of the lock pin 3012 engages the groove 3401 of the filter cap 3022 to thereby effectively prevent the filter cap 3022 from being de-coupled from the collar 3101. Advantageously, the lock pin 3012 does not contact or push down on the groove 3401 or any other portion of the outer surface of the filter cap 3022, but rather resides within the groove 3401 so as to prevent the filter cap 3022 from being longitudinally moved, e.g., de-coupled, from the collar 3101. Night vision monocular 21 can be removed from collar 3101 by the lock pin 3012 being pressed again so as to overcome the biasing force of the compression spring 3014 until the lock pin 3012 is in the actuated position. With the inner circumferential surface 3403 of the collar 3101 thus being clear again, the filter cap 3022 of the night vision monocular 21 may be longitudinally retracted from out of the collar 3101.

The first adapter 3100 includes an attachment member 3170 for releasably connecting or coupling first adapter 3100 with second adapter 3200. Attachment member 3170 may be integrally formed with collar 3101 or may be, e.g., removably attached to collar 3101 with screws 3174 in proximal portion 3172 of attachment member 3170. Attachment member 3170 may include means for connecting first adapter 3100 to second adapter 3200. For example, attachment member 3170 may include two dowels 3178 in distal end 3176 configured to be inserted in corresponding holes 3278 in proximal end 3276 of attachment member 3270 of second adapter 3200. In alternative embodiments, there may be any number of dowels or posts or pins to attach the first adapter 3100 to the second adapter 3200, and the dowels or posts or pins may be included on one or both of the first and second adapters 3100 and 3200, with corresponding cavities, holes, openings, etc. on either side.

Furthermore, the second adapter 3200 may include a collar 3201 having a proximal portion 3220 and a distal portion 3230, and an attachment member 3270 attached to the distal portion 3230 (attachment member 3270 may be regarded as part of the distal portion 3230 and/or may be integrally formed as part of collar 3201 or a separate piece attached to collar 3201).

The illustrated collar 3201 is closed when attached to attachment member 3270, but the collar 3201 may also be open, or more of a casing or housing in other embodiments. Distal portion 3230 is configured with an interface 3232 to mechanically connect or couple second adapter 3200 to the camera 31. Interface 3232 may be similar to or the same as the interface 13 (or match the manner in which interface 13) on lens 11 that enables lens 11 to be directly mechanically and electrically connected or coupled with the camera 31. In the case of the camera 33 and lens 11 being standard off-the-shelf designs, interface 2232 may have a standard configuration to couple or connect a variety of cameras 31 with a variety of other image modifying devices 100 and 200 in optical adapter systems. Interface 2232 may interact and match with a twist and lock mechanism 32 on camera 31, to releasably but securely mechanically connect or couple camera 31 with second adapter 3200.

The proximal portion 3220 of the collar 3201 is configured to receive the distal portion 24 of the night vision monocular 21. In an embodiment, a bottom surface of the attachment member 3170 includes a pivoting hook 3298 that is configured to releasably engage a pin 3299 of the attachment member 3270 when the attachment members 3170, 3270 are connected to each other. It should be recognized that any such arrangement may be employed. In the embodiment shown, this hook/pin arrangement functions to securely but releasably maintain a coupling between the proximal portion 3220 of second adapter 3200 with the distal portion 24 of the night vision monocular 21.

Essentially, in order to secure night vision monocular 21 in collar 3201, the distal portion 24 of night vision monocular 21 is inserted into proximal portion 3220 of collar 3201. Then, in order to secure the night vision monocular 21 in collar 3201, the pivoting hook 3298 on the bottom surface of the attachment member 3170 is pivoted until it engages the pin 3299 of the attachment member 3270. Night vision monocular 21 can be removed from collar 3201 by disengaging the pin 3299 from the hook 3298. The night vision monocular 21 is then slid out or removed from collar 3201.

As with the first adapter 3100, second adapter 3200 includes an attachment member 3270 for releasably connecting or coupling second adapter 3200 with first adapter 3100. Attachment member 3270 may be integrally formed with collar 3201 or removably attached to collar 3201 with screws 3274 in distal portion 3272 of attachment member 3270. Attachment member 3270 may include means for connecting second adapter 3200 to first adapter 3100. For example, attachment member 3270 may include cavities 3278 in proximal end 3276 configured to slidably receive dowels 3178 in distal end 3176 of attachment member 3170 of first adapter 3100. The mechanical configurations for mechanically connecting first adapter 3100 with second adapter 3200 may be interchangeable between adapters 3100 and 3200.

The usage of dowels to couple and connect two hardened plastic attachment members 3170 and 3270 may enable the optical assembly 3500 to maintain proper focal length between first, second and third image modifying devices 10, 20 and 30 each time when it is assembled. The use of external tools to couple and connect or release all of the parts in the optical adapter assembly 3500 together may be avoided.

The first and third image modifying devices 10 and 30 may be attached at any time to adapter assembly 3500. Although other configurations are possible, the second image modifying device 20 may be inserted and secured into one of the first adapter 3100 and second adapter 3200 before the one of the first adapter 3100 and second adapter 3200 is coupled or connected to the other of the first adapter 3100 and second adapter 3200, with its respective locking mechanism 2132, or with its respective hook/pin coupling arrangement. First and second adapters 3100 and 3200 may be coupled or connected at the same time that the second image modifying device 20 is inserted and secured into the other of the first adapter 3100 and second adapter 3200 as described above.

As mentioned above, various components of the optical adapter system, e.g., the first adapter 3100 and second adapter 3200, may be employed in different combinations so as to releasably but securely connect or couple the first adapter 3100 and second adapter 3200 with each other, with one or more of the image modifying devices 10, 20 and 30, etc. For example, either adapter may function alone, attaching two otherwise incompatible image modifying devices.

While various different second image modifying devices 20 may be employed, FIG. 28 illustrates some components of an optical arrangement that may be employed with the above-described optical adapter system, according to an embodiment of the present invention. For example, FIG. 28 illustrates a relay lens holder 3908 that may be mounted within and relative to the collar 3201 via a NOC lens holder 3907. The NOC lens holder 3907 may define a slot 3997 through which the position of the relay lens holder 3908 may be adjusted. In addition, FIG. 28 illustrates the filter cap 3022, as set forth above, that may be coupled to an optical UV filter 3919. The filter cap 3022 may be mounted, e.g., threaded, onto one end of a night vision monocular 21, enabling the night vision monocular 21 to be coupled to the collar 3101 via the lock pin 3012 engaging the groove 3401 of the filter cap 3022, as described above. This arrangement is particularly well suited for use with the PVS-14 type of night vision monocular, as manufactured by ITT Industries. More specifically, the arrangement described hereinabove is well suited for enabling a PVS-14 type of device to have mounted on its proximal end the filter cap 3022, and to then be mounted between the NOC lens holder 3907 (which is attached to the collar 3201) and the collar 3101.

Figure 45:
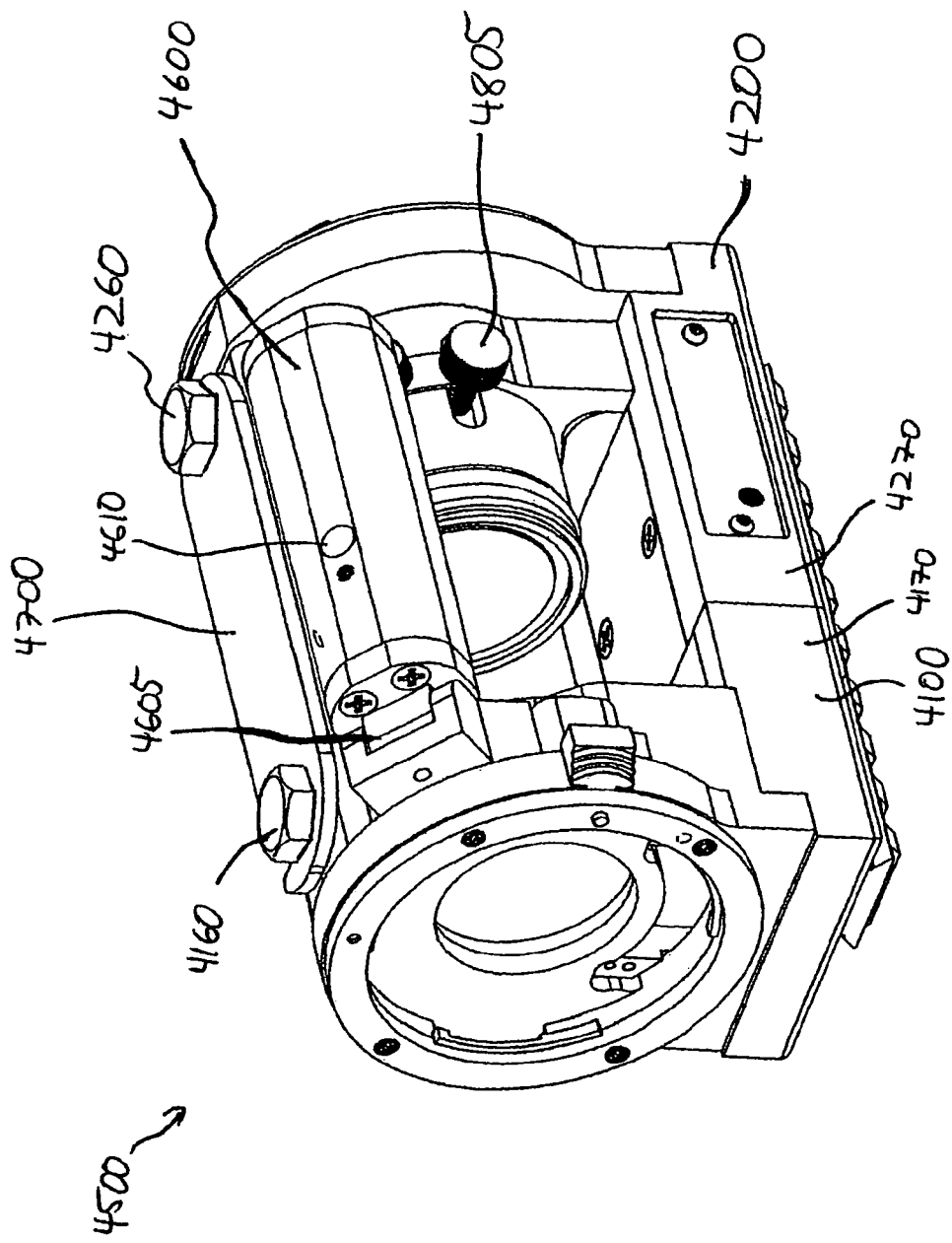
FIGS. 45 to 47 illustrate perspective views of an optical adapter system, according to an example embodiment of the present invention.
Figure 46:
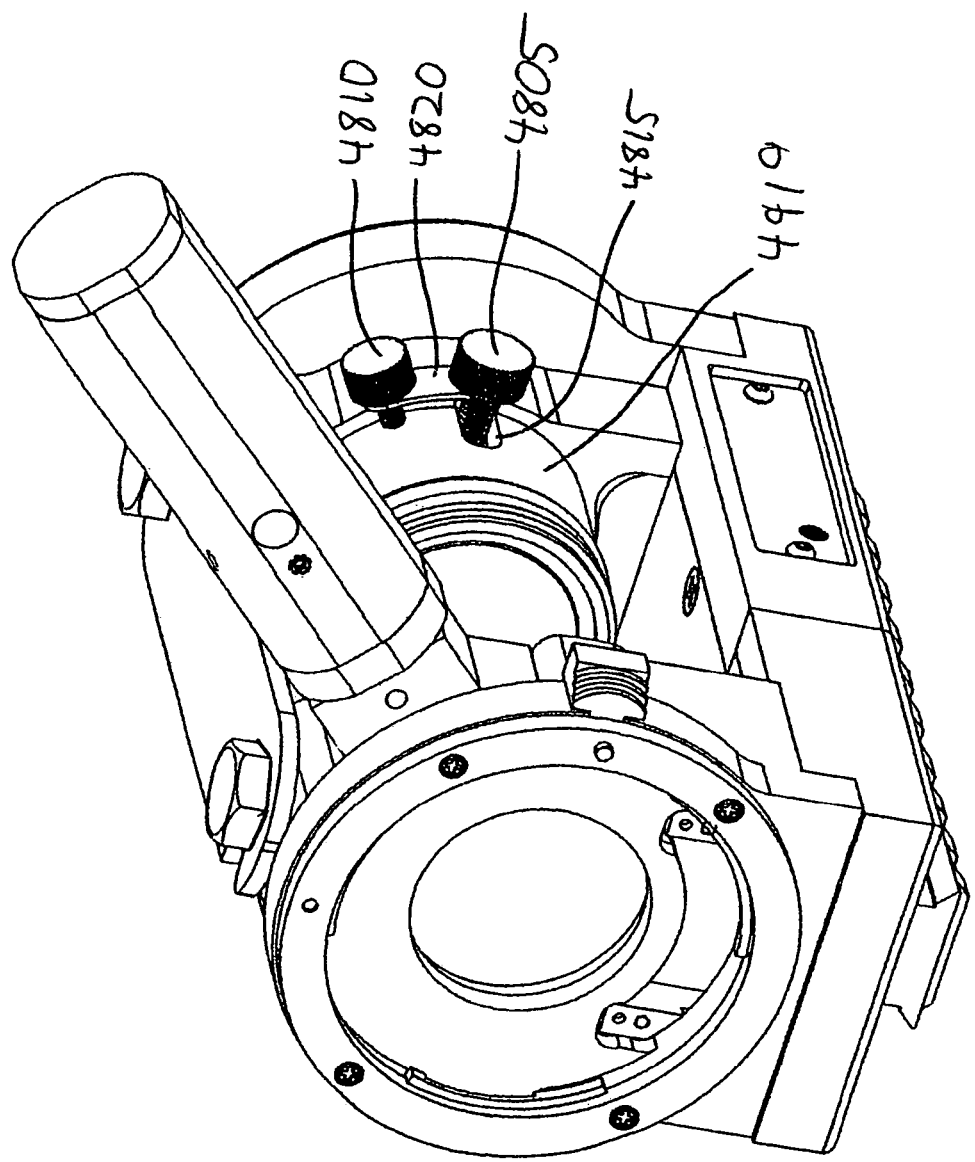
Figure 47:
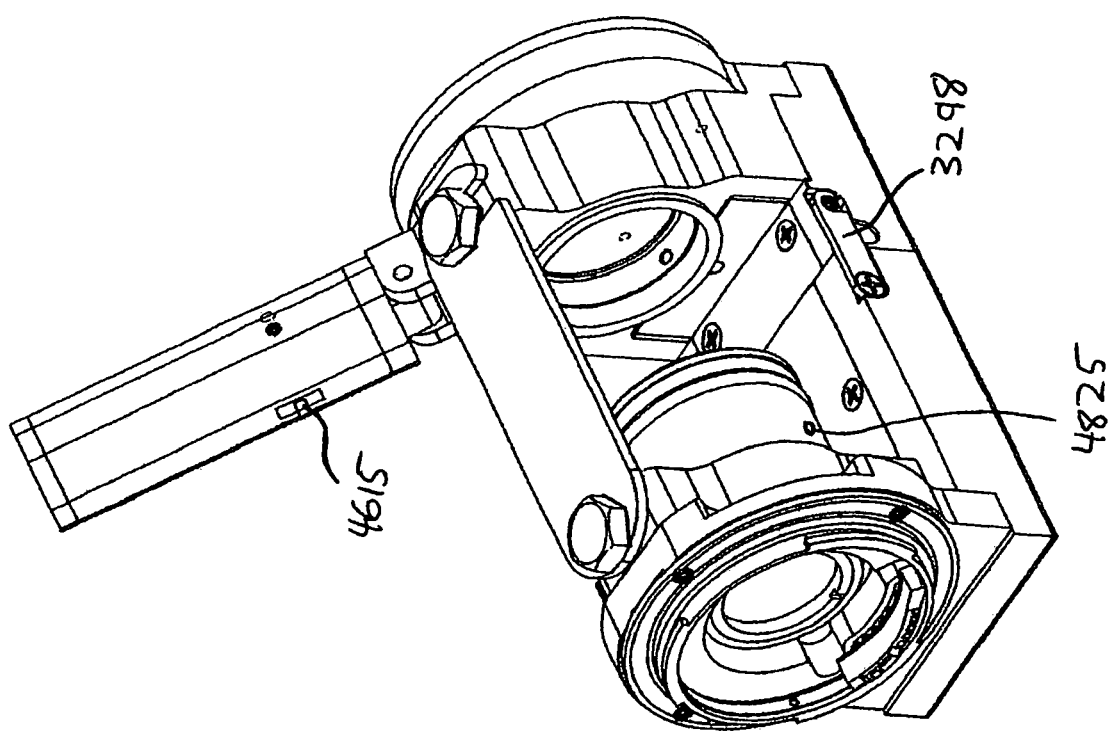

FIGS. 45 to 47 illustrate perspective views of an optical adapter system 4500, according to an example embodiment of the present invention. The optical adapter system 4500 shares many features with the optical adapter systems described above, e.g., optical adapter systems 500, 2500, and 3500. To the extent that various features may differ, relevant aspects of such differences may be set forth in additional detail below.

The optical adapter system 4500 includes a first adapter 4100 and a second adapter 4200. The first adapter 4100 is arranged to couple connect the first image modifying device 10, e.g., lens 11, to the second image modifying device 20, e.g., night vision unit 21, and the second adapter 4200 is arranged to connect the second image modifying device 20 to the third image modifying device 30, e.g., camera 31.

The optical adapter system includes an infrared extension 4600 for providing infrared illumination. The infrared extension is shown in a first or extended position in FIGS. 46 and 47 and in a second or non-extended position in FIG. 45.

The non-extended position allows for a more compact arrangement that may facilitate storage and/or portability. Further, the infrared extension 4600 may be less susceptible to being damaged when in the non-extended position. In this regard, the operator may prefer to extend the infrared extension only when needed.

The infrared extension 4600 is rotatably mounted to the first adapter 4100 at a hinged joint 4605 that allows the infrared extension 4600 to rotate between the second position, in which the longitudinal axis of the infrared extension 4600 is parallel to the axis of the first adapter 4100 (i.e., the axis corresponding to the viewing line of the system), and the first position, in which the longitudinal axis is perpendicular to the axis of the first adapter 4100, and vice-versa. It should be appreciated, however, that the infrared extension 4600 may be mounted to the second adapter 4200. It should be further appreciated that, additionally or alternatively, the infrared extension 4600 may be extended and retracted along its longitudinal axis.

The first and second positions of the infrared extension 4600 are predetermined and are formed by hard or positive stops. In this regard, the hinge may be bi-stable such that the extension is urged toward the positive stop corresponding to either the first or the second position, depending where along the path of motion the extension is positioned. The extension 4600 rotates 90 degrees between the first and second positions; however, first and second positions separated by any appropriate angle may be provided.

The infrared extension 4600 includes an infrared emitting element that emits an infrared beam through an infrared window 4610. When extended, the infrared extension 4600 projects the infrared beam onto a viewing target within an image received by the image modifying devices. This allows the target to be illuminated at a distance. The size of the illumination (e.g., the size of the "dot" where the illumination is approximately circular) may be customizable and/or adjustable. The infrared illumination may, e.g., facilitate identifying and/or focusing on viewing targets.

The infrared extension 4600 includes a switch 4615 that allows the infrared emitter to be powered on and off in the field. Although a slide switch is shown, any appropriate type of switch may be provided. Within the extension 4600 is a battery to power the infrared emitter. The battery compartment is accessible in field so that the operator may change out the battery if necessary. It should be appreciated, however, that the emitter may receive power from other sources, e.g., a dedicated battery placed outside the extension 4600, or via an electrical connection with the third image modifying device 30 (e.g., camera 31), such as the connection described above with respect to female and male connectors 182 and 282 of assembly 500.

In the extended position, the infrared extension 4600 positions the infrared window 4610 at a radial distance that allows the infrared beam to clear, e.g., large-diameter lenses. Thus, the extension 4600 allows for a compact, rugged design and the flexibility to project an infrared illumination beam even when larger diameter lenses are used.

The optical adapter system 4500 also includes an alignment strap 4700 to maintain proper alignment between the first and second adapters 4100 and 4200. This may be beneficial where, e.g., relatively heavy first image modifying devices, e.g., lenses, are connected to the first adapter 4100. By providing the strap 4700 along the top of the adapter system 4500, the resulting torque on the connection interface between the first attachment member 4170 of the first adapter 4100 and the second attachment member 4270 of the second adapter 4200 (secured by pivoting hook 2298) is reduced, which may result in reduced or eliminated flex, resulting in better alignment of optical components. In response to the weight of the first image modifying device, e.g., lens, the strap carries a mechanical load that is primarily tensional, while the interface between the first and second attachment members 4170 and 4270 carries a mechanical load that is more compressive than bending or torsional.

The strap 4700 attaches to Screws 4160 and 4260. In this regard, one end of the strap 4700 is attached to the screw 4260 by receiving the screw 4260 through a hole. The other end of the strap 4700 is hook-shaped to selectively engage screw 4160. Thus, the strap 4700 may swivel around the screw 4260 to engage or disengage the screw 4160. It should be appreciated, however, that the strap may instead be rotatably mounted to the screw 4160 so that the hooked end engages the screw 4260, or the strap 4700 may have two hooked ends.

Further, any appropriate tension bearing member may be provided between the first adapter and the second adapter at any upper location, e.g., locations other than the screws 4160 and 4260.

The adapter system 4500 also includes a focus or adjustment mechanism to facilitate focusing of the relay lens, e.g., by an operator in the field. The focus mechanism includes an adjustment member or thumbscrew 4805 and a setting member or thumbscrew 4810. The adapter system 4500 includes a relay lens system such as that described above with respect to the adapter system 2500. The adjustment member 4805 is attached to the relay lens barrel (such as, e.g., the relay lens barrel 2928 described above). The relay lens barrel may be adjusted by pushing or pulling the adjustment member 4805 along a slot 4815 in the relay lens holder 4919 through which the adjustment member 4805 extends. Once the relay lens barrel is in the desired position, the setting member 4810 may be manually tightened (by turning the thumbscrew) to press against the relay lens barrel to act as a setscrew. If further adjustments are desired, the setting member 4810 may be loosened and the barrel again adjusted via the adjustment member 4805 and subsequently fixed with the setting member 4810. A strap 4820, e.g., a rubber strap, connects the adjustment member 4805 and the setting member 4810 to prevent loss of, e.g., the setting member 4810 if removed from its corresponding internally threaded hole.

If adjustment in the field is not desired, e.g., where the operator does not desire or is not trained to manually adjust the relay lens, the adjustment member 4805 and the setting member 4810 may be removed from the adapter system 4500. For removal, the adjustment member 4805 is backed out of its corresponding internally threaded hole in the lens barrel, and the setting member 4810 is backed out of its corresponding internally threaded hole in the relay lens holder 4919. Since the adjustment member 4805 and the setting member 4810 are each thumbscrews, they may be removed manually and/or via tools. To set the lens barrel in its fixed position when the setting member 4810 is removed, a setscrew 4825 provided in the relay lens holder 4919 may be tightened against the lens barrel. The setscrew 4825 is not tightened whenever the adjustment member 4805 and the setting member 4810 are used to adjust the relay lens. Thus, a flexible system is provided that may be easily altered to allow or disallow manual field adjustment of the relay lens.

Although the focus mechanism illustrated in FIGS. 45 to 47 includes a setting member that is separate from the adjustment member, it should be appreciated that other arrangements are possible. For example, a single member may function as both the adjustment member and the setting member, e.g., where the adjustment member is tightenable to cause sufficient friction (e.g., between a step or surface of the adjustment member and the relay lens holder) to hold the lens barrel in place.

It should be understood that there exist implementations of other variations and modifications of the invention and its various aspects, as may be readily apparent to those of ordinary skill in the art, and that the invention is not limited by specific embodiments described herein. Features and embodiments described above may be combined in various ways. It is therefore contemplated to cover any and all modifications, variations, combinations or equivalents that fall within the scope of the basic underlying principals disclosed and claimed herein.

What is claimed is:

1. An adapter system comprising:
   a first adapter configured to couple a first image modifying device to a second image modifying device, a proximal portion of the first adapter configured to be connected to the first image modifying device, a distal portion of the first adapter configured to be connected to the second image modifying device, wherein the distal portion is configured to mate with the second image modifying device via a pin-and-channel coupling, the distal portion including a locking mechanism selectively engageable to releasably secure the pin-and-channel coupling;
   a second adapter releasably connectable to the first adapter, the second adapter being configured to couple the second image modifying device to a third image modifying device, a distal portion of the second adapter being configured to be connected to the third image modifying device, a proximal portion of the second adapter being configured to be connected to the second image modifying device; and
   an extension member attached to one of the first and second adapters and having a first position, in which the extension member is configured to direct a beam of infrared light onto an object within an image received by the second image modifying device.

2. The adapter system of claim 1, wherein the extension member is movable between the first position and a second position, the extension member extending a greater lateral distance from the one of the first and second adapters when the extension member is in the second position.

3. The adapter system according to claim 2, wherein the extension member is connected to the one of the first and second adapters via a hinge, the extension member being rotatable about the hinge between the first and second positions.

4. The adapter system according to claim 3, wherein the extension member is attached to the first adapter, the extension member extending from the hinge toward the second adapter when the extension member is in the second position.

5. The adapter system according to claim 4, wherein the extension member rotates 90 degrees between the first and second positions.

6. The adapter system according to claim 1, wherein the first image modifying device is a lens.

7. The adapter system according to claim 6, wherein the third image modifying device is at least one of an optical viewing piece and a camera.

8. The adapter system according to claim 7, wherein the second image modifying device is a night-vision monocular.

9. The adapter system according to claim 1, wherein at least a portion of the adapter system is made of a hardened plastic substance.

10. The adapter system according to claim 9, wherein the hardened plastic substance is a type of an acetal homopolymer.

11. The adapter system according to claim 1, wherein the locking mechanism includes a threaded opening through a surface in the distal portion into an interior of a channel of the pin-and-channel connection and a screw having a length sufficient to extend through a length of the opening into the channel and to at least partially block a portion of the channel when the screw is further inserted through the opening.

12. The adapter system according to claim 11, wherein an upper portion of the screw includes at least one of a ring therethrough and a member hingedly fixed thereon, the at least one of the ring and the member having a width sufficient to facilitate manual rotation of the screw.

13. An adapter system comprising:
   a first adapter configured to couple a first image modifying device to a second image modifying device, a proximal portion of the first adapter configured to be connected to the first image modifying device, a distal portion of the first adapter configured to be connected to the second image modifying device, wherein the distal portion is configured to mate with the second image modifying device via a pin-and-channel coupling and the distal portion includes a locking mechanism selectively engageable to releasably secure the pin-and-channel coupling; and a second adapter releasably connectable to the first adapter, the second adapter being configured to couple the second image modifying device to a third image modifying device, a distal portion of the second adapter being configured to be connected to the third image modifying device, and a proximal portion of the second adapter is configured to be connected to the second image modifying device, wherein at least one of the first and second adapters includes a relay lens and an adjustment mechanism arranged to allow manual adjustments to the relay lens.

14. The adapter system according to claim 13, wherein the adjustment mechanism includes an adjustment element that extends through and slides along a slot in the at least one of the first and second adapters to adjust the relay lens.

15. The adapter system according to claim 14, wherein the adjustment element is a thumbscrew.

16. The adapter system according to claim 14, wherein the adjustment mechanism further includes a setting element configured to set the relay lens in its adjusted position.

17. The adapter system according to claim 16, wherein the setting element is a thumbscrew arranged to function as a setscrew.

18. The adapter system according to claim 16, wherein the at least one of the first and second adapters includes a second setscrew configured to set the relay lens in its adjusted position.

19. The adapter system according to claim 13, wherein the first image modifying device is a lens.

20. The adapter system according to claim 13, wherein the third image modifying device is at least one of an optical viewing piece and a camera.

21. The adapter system according to claim 13, wherein the second image modifying device is a night-vision monocular.

22. The adapter system according to claim 13, wherein at least a portion of the adapter system is made of a hardened plastic substance.

23. The adapter system according to claim 22, wherein the hardened plastic substance is a type of an acetal homopolymer.

24. The adapter system according to claim 13, wherein the locking mechanism includes a threaded opening through a surface in the distal portion into an interior of a channel of the pin-and-channel connection and a screw having a length sufficient to extend through a length of the opening into the channel and to at least partially block a portion of the channel when the screw is further inserted through the opening.

25. The adapter system according to claim 24, wherein an upper portion of the screw includes at least one of a ring therethrough and a member hingedly fixed thereon, the at least one of the ring and the member having a width sufficient to facilitate manual rotation of the screw.

26. An adapter system comprising:

a first adapter configured to couple a first image modifying device to a second image modifying device, a proximal portion of the first adapter configured to be connected to the first image modifying device, a distal portion of the first adapter configured to be connected to the second image modifying device, wherein the distal portion is configured to mate with the second image modifying device via a coupling, the distal portion including a locking mechanism selectively engageable to releasably secure the coupling;

a second adapter releasably connectable to the first adapter, the second adapter being configured to couple the second image modifying device to a third image modifying device, a distal portion of the second adapter being configured to be connected to the third image modifying device, a proximal portion of the second adapter being configured to be connected to the second image modifying device; and an extension member attached to one of the first and second adapters and having a first position, in which the extension member is configured to direct a beam of infrared light onto an object within an image received by the second image modifying device.

27. An adapter system comprising:

a first adapter configured to couple a first image modifying device to a second image modifying device, a proximal portion of the first adapter configured to be connected to the first image modifying device, a distal portion of the first adapter configured to be connected to the second image modifying device, wherein the distal portion is configured to mate with the second image modifying device via a coupling and the distal portion includes a locking mechanism selectively engageable to releasably secure the coupling; and a second adapter releasably connectable to the first adapter, the second adapter being configured to couple the second image modifying device to a third image modifying device, a distal portion of the second adapter being configured to be connected to the third image modifying device, and a proximal portion of the second adapter is configured to be connected to the second image modifying device, wherein at least one of the first and second adapters includes a relay lens and an adjustment mechanism arranged to allow manual adjustments to the relay lens.

* * * * *